(12) United States Patent
Nounin et al.

(10) Patent No.: US 7,130,287 B2
(45) Date of Patent: *Oct. 31, 2006

(54) RADIO COMMUNICATION SYSTEM

(75) Inventors: Katsuya Nounin, Kawasaki (JP);
Kiyoshi Toshimitsu, Kawasaki (JP);
Takafumi Sakamoto, Yokohama (JP);
Nobuyasu Nakajima, Yokohama (JP);
Eiji Kamagata, Kawasaki (JP);
Mutsumu Serizawa, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/295,605

(22) Filed: Dec. 7, 2005

(65) Prior Publication Data

US 2006/0092880 A1 May 4, 2006

Related U.S. Application Data

(62) Division of application No. 10/846,651, filed on May 17, 2004, now Pat. No. 6,999,438, which is a division of application No. 09/427,487, filed on Oct. 27, 1999, now abandoned, which is a division of application No. 08/784,526, filed on Jan. 17, 1997, now abandoned.

(30) Foreign Application Priority Data

| Jan. 18, 1996 | (JP) | ................................. 8-006665 |
| Jan. 23, 1996 | (JP) | ................................. 8-009531 |
| Apr. 23, 1996 | (JP) | ................................. 8-009532 |

(51) Int. Cl.
*H04Q 1/00* (2006.01)
(52) U.S. Cl. ....................... 370/332; 370/331; 455/436; 455/525

(58) Field of Classification Search ................ 370/341, 370/331, 332; 455/436, 450, 507, 509, 517, 455/524, 525, 437
See application file for complete search history.

(56) References Cited

U.S. PATENT DOCUMENTS

| 5,586,121 A | 12/1996 | Moura et al. |
| 5,734,589 A | 3/1998 | Kostreski et al. |
| 5,754,961 A | 5/1998 | Serizawa et al. |
| 5,802,469 A | 9/1998 | Nounin et al. |
| 5,828,655 A | 10/1998 | Moura et al. |
| 5,844,894 A | 12/1998 | Dent |
| 5,940,769 A | 8/1999 | Nakajima et al. |

FOREIGN PATENT DOCUMENTS

| JP | 58-143643 | 8/1983 |
| JP | 4-150532 | 5/1992 |
| JP | 4-225649 | 8/1992 |
| JP | 4-225650 | 8/1992 |
| JP | 5-183504 | 7/1993 |

(Continued)

*Primary Examiner*—Matthew D. Anderson
*Assistant Examiner*—Lewis West
(74) *Attorney, Agent, or Firm*—Oblon, Spivak, McClelland, Maier & Neustadt, P.C.

(57) ABSTRACT

In a radio communication system having narrow-band up- and down-link radio channels and a wide-band down-link radio channel, when a radio terminal is to receive data through the wide-band down-link radio channel, the narrow-band up- and down-link radio channels are assigned to the radio terminal in advance. With this operation, communication an be performed by using the wide-band down-link radio channel. In addition, the narrow-band up- and down-link radio channels can be used as radio channels for performing control to efficiently transmit data by using the wide-band down-link radio channel.

1 Claim, 36 Drawing Sheets

FOREIGN PATENT DOCUMENTS

| | | |
|---|---|---|
| JP | 6-204954 | 7/1994 |
| JP | 7-46248 | 2/1995 |
| JP | 7-327263 | 12/1995 |
| JP | 9-64937 | 3/1997 |
| JP | 9-510596 | 12/1997 |

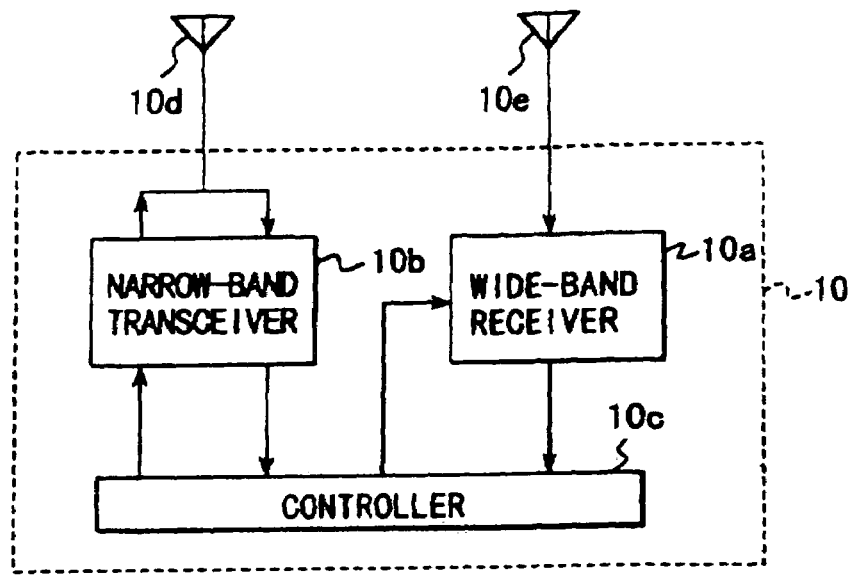
FIG. 2
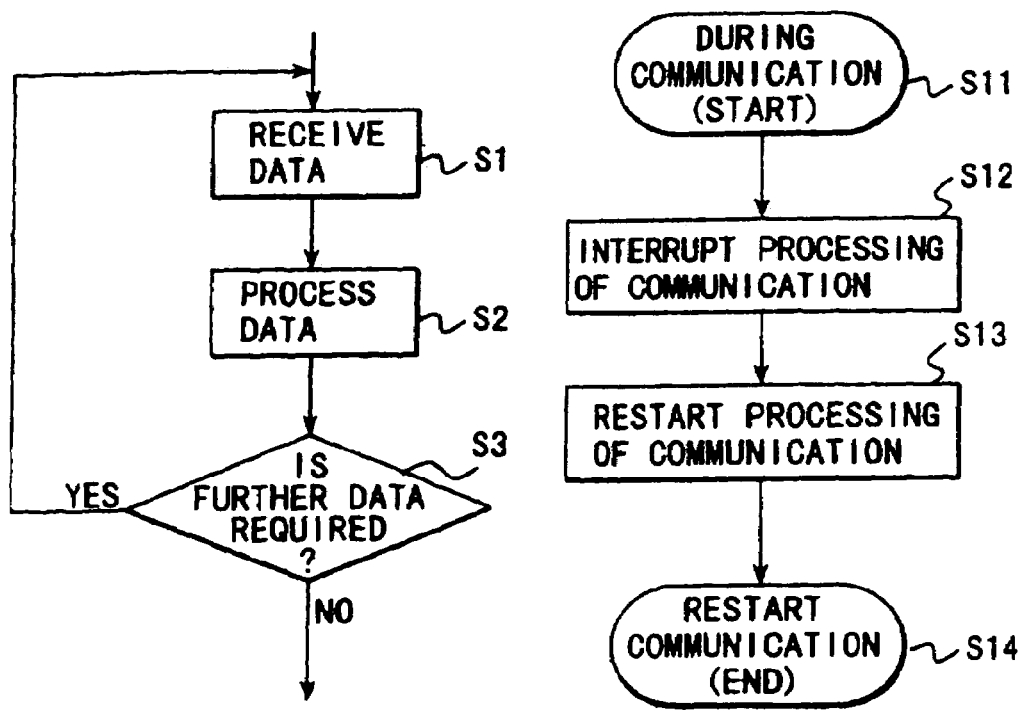
FIG. 4
FIG. 5

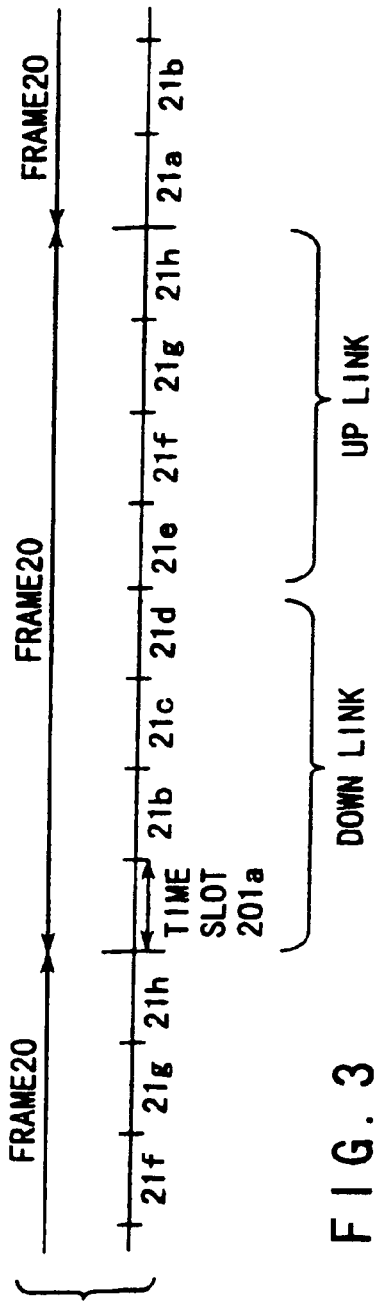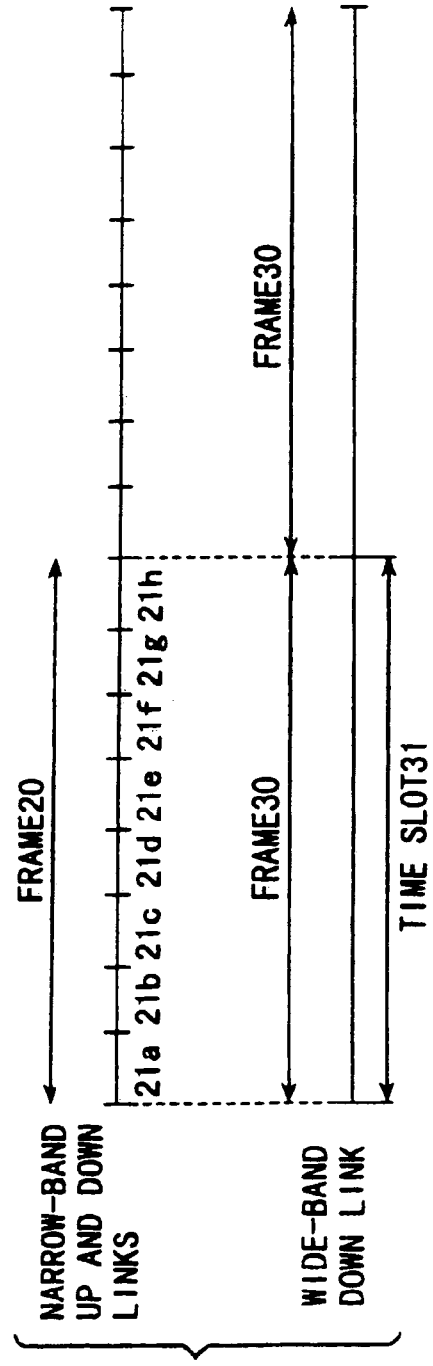

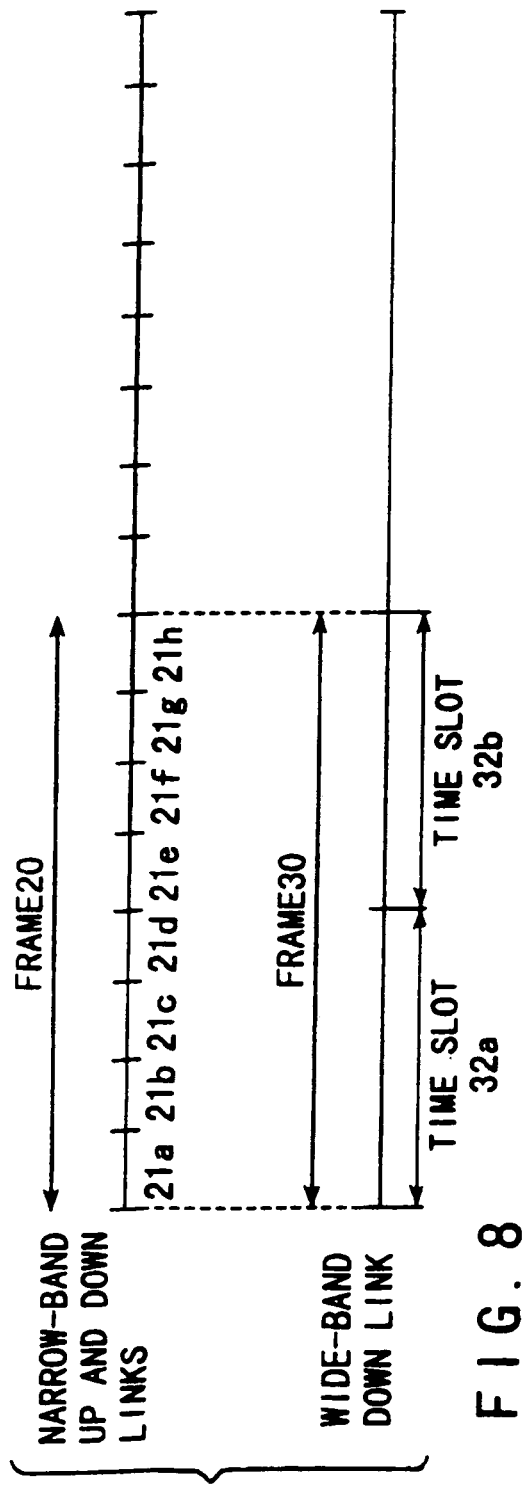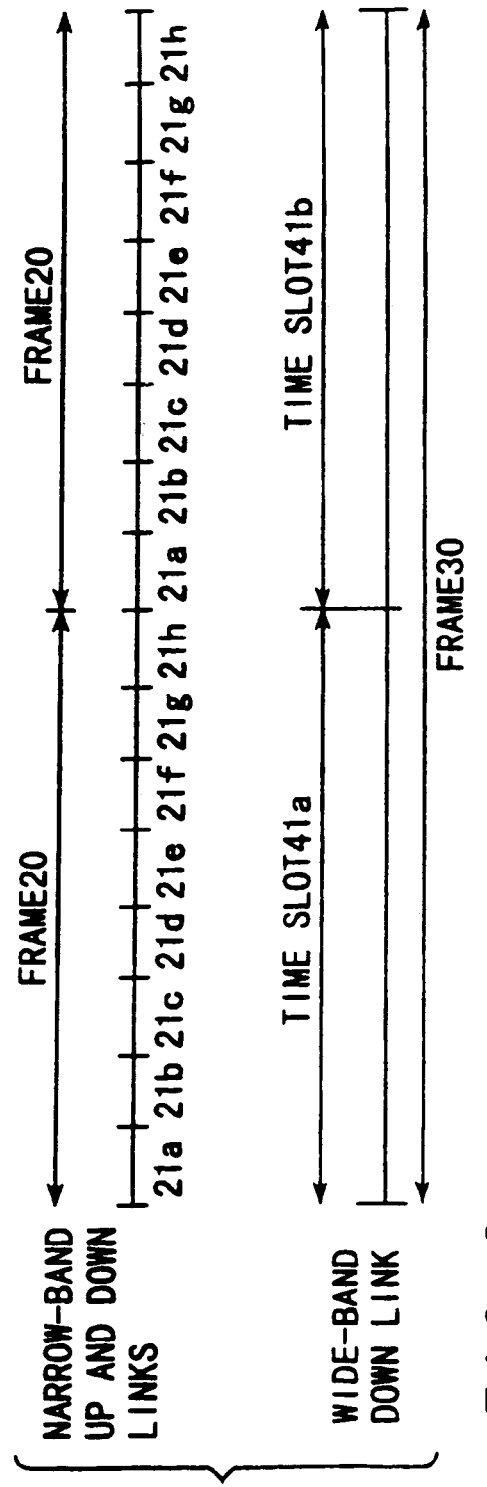

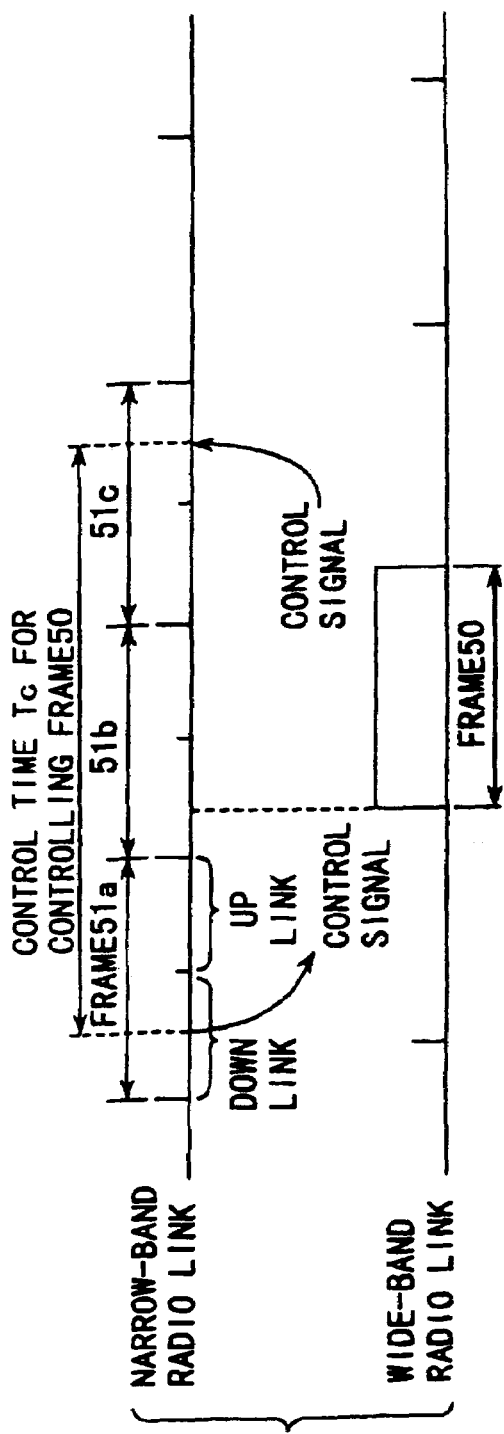
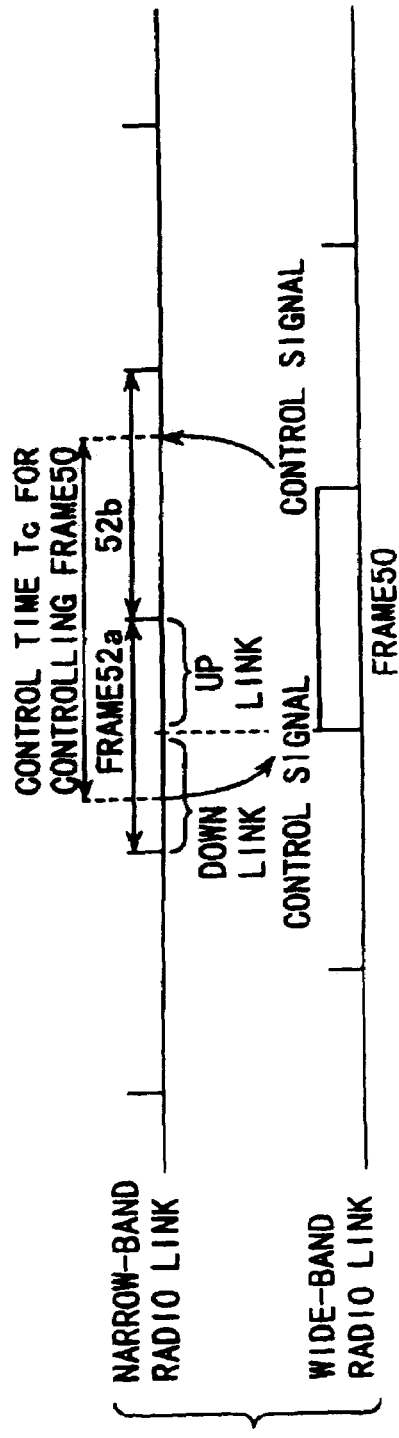
FIG. 10A
FIG. 10B

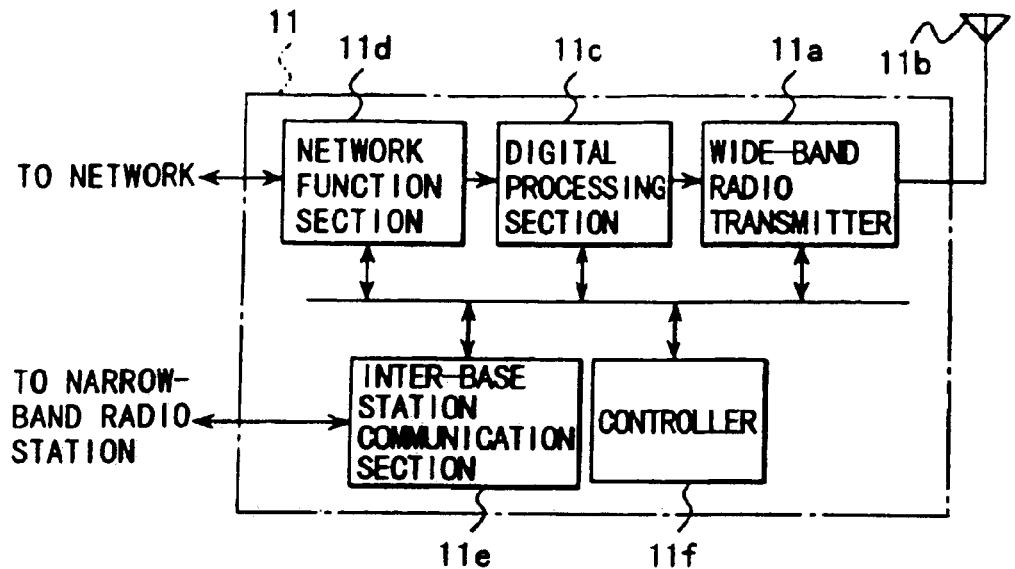
F I G. 11A
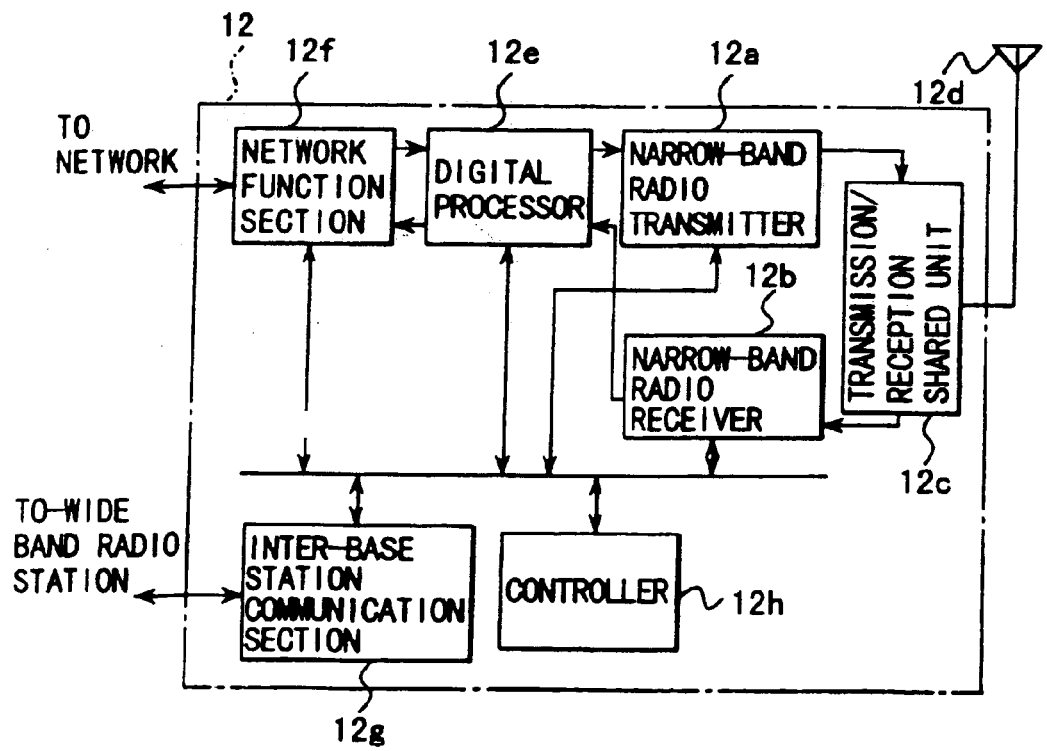
F I G. 11B

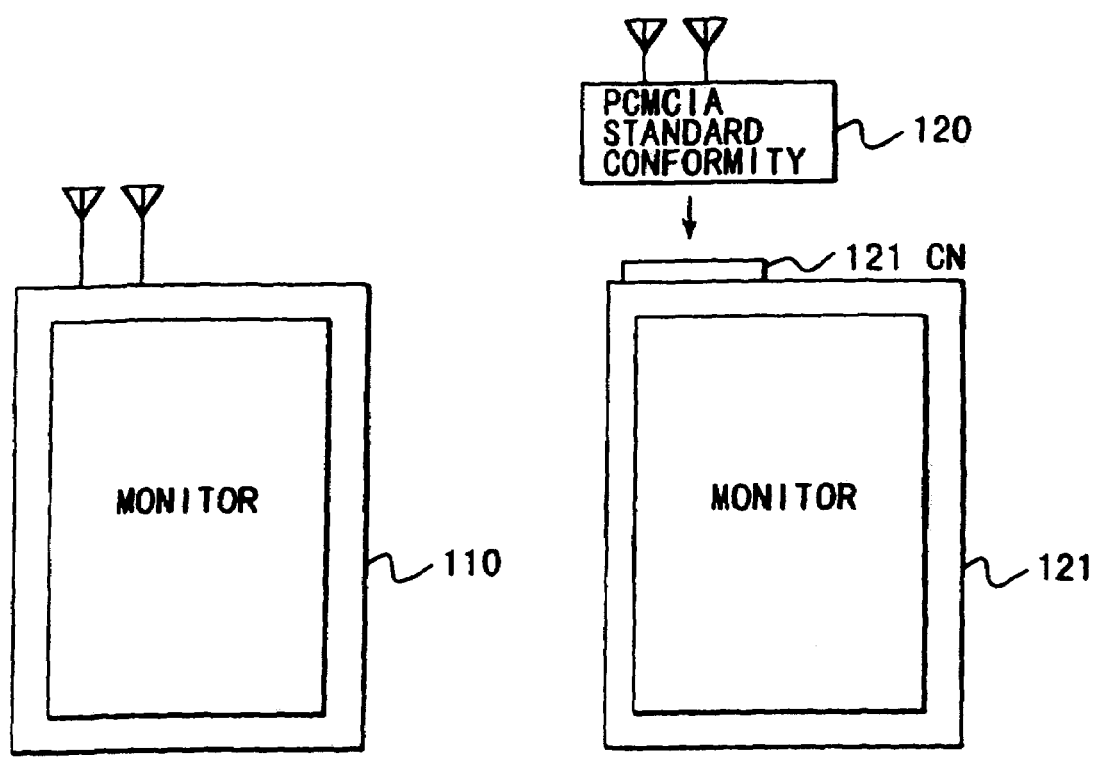
F I G. 1 6 A   F I G. 1 6 B

| EMISSION LIGHT COLOR | TALKING SERVICE | PAGING SERVICE |
|---|---|---|
| BLUE | ENABLE | ENABLE |
| GREEN | ENABLE | UNABLE |
| YELLOW | UNABLE | ENABLE |
| RED | UNABLE | ENABLE |

SATISFACTORY SERVICE QUALITY

ACCEPTABLE SERVICE QIALITY

POOR SERVICE QUALITY

NOT IN SERVICE

SATISFACTORY SERVICE QUALITY

POOR SERVICE QUALITY

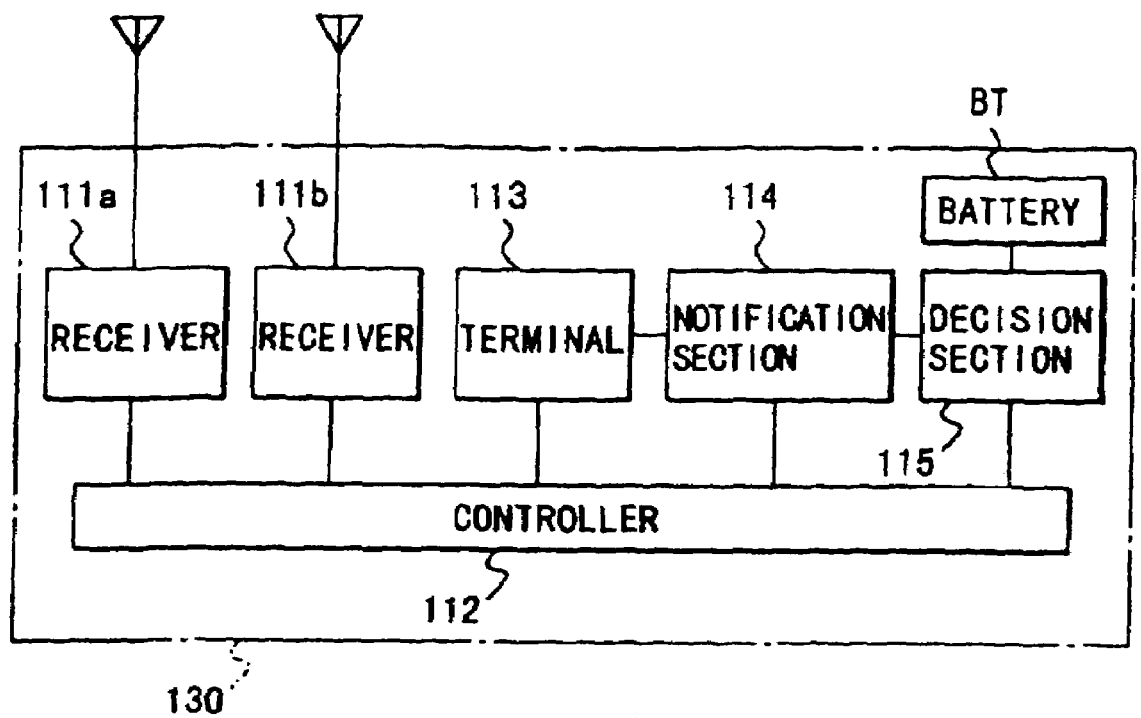
F I G. 23
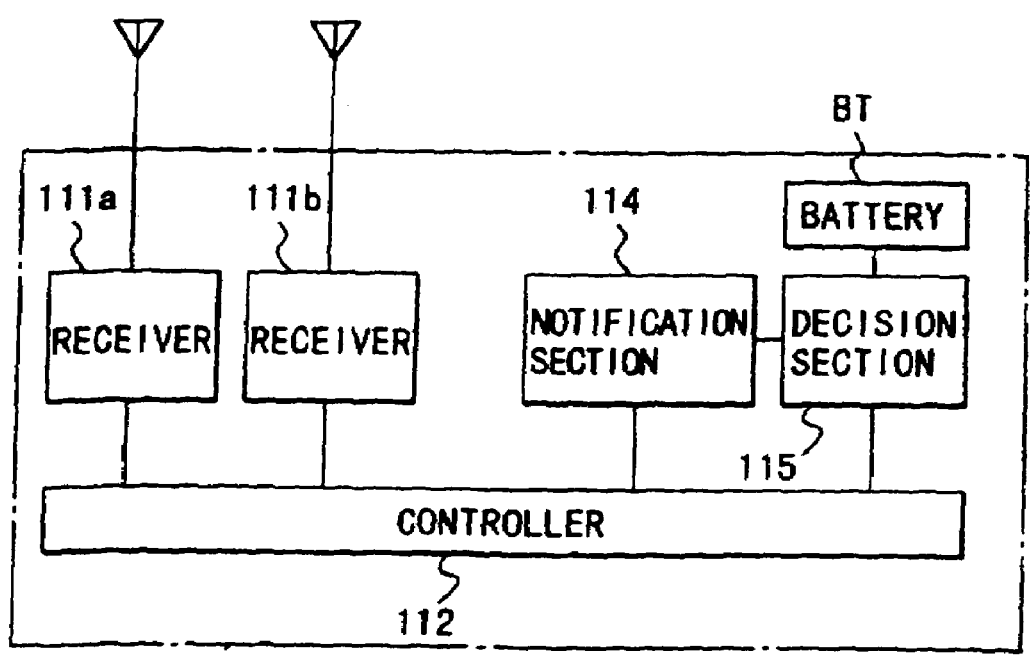
F I G. 24

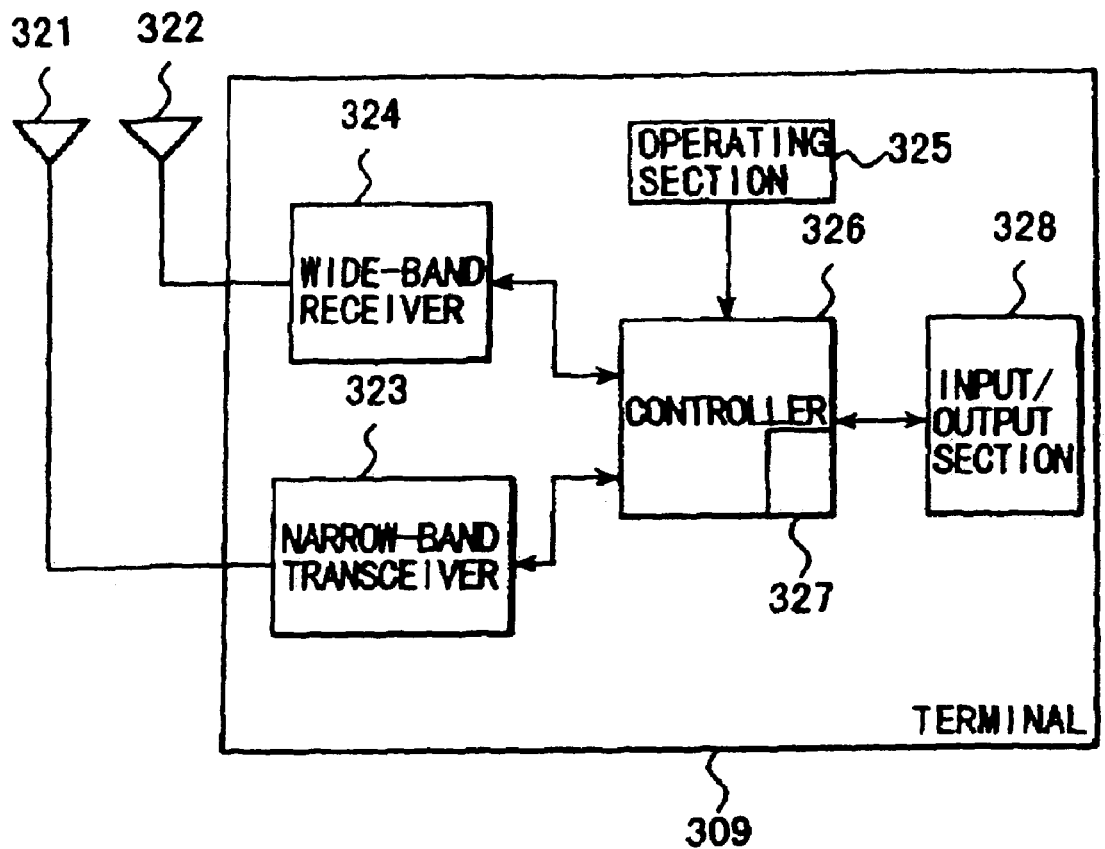
F I G. 43
| BASE STATION IDENTIFICATION DATA | RSSI | NUMBER OF AVAILABLE CHANNELS |
|---|---|---|
| A | 8dBm | 1 |
| B | 6dBm | 0 |
| C | 3dBm | 4 |
| D | 1dBm | 2 |
F I G. 44

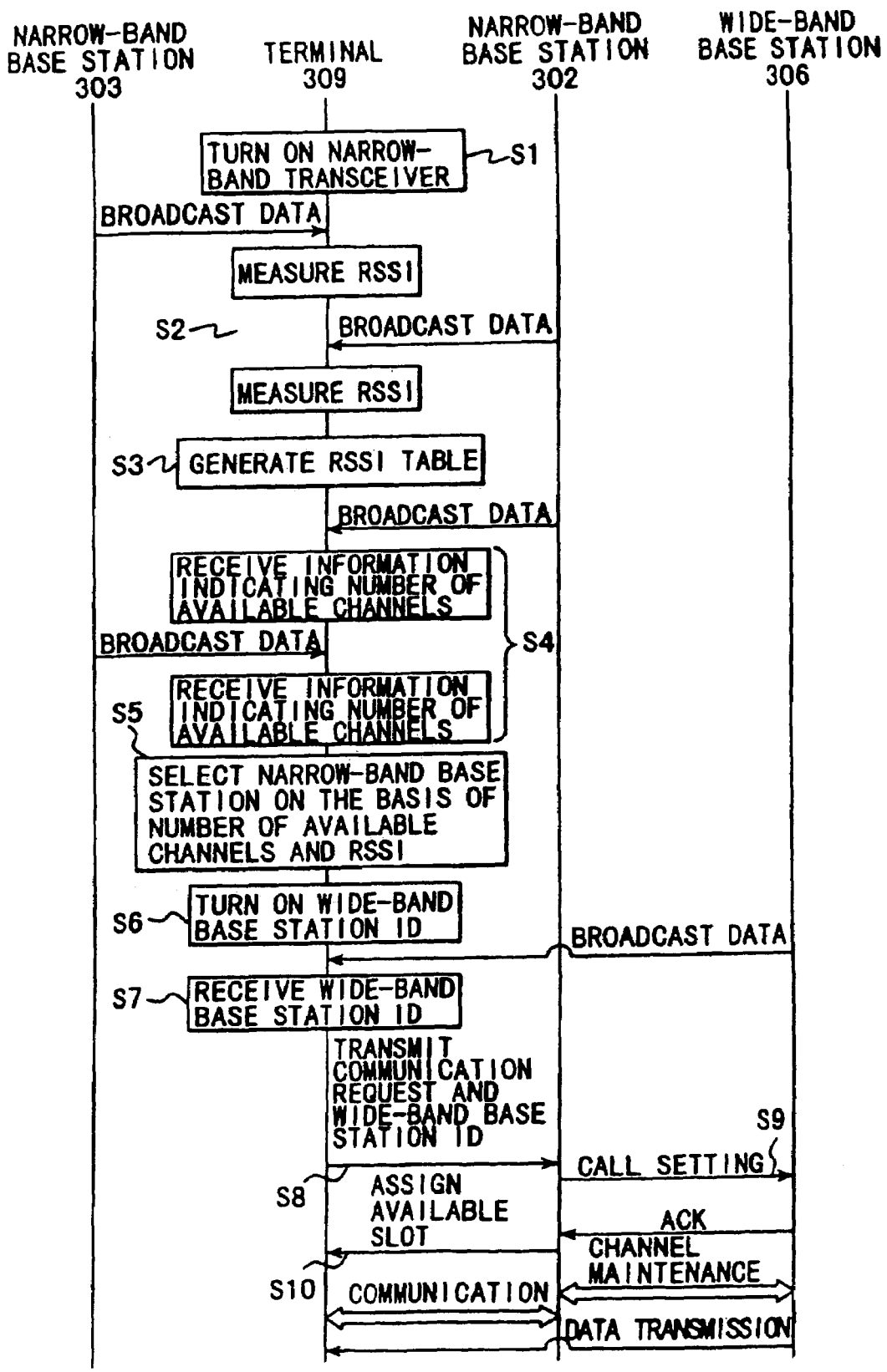
F I G. 45

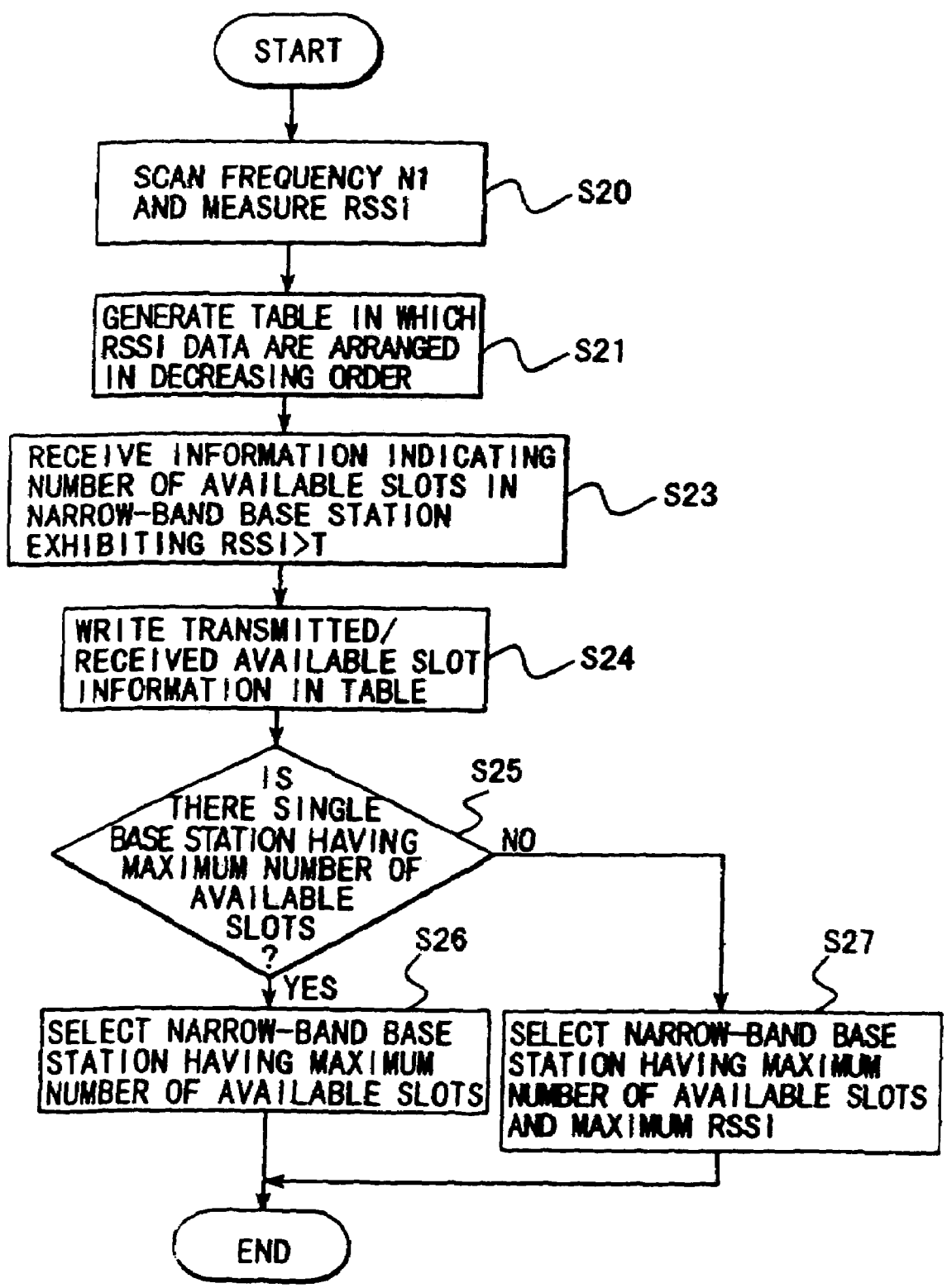
F I G. 46

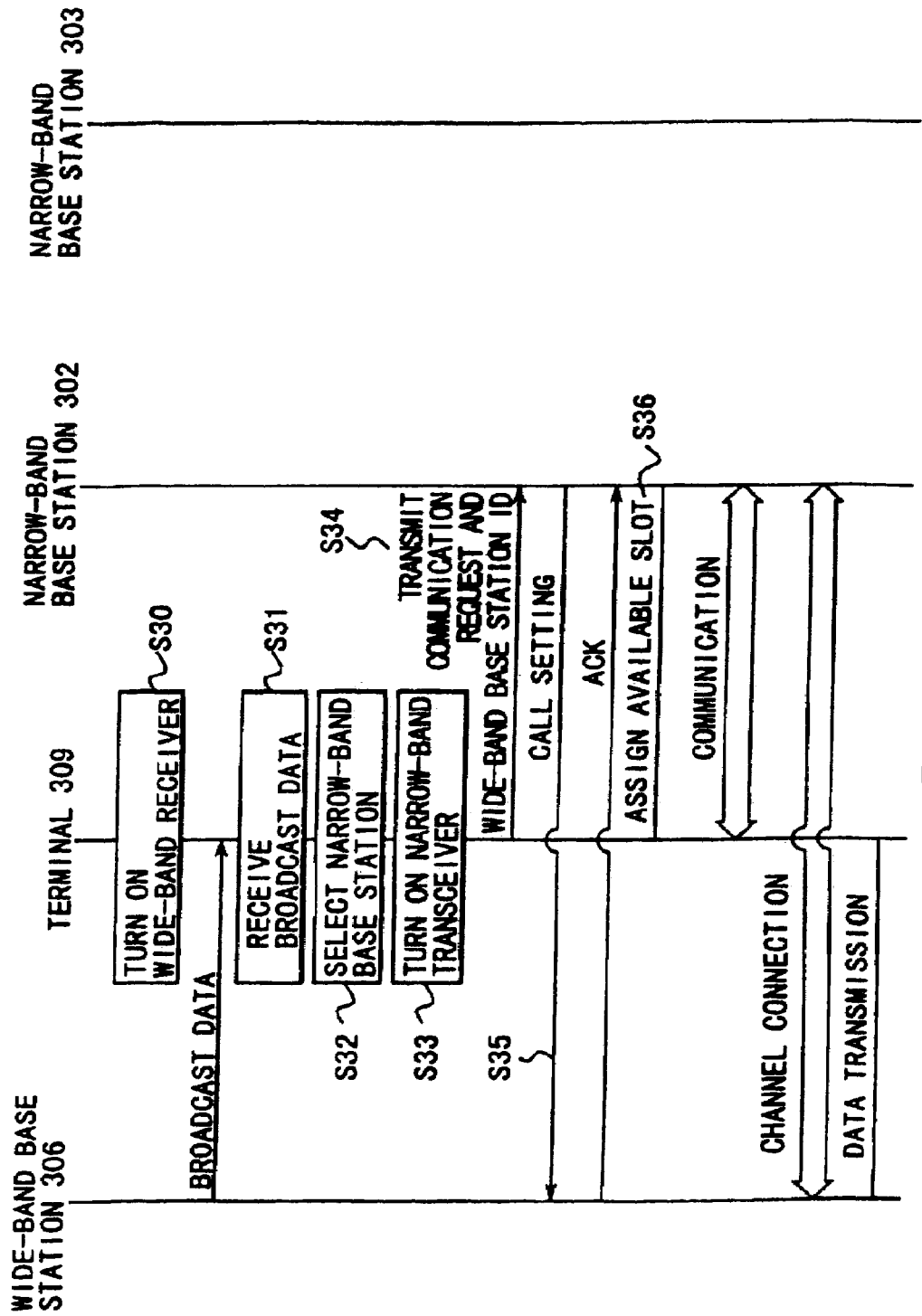
F I G. 47

RADIO COMMUNICATION SYSTEM

CROSS-REFERENCE TO RELATED APPLICATIONS

This application is a divisional of application Ser. No. 10/846,651, filed on May 17, 2004 now U.S. Pat. No. 6,999,438, which is a divisional of application Ser. No. 09/427,487, filed on Oct. 27, 1999, now abandoned, which is a divisional of application Ser. No. 08/784,526, filed Jan. 17, 1997, now abandoned, which claims priority to Japanese Patent Application No. 8-006665 filed Jan. 18, 1996, Japanese Patent Application No. 8-009531 filed Jan. 23, 1996, and Japanese Patent Application No. 8-009532 filed Jan. 23, 1996 the entire contents of each of which are incorporated herein by reference.

CROSS-REFERENCE TO A RELATED APPLICATION

This application is based upon and claims the benefit of priority under 35 USC §120 and is a divisional application of parent application Ser. No. 09/427,487, filed Oct. 27, 1999, which is a divisional application of Ser. No. 08/784,526, filed Jan. 17, 1997 and under 35 USC §119 from Japanese Patent Application Nos. 8-006665, filed Jan. 18, 1996; 8-009531, filed Jan. 23, 1996; and 8-009532, filed Jan. 23, 1996, the entire contents of which are incorporated herein by reference.

BACKGROUND OF THE INVENTION

The present invention relates to a transmission control method for a radio communication system and, more particularly, to a communication system which performs SDL (Super high speed Down Link) transmission in which down-link transmission can be performed through a radio channel at a higher speed than up-link transmission.

With the widespread use of compact, portable data processing and electronic instruments, communication functions have been added to these portable instruments, and services using various networks have been provided.

In general, as a communication means to be applied to a portable electronic instrument, a communication means allowing a user to easily communicate any information with anybody at any time in any place is desirable in consideration of the merits of portability.

As such a communication means, it is best to use a radio communication system such as a PHS (Personal Handyphone System; convenience portable telephone), or a mobile communication system (portable telephone or a mobile telephone system), which can be connected to a public network and for which many radio base stations are distributed. This system allows transmission/reception of data by radio communication between the radio base stations and the radio terminals within the service areas of the respective radio base stations.

In such a radio communication system, when a radio terminal transmits a communication request signal, the request signal is supplied to a radio base station through an up-link radio channel. With this operation, the radio base station assigns a communication channel to the radio terminal, so that the radio terminal can communicate with a destination terminal by using the communication channel through the radio base station. The radio terminal transmits data to the radio base station through an up-link radio channel. Data is transmitted from the radio base station to the radio terminal through a down-link radio channel.

In a radio communication system of this type, when a multimedia service such as picture communication as well as simple speech communication is to be realized, the amount of data greatly increases. In order to handle video picture data, a large amount of data must be transmitted within a short period of time. For this purpose, a wide-band channel is required. This means that high-speed transmission is required in terms of transmission speed in communication.

When a multimedia service such as VOD (Video On Demand) or digital electronic publication (newspapers, magazines, and books in electronic forms), in particular, is to be provided, the amount of data transmitted through a down-link radio channel is much larger than the amount of data transmitted through an up-link radio channel which is used to transmit only a request and an Ack message (acknowledgment message). For this reason, transmission must be performed at a much higher speed through a down-link radio channel than through an up-link radio channel.

This is because, small-volume data such as speech data and data for requesting information are transmitted through an up-link radio channel, whereas large-volume data such as picture and text data are transmitted through a down-link radio channel.

In a conventional radio communication system, however, the transmission speed in an up-link radio channel is equal to that in a down-link radio channel. That is, the transmission speed of a signal transmitted from a radio terminal is set to be equal to that of a signal received by the radio terminal.

According to the conventional idea of a system configuration, in order to realize a multimedia service in a radio communication system, the system must be designed to perform high-speed transmission between a radio base station and a radio terminal by using wide-band channels as up- and down-link radio channels.

However, high-speed transmission demands a radio wave in a high-frequency band, and hence very high power. In general, a portable instrument as a terminal side uses a battery as a power source. With an increase in power consumption, therefore, a recharging operation must be frequently performed on the terminal side, resulting in a deterioration in operability. As is apparent, the battery capacity of the terminal may be increased. If, however, the battery capacity is increased, the size and weight of the instrument increase as well as the cost.

An SDL system (Jpn. Pat. Appln. KOKAI Publication No. 6-137621) has been proposed as a radio communication system which solves such problems. In this SDL system, in order to reduce the power consumption, no wide-band transmission section (transmission section with high transmission speed) is arranged on the radio terminal side, and wide-band communication is limited to a reception function while transmission is performed as narrow-band communication (low transmission speed) with low power consumption. With this arrangement, up- and down-link communications can be performed while a decrease in power consumption of the terminal can be attained.

As described above, in order to realize a multimedia service by using a radio communication system, high-speed transmission must be performed between a radio base station and a radio terminal through a wide-band radio channel. However, high-speed transmission demands radio waves in a high-frequency band, and very high power.

As a technique for solving this problem, the SDL system has been proposed. As described above, in the SDL system, in order to reduce the power consumption, no wide-band transmission section (transmission section with high transmission speed) is arranged on the radio terminal side, and wide-band communication is limited to a reception function while transmission is performed as narrow-band communication (low transmission speed) with low power consumption. With this arrangement, up- and down-link communications can be performed while a decrease in power consumption of the terminal can be attained.

The narrow-band communication function may include a down-link (reception) channel as well as an up-link (transmission) channel, and battery supply control may be performed such that communication which does not require high-speed transmission is performed by using narrow-band up- and down-link radio channels, while the power to the wide-band reception section of the terminal is turned off. With this control, a further reduction in power consumption of the terminal can be attained.

If the narrow-band up- and down-link radio channels are used not only as radio channels for data transmission but also as channels for controlling data transmission using the wide-band down-link radio channel, efficient data transmission using the wide-band down-link radio channel can be realized.

No transmission control procedure, however, has been proposed, by which narrow-band up- and down-link radio channels are used for efficient data transmission using a wide-band down-link radio channel.

In the SDL system, since different transmission distances and different allowable error rates are required for transmission of narrow-band and wide-band signals, it is conceivable that the frequency of a radio carrier used for transmission of the narrow-band signal is lower than that used for transmission of the wide-band signal. In practice, when a radio transmitter for transmitting narrow-band signals is formed, harmonic components having frequencies higher than the frequency of a signal oscillated by an oscillator and used as a carrier transmitted from a modulator is generated owing to the nonlinear characteristics of the mixer, the power amplifier, and the like. These harmonic components are attenuated by the filter function of the duplexer (transmission/reception shared unit) so as not to be radiated from the antenna.

In an apparatus having a structure in which a narrow-band radio transceiver and a wide-band radio receiver are incorporated in the same housing, even if the above harmonic components are not radiated from the antenna, harmonic components may be received by the antenna or the low-noise amplifier, interconnections for connecting these components, or the like on the wide-band radio receiver side owing to electric or magnetic coupling, leakage, or the like in the housing.

If such a harmonic component has the same frequency as that of a carrier at the radio section or intermediate-frequency section of the wide-band radio receiver, a received wide-band signal may not be properly demodulated. Conventionally, when devices susceptible to electric or magnetic coupling are to be arranged nearby, in order to solve such a problem, the devices are isolated with insulators and surrounded with a shield. With this structure, the two devices are isolated from each other to obtain a high attenuation gain.

For this reason, in a terminal having both a narrow-band transceiver and a wide-band radio receiver, the weight and volume of the terminal increase owing to an additional unit for providing such isolation.

A radio terminal currently has a data processing function, an advanced display function, and the like and hence can use various services using various networks. For example, various types of data such as speech, data, a still picture, and a motion picture are transmitted through a radio channel. In order to allow radio transmission of such data by using one radio terminal, an optimal transmission scheme must be provided in accordance with the type of data to be transmitted. In transmitting such data by radio, the following two schemes can be used: a scheme of multiplexing data with one modulating signal or carrier, and a scheme of using different carriers in accordance with the attributes of data.

An RF amplifier is one of the factors that interfere with a reduction in the size of a radio terminal which should be compact. In order to reduce the size, cost, and power consumption of the RF amplifier, different frequencies or transmission schemes suitable for different types of data are preferably used.

If, however, different frequencies or transmission schemes are used, some data can be transmitted by radio but other data cannot be transmitted in the same environment. In other words, the types and qualities of services which can be provided vary.

This is because, service areas greatly vary in accordance with frequencies used, and power consumption also varies. Consequently, services which can be provided vary in accordance with the battery residual capacity. In addition, the types, qualities, times, and the like of services which can be provided when two radio terminals receive a communication service are greatly influenced by the types, number, and qualities of radio signals which can be received by the distant terminal and its battery residual capacity as well as the types, number, and qualities of radio signals which can be received by the self-terminal and its battery residual capacity. Conventionally, however, the types, qualities, and times of services which can be provided cannot be determined in consideration of the state of the distant terminal.

If, however, a user cannot know specific services of various available services which can be currently used and the current state of each service, the user can determine whether he/she can use a desired service only when he/she performs an operation for using the desired service. In addition, the user can determine whether a provided service is satisfactory or not, only after he/she uses the service. That is, the user uses services by trial and error, resulting in poor operability. Furthermore, the user must pay the charges for services. If, therefore, a service is not satisfactory, the cost is wasted. That is, it is uneconomical to use such a service. Although various services can be used, the user cannot know which service can be currently used and its current state. For this reason, even if an environment that allows anybody to use a radio terminal with advanced functions anytime is provided, anybody cannot always use the system easily, interfering with the popularization of the system.

Demands have therefore arisen for an easy-to-use radio system which allows users in various age groups to easily receive various services using radio terminals.

BRIEF SUMMARY OF THE INVENTION

It is the first object of the present invention to provide a radio communication system based on an SDL system and using a transmission control procedure for using optimal narrow-band up- and down-link radio channels to reduce the power consumption on the terminal side when communication using a wide-band down-link radio channel is required, and a transmission control method therefor.

It is a second object of the present invention to provide a communication system such as an SDL system, which can attain reductions in size and weight of an apparatus including both a narrow-band radio transmitter and a wide-band radio receiver by suppressing increases in weight and volume due to an additional unit for isolation.

It is a third object of the present invention to provide an easy-to-use radio system which allows users in various age groups to easily receive various services using radio terminals.

According to an aspect of the first object of the present invention, there is provided a transmission control procedure for efficiently performing data transmission through the wide-band down-link radio channel by using the narrow-band up- and down-link radio channels.

In order to receive data through the wide-band down-link radio channel, the radio terminal requires very high power. For this reason, in order to reduce the power consumption of the radio terminal, it is essential to reduce the amount of data that do not require the wide-band down-link radio channel.

According to another aspect of the first object of the present invention, there is provided a radio communication system which allows efficient position registration of a radio terminal with respect to a wide-band radio base station, and a transmission control procedure therefor, thereby attaining a reduction in power consumption of the radio terminal.

If handover (switching between narrow-band radio base stations during transmission through the wide-band down-link radio channel) occurs between the radio terminal and the narrow-band radio base station while the narrow-band up- and down-link radio channels are used to efficiently perform data transmission using the wide-band down-link radio channel, data transmission using the wide-band down-link radio channel cannot be controlled during handover processing, posing a problem.

According to still another aspect of the first object of the present invention, there is provided a radio communication system which can solve this problem.

In addition, if handover occurs between the radio terminal and the narrow-band radio base station or the channel is disconnected while the narrow-band up- and down-link radio channels are used to efficiently perform data transmission using the wide-band down-link radio channel, data transmission using the wide-band down-link radio channel cannot be controlled. Therefore, data transmission cannot be performed by using the wide-band down-link radio channel.

It is totally meaningless and wasteful to transmit data from the server to the wide-band radio base station. Similarly, when the received signal strength indicator of data transmitted from the wide-band radio base station is too low to allow the radio terminal to receive the data, it is also totally meaningless and wasteful to transmit data from the server to the wide-band radio base station.

According to another aspect of the first object of the present invention there is provided a radio communication system which can solve this problem.

If communication using the narrow-band up- and down-link radio channels is disabled while the narrow-band up- and down-link radio channels are used to efficiently perform data transmission using the wide-band down-link radio channel, the wide-band radio base station cannot transmit any data to the radio terminal. In this case, the data stored in the buffer in the wide-band radio base station and addressed to the radio terminal becomes totally useless.

According to another aspect of the first object of the invention there is provided a radio communication system which can solve this problem.

Since data transmission using the wide-band down-link radio channel exhibits burst-like traffic characteristics, the narrow-band up- and down-link radio channels for controlling such data transmission also exhibit burst-like traffic characteristics. In this condition, another narrow-band radio base station near a given narrow-band radio base station may assign the same channel as that assigned to a given radio terminal to another radio terminal. As a result, channel interference occurs.

According to another aspect of the first object of the invention there is provided a radio communication system which can solve this problem.

In order to use the narrow-band up- and down-link radio channels as channels for efficient data transmission using the wide-band down-link radio channel, it is essential to associate the narrow-band up- and down-link radio channels with the wide-band down-link radio channel.

According to another aspect of the first object of the present invention there is provided a radio communication system which can efficiently associate the narrow-band up- and down-link radio channels with the wide-band down-link radio channel.

According to a first aspect of the present invention, there is provided a transmission control procedure for efficiently performing data transmission through a wide-band down-link radio channel by using narrow-band up- and down-link radio channels, and there is provided a radio communication system comprising a narrow-band radio base station having narrow-band transmission/reception means for data transmission, a wide-band radio base station having wide-band transmission means for data transmission, and a radio terminal having narrow-band transmission/reception means for transmitting/receiving data to/from the narrow-band radio base station and wide-band reception means for receiving data from the wide-band radio base station, wherein when the radio terminal is to receive data from the wide-band radio base station, a channel for transmission/reception of data to/from the narrow-band radio base station is assigned to the radio terminal in advance.

According to the second aspect of the present invention, it is directed to provide a radio communication system which allows efficient position registration of a radio terminal with respect to a wide-band radio base station, and a transmission control procedure so as to reduce the power consumption of the radio terminal, and there is provided a radio communication system comprising a narrow-band radio base station having narrow-band transmission/reception means for data transmission, a wide-band radio base station having wide-band transmission means for data transmission, a server for providing a predetermined service, and a radio terminal having narrow-band transmission/reception means for transmitting/receiving data to/from the narrow-band radio base station and wide-band reception means for receiving data from the wide-band radio base station, wherein the wide-band radio base station includes means for notifying the narrow-band radio base station or the server of a channel which can be used by the self-terminal, and the narrow-band radio base station or the server includes determination means for permitting the wide-band radio base station to use at least one of channels which can be used by the wide-band radio base station, notification means for notifying the wide-band radio base station of a determination result obtained by the determination means, and storage means for storing the determination result obtained by the determination means.

If handover occurs between the radio terminal and the narrow-band radio base station while the narrow-band up- and down-link radio channels are used to efficiently perform data transmission using the wide-band down-link radio channel, data transmission using the wide-band down-link radio channel cannot be controlled during handover processing. According to the third aspect of the present invention, therefore, there is provided a radio communication system comprising a narrow-band radio base station having narrow-band transmission/reception means for data transmission, a wide-band radio base station having wide-band transmission means for data transmission, and a radio terminal having narrow-band transmission/reception means for transmitting/receiving data to/from the narrow-band radio base station and wide-band reception means for receiving data from the wide-band radio base station, wherein the radio terminal measures a received signal strength indicator of a signal transmitted from the narrow-band radio base station, and performs handover processing for the narrow-band radio base station when the measurement result is lower than a predetermined handover threshold level, and the radio terminal changes the handover threshold level when data is received from the wide-band radio base station.

If handover occurs between the radio terminal and the narrow-band radio base station while the narrow-band up- and down-link radio channels are used to efficiently perform data transmission using the wide-band down-link radio channel, data transmission using the wide-band down-link radio channel cannot be controlled during handover processing. According to the fourth aspect of the present invention, therefore, there is provided a radio communication system comprising a narrow-band radio base station having narrow-band transmission/reception means for data transmission, a wide-band radio base station having wide-band transmission means for data transmission, and a radio terminal having narrow-band transmission/reception means for transmitting/receiving data to/from the narrow-band radio base station and wide-band reception means for receiving data from the wide-band radio base station, wherein the radio terminal measures a received signal strength indicator of a signal transmitted from the narrow-band radio base station, performs handover processing for the narrow-band radio base station when the measurement result is lower than a predetermined handover threshold level, and performs the handover processing when no data is received from the wide-band radio base station.

If handover occurs between the radio terminal and the narrow-band radio base station or the channel is disconnected while the narrow-band up- and down-link radio channels are used to efficiently perform data transmission using the wide-band down-link radio channel, data transmission using the wide-band down-link radio channel cannot be controlled. Therefore, data transmission cannot be performed by using the wide-band down-link radio channel. It is totally meaningless and wasteful to transmit data from the server to the wide-band radio base station. Similarly, when the received signal strength indicator of data transmitted from the wide-band radio base station is too low to allow the radio terminal to receive the data, it is also totally meaningless and wasteful to transmit data from the server to the wide-band radio base station. According to the fourth aspect of the present invention, therefore, there is provided a radio communication system comprising a narrow-band radio base station having narrow-band transmission/reception means for data transmission, a wide-band radio base station having wide-band transmission means for data transmission, a server for providing a predetermined service through the radio base stations, and a radio terminal having narrow-band transmission/reception means for transmitting/receiving data to/from the narrow-band radio base station and wide-band reception means for receiving data from the wide-band radio base station, wherein the radio terminal measures a received signal strength indicator of a signal transmitted from the narrow-band radio base station, and transmits a signal for stopping data transmission from the server to the wide-band radio base station when the measurement result is lower than a predetermined threshold level.

If communication using the narrow-band up- and down-link radio channels is disabled while the narrow-band up- and down-link radio channels are used to efficiently perform data transmission using the wide-band down-link radio channel, the wide-band radio base station cannot transmit any data to the radio terminal. In this case, the data stored in the buffer in the wide-band radio base station and addressed to the radio terminal becomes totally useless. According to the fifth aspect of the present invention, therefore, there is provided a radio communication system comprising a narrow-band radio base station having narrow-band transmission/reception means for data transmission, a wide-band radio base station having wide-band transmission means for data transmission and storage means for storing data, and a radio terminal having narrow-band transmission/reception means for transmitting/receiving data to/from the narrow-band radio base station and wide-band reception means for receiving data from the wide-band radio base station, wherein the data stored in the storage means and addressed to the radio terminal is erased when at least one of data transmission from the wide-band radio base station to the radio terminal and data transmission between the narrow-band radio base station and the radio terminal is disabled.

Since data transmission using the wide-band down-link radio channel exhibits burst-like traffic characteristics, the narrow-band up- and down-link radio channels for controlling such data transmission also exhibit burst-like traffic characteristics. In this condition, another narrow-band radio base station near a given narrow-band radio base station may assign the same channel as that assigned to a given radio terminal to another radio terminal. As a result, channel interference occurs. According to the sixth aspect of the present invention, therefore, there is provided a radio communication system comprising a narrow-band radio base station having narrow-band transmission/reception means for data transmission, a wide-band radio base station having wide-band transmission means for data transmission, and a radio terminal having narrow-band transmission/reception means for transmitting/receiving data to/from the narrow-band radio base station and wide-band reception means for receiving data from the wide-band radio base station, wherein a frame is constituted by a plurality of time slots obtained by equally time-dividing a radio channel between the narrow-band radio base station and the radio terminal, and the radio terminal which receives data from the wide-band radio base station uses a specific time slot of the plurality of time slots to transmit/receive data to/from the narrow-band radio base station.

According to the seventh aspect of the present invention, there is provided a radio communication system comprising a narrow-band radio base station having narrow-band transmission/reception means for data transmission, a wide-band radio base station having wide-band transmission means for data transmission, and a radio terminal having narrow-band transmission/reception means for transmitting/receiving data to/from the narrow-band radio base station and wide-band reception means for receiving data from the wide-band radio base station, wherein a first frame is constituted by a plurality of first time slots obtained by equally time-dividing a radio channel between the narrow-band radio base station and the radio terminal, and a second frame is constituted by a plurality of second time slots obtained by equally time-dividing a radio channel from the wide-band radio base station to the radio terminal, the second frame having a time length which is an integer multiple of a time length of the first frame.

According to the eighth aspect of the present invention, there is provided a radio communication system comprising a narrow-band radio base station having narrow-band transmission/reception means for data transmission, a wide-band radio base station having wide-band transmission means for data transmission, and a radio terminal having narrow-band transmission/reception means for transmitting/receiving data to/from the narrow-band radio base station and wide-band reception means for receiving data from the wide-band radio base station, wherein a first frame is constituted by at least one first time slot obtained by equally time-dividing a radio channel between the narrow-band radio base station and the radio terminal, a second frame is constituted by at least one second time slot obtained by equally time-dividing a radio channel from the wide-band radio base station to the radio terminal, the first and second time slots corresponding to each other, and the second time slot corresponding to at least one first time slot is assigned to the radio terminal when the radio terminal, to which at least one first time slot is assigned, is to receive data from the wide-band radio base station.

According to the ninth aspect of the present invention, there is provided a radio communication system comprising a narrow-band radio base station having narrow-band transmission/reception means for data transmission, a wide-band radio base station having wide-band transmission means for data transmission, and a radio terminal having narrow-band transmission/reception means for transmitting/receiving data to/from the narrow-band radio base station and wide-band reception means for receiving data from the wide-band radio base station, wherein a first frame is constituted by at least one first time slot obtained by equally time-dividing a radio channel between the narrow-band radio base station and the radio terminal, a second frame is constituted by at least one second time slot obtained by equally time-dividing a radio channel from the wide-band radio base station to the radio terminal, and the narrow-band radio base station uses the first time slot to notify the wide-band radio base station of at least one of the second time slot used by the wide-band radio base station and the radio terminal as a destination, when the wide-band radio base station is to transmit data.

According to the 10th aspect of the present invention, there is provided a radio communication system comprising a narrow-band radio base station having narrow-band transmission/reception means for data transmission, a wide-band radio base station having wide-band transmission means for data transmission, and a radio terminal having narrow-band transmission/reception means for transmitting/receiving data to/from the narrow-band radio base station and wide-band reception means for receiving data from the wide-band radio base station, wherein a first frame is constituted by at least one first time slot obtained by equally time-dividing a radio channel between the narrow-band radio base station and the radio terminal, a second frame is constituted by a plurality of second time slots obtained by equally time-dividing a radio channel from the wide-band radio base station to the radio terminal, and the narrow-band radio base station notifies the wide-band radio base station of a start time of the first frame by using a channel permanently assigned between the narrow-band radio base station and the wide-band radio base station.

The radio terminal which is to receive data from the server through the wide-band down-link radio channel transmits a data request signal through the narrow-band up-link radio channel by radom access. Upon reception of this request, the narrow-band radio base station assigns the narrow-band up- and down-link radio channels to the radio terminal. The data request signal is sent to the server through the network. The server instructs the wide-band radio base station to assign the wide-band down-link radio channel to the radio terminal after the narrow-band up- and down-link radio channels are assigned to the radio terminal. Upon reception of this instruction, the wide-band radio base station assigns the wide-band down-link radio channel to the radio terminal. With this operation, the radio terminal can receive data from the server through the wide-band down-link radio channel. In addition, since the narrow-band up- and down-link radio channels can be used as control channels for controlling data transmission using the wide-band down-link radio channel, data transmission can be efficiently performed by using the wide-band down-link radio channel.

According to the present invention, assignment of the first and second time slots, the start times of the first and second frames, or the transmission time set in the terminal is controlled to inhibit the terminal from causing the narrow-band transmission/reception means to transmit a control signal in the first time slot of a period during which the terminal receives data through the wide-band reception means in the second time slot.

According to the present invention, in an arrangement in which a narrow-band radio transceiver and a wide-band radio receiver are incorporated in the same housing such as a terminal, in order to prevent increases in weight and volume of the terminal due to a shield or the like between the narrow-band radio transceiver and the wide-band radio receiver while preventing harmonic components generated by a narrow-band radio transmitter from affecting the reception of a wide-band signal, it is essential to inhibit transmission of a narrow-band signal from the terminal while a wide-band radio base station transmits a wide-band signal to the terminal. For this purpose, assignment of the first and second time slots, the start times of the first and second frames, or the transmission time set in the terminal is controlled to inhibit the terminal from causing the narrow-band transmission/reception means to transmit a control signal in the first time slot of a period during which the terminal receives data through the wide-band reception means in the second time slot.

With this control, no narrow-band signal is transmitted during a reception period of a wide-band signal. For this reason, harmonic components generated by the narrow-band radio transmitter have no influence on the reception of a wide-band signal, thereby preventing increases in weight and volume of the terminal due to a shield or the like.

According to the present invention, in a radio apparatus having one or a plurality of receivers corresponding to a communication scheme using one or a plurality of types of radio signals and serving to receive one or a plurality of types of radio signals, notification means is arranged to notify at least one of a type, quality, and time of a service which can be provided by radio.

This arrangement allows anybody to easily recognize the types, qualities, times, and the like of services which can be provided, thereby greatly improving the operability of the apparatus.

According to the 11th aspect of the present invention, there is provided a radio communication system in which a narrow-band radio base station for providing narrow-band up- and down-link radio channels having the same band width and a wide-band radio base station for providing a wide-band down-link radio channel having a band width larger than that of the narrow-band radio channel are connected to a network so as to communicate with each other, and a radio communication terminal communicates with the network through the narrow-band radio base station and the wide-band radio base station by using the bidirectional radio channels and the wide-band down-link radio channel, establishes a link for a physical layer, a data link layer, and a third layer for the narrow-band up- and down-link radio channels when starting communication, generates a request for radio channel connection using a new narrow-band up-link radio channel and a new wide-band down-link radio channel through the narrow-band bidirectional radio channels which have been established, and establishes a link for a physical layer, a data link layer, and a third layer for the narrow-band up-link radio channel and the wide-band down-link radio channel after the wide-band down-link radio channel is assigned, thereby performing call setting between the radio communication terminal and the server without using the wide-band down-link radio channel.

According to the 12th aspect of the present invention, there is provided a call control method for a communication system in which a narrow-band radio base station for providing narrow-band up- and down-link radio channels for a radio-communication terminal, a wide-band radio base station for providing a wide-band down-link radio channel having a band width larger than that of the narrow-band radio channel, and a server are connected to a network so as to communicate with each other, and the radio communication terminal, which is connected to the network through the bidirectional radio channels and the wide-band down-link radio channel, communicates with the server through the narrow-band bidirectional radio channels to receive desired data from the server through the wide-band down-link radio channel, wherein in performing call control between the radio communication terminal and the server, the radio communication terminal establishes narrow-band bidirectional radio channels by performing call setting with respect to the narrow-band radio base station, and transmits a call setting request to the server through the narrow-band bidirectional radio channels; and in response to this request, the server transmits, to the wide-band radio base station, a request for setting a call between the radio communication terminal and the server, assigns the wide-band down-link radio channel to the terminal, and sets a call between the radio communication terminal and the server, thereby performing call setting between the radio communication terminal and the server without using the wide-band down-link radio channel.

According to the 13th aspect of the present invention, there is provided a radio channel assignment method in which each of a plurality of radio base stations performs multiple address transmission of multiple address data to a terminal in a service area through a predetermined radio channel, the multiple address data containing at least identification data of the self-station and data indicating the number of available radio channels which can be used for communication, the terminal receives the radio channel used for multiple address transmission of the multiple address data, and selects one of the plurality of radio base stations which can perform communication, on the basis of a received signal strength indicator level of the radio channel and the data indicating the number of available radio channels and contained in the multiple address data, and the selected radio base station assigns a radio channel to the terminal in response to a radio channel assignment request therefrom, thereby allowing a terminal present in an overlapping area between service areas of a plurality of radio base stations to easily and reliably search for a base station capable of communication, and preventing an intensive increase in traffic in a given radio base station and a deterioration in telephone service quality due to the intensive increase in traffic.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL
VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a block diagram showing the schematic arrangement of a radio terminal in the communication system of the present invention;

FIG. 3 is a view showing the format of a frame in narrow-band up- and down-link radio channels according to the present invention;

FIG. 4 is a flow chart for explaining the first embodiment of the present invention;

FIG. 5 is a flow chart for explaining the first embodiment of the present invention;

FIG. 7 is a view showing the format of a frame to explain the second embodiment of the present invention;

FIG. 8 is a view showing the format of a frame to explain the second embodiment of the present invention;

FIG. 9 is a view showing the format of a frame to explain the second embodiment of the present invention;

FIGS. 10A and 10B are views showing the format of a frame to explain the second embodiment of the present invention;

FIGS. 11A and 11B are block diagrams for explaining the third embodiment of the present invention;

FIGS. 16A and 16B are views for briefly explaining a radio terminal and a pair of a terminal module and a terminal according to the fourth embodiment of the present invention;

FIG. 23 is a block diagram showing the schematic arrangement of a radio terminal according to the fifth embodiment of the present invention;

FIG. 24 is a block diagram showing the schematic arrangement of a terminal module according to the fifth embodiment of the present invention;

FIG. 43 is a block diagram showing the schematic arrangement of a radio communication terminal;

FIG. 44 is a view showing the format of a table to be stored, which is referred to by the controller of the radio communication terminal to select a narrow-band radio base station;

FIG. 45 is a view for explaining an operation of assigning a radio channel to the radio communication terminal in the communication system in FIG. 42;

FIG. 46 is a flow chart for explaining how the radio terminal communication terminal selects a narrow-band radio base station; and FIG. 47 is a view for explaining another operation of assigning a radio channel to the radio communication terminal in the communication system in FIG. 42 according to the 11th embodiment of the present invention.

DETAILED DESCRIPTION OF THE INVENTION

Embodiments of the present invention will be described below.

Figure 1:
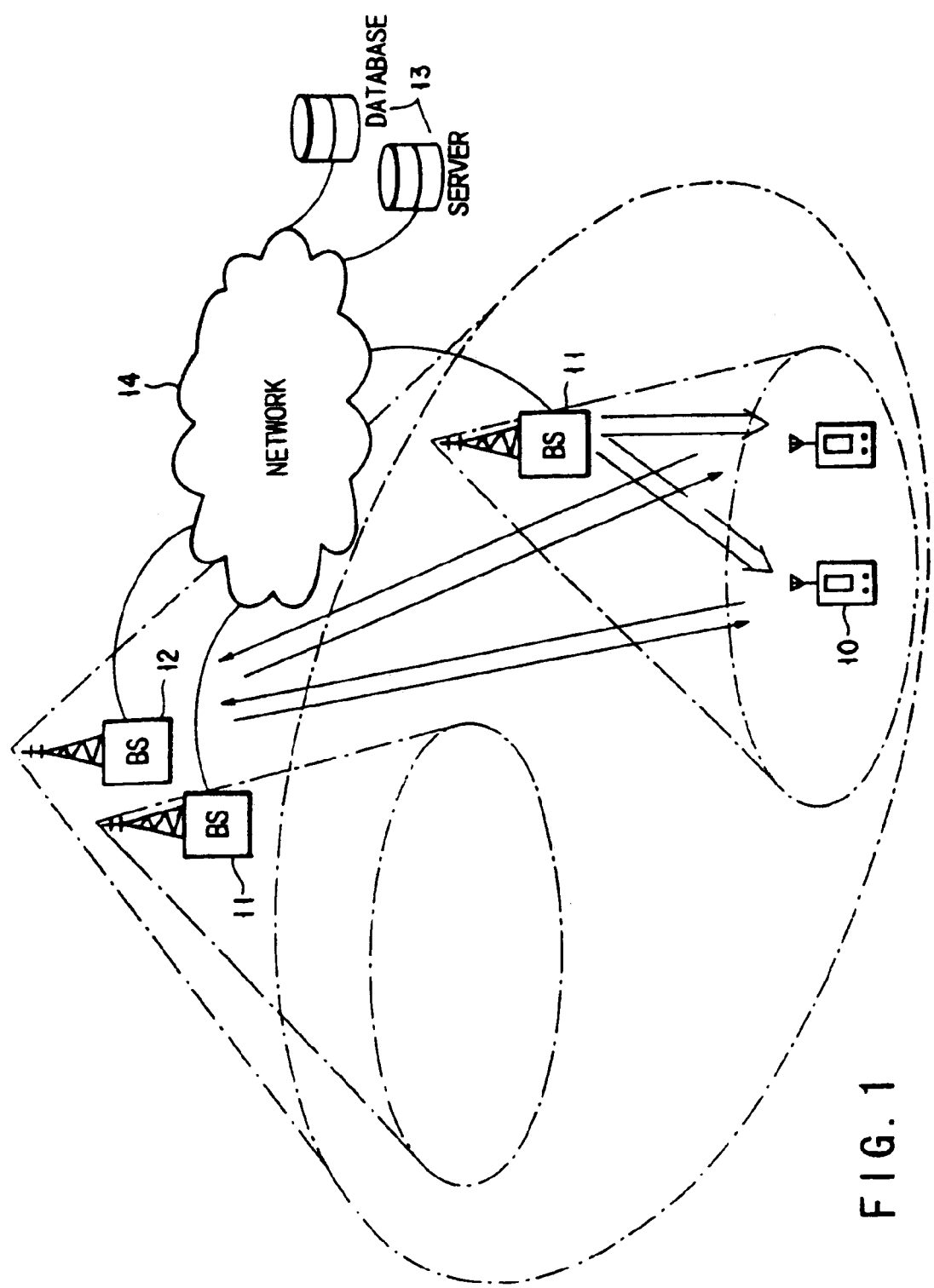
FIG. 1 is a view showing the arrangement of a radio communication system according to the present invention.

The arrangement of a radio communication system required to realize the present invention will be described below. FIG. 1 is a schematic view showing the arrangement of a communication system according to the present invention, exemplifying an SDL system.

Referring to FIG. 1, radio terminals (radio mobile stations) 10, wide-band radio base stations 11, and a narrow-band radio base station 12 constitute the communication system. A server or database 13 stores a large amount of data and provides predetermined services, e.g., providing data. The wide-band radio base station 11, the narrow-band radio base station 12, and the server 13 are connected to each other through a network 14.

The wide-band radio base station 11 is a base station having a radio transmitter based on a wide-band radio channel (radio channel capable of high-speed transmission). The wide-band radio base station 11 does not have a wide-band receiver. The wide-band radio base station 11 is designed to perform wide-band transmission, and hence uses a high frequency. Consequently, the service area is narrow.

The narrow-band radio base station 12 is a base station having a radio transceiver based on a narrow-band radio channel (low-speed radio channel). The narrow-band radio base station 12 is designed to perform narrow-band transmission, and hence can operate on low power in a wide service area.

As shown in FIG. 2, the radio terminal 10 includes a wide-band radio receiver 10a, a narrow-band radio transceiver 10b, a controller 10c for performing various control operations, and antennas 10d and 10e. However, the radio terminal 10 has no wide-band radio channel transmitter. That is, the radio terminal 10 serving as a radio mobile station is a terminal which can transmit/receive data to/from the narrow-band radio base station 12 through the radio transceiver 10b, but can only receive data from the wide-band radio base station 11 because the terminal has only the receiver 10a for wide-band communication.

Assume that in this embodiment, data transmission between the radio terminal 10 and the narrow-band radio base station 12 is performed by a time division multiple access scheme. In this case, the time division multiple access scheme is a technique of dividing a frequency channel according to time domains to prevent signals from overlapping along the time axis, thereby allowing a plurality of radio terminals 10 to use the same frequency channel. In this technique, a frame (constant time length) serving as a fundamental period for signal transmission/reception is determined, and a signal is transmitted by using a time position (to be referred to as a time slot hereinafter) assigned in this frame.

In the time division multiple access scheme, therefore, "assigning a channel to the radio terminal 10 to allow data transmission between the terminal and the narrow-band radio base station 12" means "assigning a time slot to the radio terminal 10".

The format of a frame to be transmitted between the radio terminal 10 and the narrow-band radio base station 12 will be briefly described below.

As shown in FIG. 3, a frame 20 is divided into eight time slots 21a to 21h. Of these time slots, the first four time slots 21a to 21d are used for a down-link radio channel (for transmission from the narrow-band radio base station 12 to the radio terminal 10), and the second four time slots 21e to 21h are used for up-link radio channels (for transmission from the radio terminal 10 to the narrow-band radio base station 12).

Of the time slots 21a to 21h, the time slots 21a and 21e, 21b and 21f, 21c and 21g, and 21d and 21h are paired. Each pair is used as a pair of up- and down-link time slots. The time slots 21a and 21e are used as control time slots for, e.g., random access and response (acknowledgment message) thereto, and the time slots 21b to 21d and 21f to 21h are used as communication time slots for transmission of speech data and small-volume data.

Referring to FIG. 1, for the sake of descriptive convenience, the wide-band radio base station 11 and the narrow-band radio base station 12 are separately arranged. However, one radio base station may include both a transceiver for narrow-band data transmission and a transmitter for wide-band data transmission. In this case, although the cost of each radio base station increases, the total number of radio base stations in the system can be decreased. In addition, another merit of this arrangement is that control between the transceiver for narrow-band data transmission and the transmitter for wide-band data transmission is facilitated, if it is required.

An embodiment of the present invention will be described below with reference to FIG. 1, which shows the arrangement in which the wide-band radio base stations 11 and the narrow-band radio base station 12 are distributed as separate radio base stations. Assume that the radio terminal 10 is located in both the service areas of the narrow-band radio base station 12 and the wide-band radio base station 11 so that the radio terminal 10 can transmit/receive data to/from the narrow-band radio base station 12, and can receive data from the wide-band radio base station 11.

The embodiment of the present invention which is associated with a transmission control procedure for a radio communication system having such a system configuration will be described below.

It is an object of the first embodiment to provide a transmission control procedure for efficiently performing data transmission by using narrow-band up- and down-link radio channels and a wide-band down-link radio channel.

In order to receive data through the wide-band down-link radio channel, the radio terminal requires very high power. In order to reduce the power consumption of the radio terminal, therefore, it is necessary to decrease the amount of data that requires the use of the wide-band down-link radio channel. It is therefore another object of the first embodiment to provide a radio communication system which efficiently registers the position of a radio terminal with respect to a wide-band radio base station, and a transmission control procedure therefor, thereby reducing the power consumption of the radio terminal.

Assume that handover occurs between a radio terminal and a narrow-band radio base station while narrow-band up- and down-link radio channels are used to efficiently perform data transmission using a wide-band down-link radio channel. In this case, data transmission using the wide-band down-link radio channel cannot be controlled during handover processing, posing a problem. The first embodiment also aims at solving this problem.

In addition, assume that handover occurs between a radio terminal and a narrow-band radio base station or channel disconnection occurs while narrow-band up- and down-link radio channels are used to efficiently perform data transmission using a wide-band down-link radio channel. In this case, since data transmission using the wide-band down-link radio channel cannot be controlled, data transmission cannot be performed by using the wide-band down-link radio channel.

It is totally meaningless and wasteful to transmit data from the server to the wide-band radio base station in such a situation. Similarly, when the received signal strength indicator of data transmitted from the wide-band radio base station is too low to allow the radio base station to receive the data, it is also totally meaningless and wasteful to transmit data from the server to the wide-band radio base station. The first embodiment also aims at solving this problem.

Assume that communication using the narrow-band up- and down-link radio channels cannot be performed while the narrow-band up- and down-link radio channels are used to efficiently perform data transmission using the wide-band down-link radio channel. In this case, the wide-band radio base station cannot transmit data to the radio terminal. In such a case, the data stored in the buffer in the wide-band radio base station and addressed to the radio terminal is wasted. The first embodiment also aims at solving this problem.

Furthermore, data transmission using the wide-band down-link radio channel exhibits burst-like traffic characteristics. Therefore, the narrow-band up- and down-link radio channels for controlling the above data transmission also exhibit burst-like traffic characteristics. In such a situation, another narrow-band radio base station near the above base station assigns an identical channel to another radio terminal. As a result, inter-channel interference (i.e., interference between channels) occurs. The first embodiment therefore aims at solving this problem.

The first embodiment will be described in detail below.

In order to receive data from the server 13 through the wide-band down-link radio channel, the radio terminal 10 transmits a data request signal by random access using the time slot 21e. If random access is successful, and the data request signal is properly received by the narrow-band radio base station 12, the narrow-band radio base station 12 assigns a communication time slot to the radio terminal 10. Alternatively, a call connection request signal is transmitted by random access. The link connection request signal is properly received by the narrow-band radio base station 12, and a communication time slot is assigned. Thereafter, the radio terminal 10 transmits a data request signal.

Communication time slot assignment methods roughly classified into two methods. The first assignment method is a method of assigning different time slots as a time slot used to perform communication through a wide-band down-link radio channel and a time slot used to perform communication (e.g., speech communication) using no wide-band down-link radio channel but using only the narrow-band up- and down-link radio channels. The second assignment method is a method of assigning the same time slot as a time slot used to perform communication through the wide-band down-link radio channel, and a time slot used to perform communication using only the narrow-band up- and down-link radio channels. That is, one time slot is shared.

The first assignment method will be described in detail first.

The narrow-band radio base station 12 checks the presence/absence of available time slots. If there are available time slots, the narrow-band radio base station 12 assigns an appropriate time slot, of these time slots, to the radio terminal 10, and notifies the radio terminal 10 of the assignment result by using the time slot 21a. If there is no available time slot, the narrow-band radio base station 12 uses the time slot 21a to notify the radio terminal 10 that the service cannot be provided. Upon reception of this notification, the radio terminal 10 transmits a data request signal or link connection request signal after the lapse of a given period of time. Alternately, the narrow-band radio base station 12 uses the time slot 21a to notify the radio terminal 10 that the terminal must wait its turn for reception of the service.

Upon accepting this offer, the radio terminal 10 uses the time slot 12e to transmit a signal representing that the terminal will wait its turn for reception of the service, and waits for assignment of a communication time slot from the narrow-band radio base station 12. When an available time slot occurs, the narrow-band radio base station 12 assigns the time slot to the radio terminal 10 and notifies the radio terminal 10 of the assignment result by using the time slot 21a.

The narrow-band radio base station 12 then executes the following procedure to assign a wide-band down-link channel to the radio terminal 10 to which the communication time slot has been assigned.

First of all, the narrow-band radio base station 12 sends the data request signal to the server 13. The server 13 checks whether position registration has been performed for the radio terminal 10 with respect to the wide-band radio base station 11. If position registration has been performed, the server 13 instructs the wide-band radio base station 11 to assign a wide-band down-link radio channel to the radio terminal 10. If position registration has not been performed, the wide-band radio base station 11 assigns a wide-band down-link radio channel after position registration.

The wide-band radio base station 11 includes a notification section 15 (110) for notifying the narrow-band radio base station 12 or the server 13 of all the frequencies that can be used by the self-station. The narrow-band radio base station 12 or the server 13 includes a determining section 16 (111) for giving the wide-band radio base station 11 a permission to use a specific frequency, a notification section 17 (112) for notifying the wide-band radio base station 11 of the frequency for which the permission to use is given, and a storage section 18 (113) for storing the frequency for which the permission to use is given. With this system configuration, position registration for the wide-band radio base station 11 can be efficiently performed.

The procedure will be described in detail below.

First of all, the wide-band radio base station 11 checks the presence/absence of frequencies that can be used. The wide-band radio base station 11 then causes the notification section 15 to notify the narrow-band radio base station 12 or the server 13 of the check result.

Upon reception of this notification, the narrow-band radio base station 12 or the server 13 causes the determining section 16 to given the wide-band radio base station 11 a permission to use a specific frequency, and causes the notification section 17 to notify the wide-band radio base station 11 of the result. In addition, the narrow-band radio base station 12 or the server 13 stores the result in the storage section 18. The above procedure is periodically repeated to update the stored data.

With this operation, the wide-band radio base station 11 can recognize the frequency that the self-station is permitted to use. In addition, the narrow-band radio base station 12 or the server 13 can store the frequency that is used by the wide-band radio base station 11.

In this state, when the radio terminal 10 needs to perform position registration with respect to the wide-band radio base station 11, the narrow-band radio base station 12 uses a narrow-band down-link radio channel to notify the radio terminal 10 of the frequency that is used by the wide-band radio base station 11 located within the service area of the narrow-band radio base station 12.

The wide-band radio base station 11 notifies a signal (to be referred to as a base station ID hereinafter) for identifying the self-station by using the frequency that the station is permitted to use. The radio terminal 10 scans only the frequency that is notified through the narrow-band down-link radio channel and used by the wide-band radio base station 11 to receive the base station ID from the wide-band radio base station 11, thereby performing position registration. With this operation, the radio terminal 10 need not scan all the frequencies to receive the base station ID, and hence an efficient position registration procedure can be realized. As described above, the wide-band radio base station notifies the narrow-band radio base station or the server of the frequencies that can be used, and the narrow-band radio base station or the server selects one of these frequencies and permits the use thereof. The wide-band radio base station uses the permitted frequency to notify a signal (base station ID) for identifying the self-station. If the radio terminal needs to perform position registration with respect to the wide-band radio base station, the narrow-band radio base station uses a narrow-band down-link radio channel to notify the radio terminal of the frequency that is used by the wide-band radio base station located within the service area of the self-station. The radio terminal scans only the frequency that is obtained through the narrow-band down-link channel and used by the wide-band radio base station to receive the base station ID, thereby performing position registration.

With this operation, in order to receive the base station ID from the wide-band radio base station, the radio terminal 10 need not scan all the frequencies used by the wide-band radio base station but may receive and monitor only a specific frequency, thereby realizing an efficient position registration procedure.

In the above case, in order to efficiently perform position registration with respect to the wide-band radio base station 11, the wide-band radio base station 11 notifies the radio terminal 10 of the frequency to be used. However, instead of the frequency, the timing (e.g., a time slot) of notifying a base station ID may be supplied to the radio terminal 10. In this method, the wide-band radio base station 11 may include a means for notifying the narrow-band radio base station 12 or the server 13 of the time slots that can be used by the self-station, whereas the narrow-band radio base station 12 or the server 13 may include a section for giving the wide-band radio base station 11 a permission to use a specific time slot, a section for notifying the wide-band radio base station 11 of the time slot for which the permission to use is given, and a section for storing the time slot for which the permission to use is given. Since the detailed procedure is the same as that in the above method, a repetitive description thereof will be avoided.

This method allows the radio terminal 10 to receive a base station ID in only a specific time slot that is designated. In other time slots, the power to the receiver can be turned off, thus realizing a reduction in the power consumption of the radio terminal 10.

Furthermore, position registration can be performed more efficiently by using a method of notifying the radio terminal 10 of both the frequency and the time slot that are to be used.

When a code division multiple access scheme is to be used in a wide-band down-link radio channel, the wide-band radio base station 11 may include a section for notifying the narrow-band radio base station 12 or the server 13 of the codes that can be used by the self-station, and the narrow-band radio base station 12 or the server 13 may include a section for giving the wide-band radio base station 11 a permission to use a specific code, a section for notifying the wide-band radio base station 11 of the code for which the permission to use is given, and a section for storing the code for which the permission to use is given. Since the detailed procedure is the same as that in the above method, a repetitive description will be avoided.

Upon receiving the instruction to assign a wide-band down-link radio channel from the server 13 or the narrow-band radio base station 12 in this manner, the wide-band radio base station 11 assigns a wide-band down-link radio channel to the radio terminal 10, and notifies the radio terminal 10 of the assignment result by using the communication time slot that has been assigned to the radio terminal 10.

In this manner, a wide-band down-link radio channel can be assigned to the radio terminal 10, to which the narrow-band up- and down-link radio channels (time slots) have been assigned. With this operation, when the radio terminal 10 transmits a data transmission request to the server by using the narrow-band up-link radio channel, the server transmits the requested data to the wide-band radio base station. The wide-band radio base station then transmits the data to the radio terminal 10 by using the wide-band down-link channel assigned thereto. As a result, the radio terminal 10 can receive the desired data through the wide-band down-link radio channel.

While data transmission is performed through a down-link radio channel, narrow-band up- and down-link radio channels (communication time slots) can be used as channels for transmitting control signals for efficiently controlling data transmission through a wide-band down-link channel.

For example, a communication time slot for the narrow-band up-link radio channel is used to transmit an ARQ (Automatic Repeat Request: control signal for retransmission) or an ACK message, whereas a communication time slot for the narrow-band down-link radio channel is used to transmit a power control signal for power saving in the radio terminal 10, a signal for notifying the radio terminal 10 of a specific radio terminal to which data is addressed, a signal for notifying the radio terminal 10 of a specific channel through which data is transmitted, or the like.

As is apparent, in performing such transmission control, narrow-band up- and down-link radio channels must be assigned to the radio terminal 10 which performs communication through a wide-band down-link radio channel.

In the above first assignment method, different time slots are assigned to a plurality of radio terminals 10 which use wide-band down-link radio channels. As another type of the first assignment method, a method of assigning the same time slot to a plurality of radio terminals 10 which use wide-band down-link radio channels will be described next.

In this case as well, the same time slot is not shared by the radio terminal 10 which receives a service (telephone service or the like) using only the narrow-band up- and down-link radio channels but not using the wide-band down-link radio channel.

For the sake of description convenience, a time slot assigned to the radio terminal 10 which receives a service using the wide-band down-link radio channel will be referred to as a wide-band time slot hereinafter. However, a "wide-band time slot" does not necessarily mean a dedicated time slot assigned to a radio terminal using the wide-band down-link radio channel.

Upon reception of a data request signal from the radio terminal 10, the narrow-band radio base station 12 checks the presence/absence of a time slot used as a wide-band time slot. If there is a time slot used as a wide-band time slot, the narrow-band radio base station 12 assigns the wide-band time slot to the radio terminal which has transmitted the data request signal, and notifies the radio terminal of the assignment result by using the time slot 21a. If there is no time slot used as a wide-band time slot, the narrow-band radio base station 12 checks the presence/absence of available time slots. If there are available time slots, the narrow-band radio base station 12 assigns an appropriate one of the time slots as a wide-band time slot, and notifies the radio terminal 10 of the assignment result using the time slot 21a.

Assume that there is no time slot used as a wide-band time slot, and there is no available time slot. In this case, as in the above method, the narrow-band radio base station 12 uses the time slot 21a to notify the radio terminal 10 that the radio terminal 10 cannot receive the service or needs to wait its turn for reception of the service.

Since the subsequent operation of assigning a wide-band down-link radio channel is the same as in the above procedure, a repetitive description will be avoided. In the above case, all the communication time slots can be used as wide-band time slots. However, only a specific time slot may be used as a wide-band time slot. That is, a time slot which can be used as a wide-band time slot is determined in advance, and this time slot is immediately assigned to the radio terminal 10 which is to receive a service using the wide-band down-link radio channel.

In this method, one of the remaining time slots is assigned to the radio terminal 10 which uses only the narrow-band up- and down-link radio channels. In addition, if a service using the wide-band down-link radio channel is requested while all the remaining time slots are used, one of the wide-band time slots is assigned. Such assignment can be performed because these time slots are not exclusively used as wide-band time slots.

By assigning a specific time slot as a wide-band time slot in preference to the remaining time slots in this manner, the following effects can be obtained.

Considering the forms of communication services using the wide-band down-link radio channel, for example, the following service can be provided.

First of all, the user transmits a data request signal. Upon reception of this request, the server 13 transmits the requested data through the wide-band own-link radio channel. The user then processes the received data. While the data is processed, no signal is transmitted through the radio channel. When data is required further, the user transmits a data request signal again, and receives the requested data from the server 13 through the wide-band down-link radio channel (see FIG. 4).

In this service, therefore, while the user processes data, no signal is transmitted through the narrow-band up- and down-link radio channels. That is, this data transmission exhibits burst-like traffic characteristics. In other words, a wide-band time slot is used in a burst-like manner. In this case, when viewed from another narrow-band radio-base station 12, this wide-band time slot may look as if it were an available time slot. As a result, another narrow-band radio base station 12 may erroneously perform channel assignment to cause inter-channel interference with the wide-band time slot.

The above problem can be solved by preferentially assigning a specific time slot as a wide-band time slot. More specifically, since the narrow-band radio base station 12 recognizes the specific time slot as a wide-band time slot in advance, it suffices if the narrow-band radio base station 12 includes a section for preventing channel assignment that causes interference with any of the wide-band time slots. For the same reason, the above problem can be solved by exclusively using a specific time slot as a wide-band time slot. However, this method is not preferable in terms of channel efficiency.

The method of assigning the above wide-band slot to a plurality of radio terminals 10 is superior in channel efficiency to the method of assigning the wide-band time slot to only one radio terminal 10 for the following reason. As described above, in a service using the wide-band down-link channel, wide-band time slots are used in a burst-like manner. As is apparent, while a given user processes data (no wide-band time slot is used), the channel can be used efficiently by permitting another user to use the time slot.

FIG. 5 is a flow chart showing a procedure for performing burst-like communication. As shown in FIG. 5, in burst-like communication, communication is repeatedly interrupted and resumed.

A method of temporarily interrupting communication and a method of resuming temporarily interrupted communication will be described in detail next.

The method of temporarily interrupting communication will be described first.

Consider the following situations in which communication is temporarily interrupted: a situation (case 1) in which the radio terminal 10 receives all requested data, but does not want to release the radio channel; a situation (case 2) in which the server 13 or the wide-band radio base station 11 cannot provide a communication service for a while for some reason; and a situation (case 3) in which the radio terminal 10 cannot receive a communication service for a while for some reason. In case 1, according to this embodiment, in transmitting requested data, the server 13 adds a signal representing an end to the end of the data. Alternatively, the server 13 transmits a signal representing the end of transmission by using the wide-band time slot upon completion of the transmission of the requested data. In response to this signal, the radio terminal 10 transmits a signal representing a communication interruption request (not an end request) or a signal for rejecting the end of transmission by using the wide-band time slot instead of transmitting a signal accepting the end of transmission. Upon reception of this signal, the narrow-band radio base station 12 temporarily interrupts communication with the radio terminal 10.

In case 2, according to this embodiment, the server 13 or the wide-band radio base station 11 transmits a signal representing a communication interruption request by using the wide-band down-link radio channel or the wide-band time slot. The radio terminal 10 transmits a signal representing acceptance of the interruption request, thereby temporarily interrupting communication.

In case 3, according to this embodiment, the radio terminal 10 transmits a signal representing a communication interruption request to the server 13 or the wide-band radio base station 11 through the narrow-band radio base station 12 (using the wide-band time slot). In response to this signal, the server 13 or the wide-band radio base station 11 transmits a signal representing acceptance of the interruption request to the radio terminal 10 by using the narrow-band down-link radio channel (the wide-band time slot) or the wide-band down-link radio channel, thereby temporarily interrupting communication with the radio terminal 10.

With the above procedure, the server 13 or the wide-band radio base station 11 can set the radio terminal 10 in a state wherein a radio channel is assigned, i.e., a temporarily interrupted state.

A procedure for resuming communication from a temporarily interrupted state will be described next. Communication is resumed from a temporarily interrupted state in the following two cases:

Case [i] wherein the user is to resume communication; and case [ii] wherein the network 14 or the wide-band radio base station 11 is to resume communication.

Case [i] wherein the user is to resume communication will be described first. In the case wherein the user is to resume communication, the following two resume procedures (cases (i) and (ii)) are used:

Case (i): First of all, the radio terminal 10 transmits a resume request signal by using the time slot 21e. If the wide-band time slot is used by another radio terminal 10, the radio terminal 10 waits its turn.

When the terminal's turn comes, the network 14 notifies the radio terminal 10 of the corresponding information by using the wide-band time slot or the time slot 21a.

In performing communication by using the wide-band time slot, the radio terminal 10 must set the time slot 21a for waiting for a telephone service and the like in a reception state as well as the wide-band time slot.

In performing communication by using the time slot 21a, the radio terminal 10 needs to set only the time slot 21a in a reception state. This method is therefore preferable in terms of a reduction in power consumption of the radio terminal 10.

Case (ii): According to another procedure by which the user resumes communication, the radio terminal 10 observes the use state of the wide-band time slot, and transmits a resume request signal by using the wide-band time slot when determining that the wide-band time slot is not being used.

This procedure is effective when the radio terminal 10 can accurately determine the use state of the wide-band time slot.

In case [ii] wherein the network 14 or the wide-band radio base station 11 resumes communication, the network 14 or the wide-band radio base station 11 transmits a resume request signal by using the wide-band time slot or the time slot 21*a*. Thereafter, the network 14 or the wide-band radio base station 11 resumes transmission.

With this operation, the interrupted communication using the wide-band time slot is resumed. In this case as well, a resume request signal is preferably transmitted by using the time slot 21*a* to attain a reduction in the power consumption of the radio terminal 10.

A procedure for releasing the wide-band time slot will be described next as the final part of the first method.

When communication using the wide-band down-link radio channel is to be ended, the radio terminal 10 transmits a signal representing the end of the communication by using the wide-band time slot. This signal is transmitted to the server 13 through the narrow-band radio base station 12.

Upon reception of this signal, the server 13 gives the wide-band radio base station 11 an instruction to check the presence/absence of a user who is waiting his/her turn to receive a service using the wide-band own-link radio channel. Upon reception of this instruction, the wide-band radio base station 11 checks the presence/absence of a user who is waiting his/her turns to receive the service using the wide-band down-link radio channel.

If there is a user who is waiting his/her turn to receive the service, the wide-band radio base station 11 gives the server 13 the information about the user who is waiting his/her turn. The server 13 sequentially gives the user a permission to use the wide-band time slot and the wide-band down-link channel, thereby providing the service.

If there is no user who is waiting his/her turn to receive the service, the server 13 gives the wide-band radio base station 11 an instruction to release the wide-band down-link radio channel, thus releasing the wide-band down-link radio channel. Thereafter, the server 13 gives the narrow-band radio base station 12 an instruction to release the narrow-band up- and down-link radio channels (wide-band time slot), thus releasing the narrow-band up- and down-link radio channels.

As described above, when communication through the wide-band down-link radio channel is to be interrupted and resumed, and the wide-band down-link radio channel is to be released, control for these operations is performed by using the narrow-band up- and down-link radio channels. For this reason, the narrow-band up- and down-link radio channels must be assigned to the radio terminal 10 which is to use the wide-band down-link radio channel.

If, therefore, the received signal strength indicator of a reception signal from the narrow-band radio base station 12 or the received signal strength indicator of a signal transmitted from the radio terminal 10 to the narrow-band radio base station 12 decreases while the radio terminal 10 receives a service using the wide-band down-link radio channel, the radio terminal 10 may not properly receive the service using the wide-band down-link radio channel.

In such a case, the possibility of wasting the service using the wide-band down-link radio channel is high, and retransmission may be required. As a result, power and communication resources are wasted. A case wherein this problem is solved will be described next.

While the radio terminal 10 is receiving a service using the wide-band down-link radio channel, the received signal strength indicator of a reception signal from the narrow-band radio base station 12 or the received signal strength indicator of a signal transmitted from the radio terminal 10 to the narrow-band radio base station 12 sometimes decreases because of the movement of the radio terminal 10 or the like. Control for such a case will be described.

Assume that the received signal strength indicator of a signal transmitted from the wide-band radio base station 11 to the radio terminal 10 is high enough to allow the radio terminal 10 to receive a service. As described above, the narrow-band up- and down-link radio channels are used as control channels for efficient transmission using the wide-band down-link radio channel.

When, therefore, switching of the narrow-band radio base station 12, i.e., handover, occurs during transmission using the wide-band down-link radio channel, communication using the narrow-band up- and down-link radio channels is interrupted. As a result, the transmission using the wide-band down-link radio channel is interrupted, posing a problem.

According to a technique of solving such a problem, in this case, the radio terminal 10 and the narrow-band radio base station 12 include a section (threshold level changing units) for changing a threshold level V0. Each threshold level changing unit has a function of changing the threshold level V0 for determining whether to continue a handover procedure while communication is performed by using the wide-band down-link channel.

While communication is performed by using the wide-band down-link channel, the threshold level changing unit changes the threshold level V0 for determining whether to continue a handover procedure. More specifically, the threshold level changing unit performs control to decrease the threshold level V0 to a threshold level V1 (V1<V0).

While communication is performed by using then wide-band down-link channel, each of the radio terminal 10 and the narrow-band radio base station 12 causes the threshold level changing unit to perform control to decrease the threshold level V0 to the threshold level V1 (V1<V0), thereby decreasing the signal strength indicator level for the handover procedure to a level lower than the normal level.

As a result, the start time of the handover procedure is delayed with respect to the normal timing, and it is expected that communication using the wide-band down-link channel is completed during this period. For this reason, the communication service using the wide-band down-link channel may be properly completed before the handover procedure is started.

Conventionally, handover occurs when the received signal strength indicator of a reception signal decreases to the level V0. However, with the above operation, handover does not occur until the received signal strength indicator decreases to the level V1. As a result, interruption of communication using the wide-band down-link channel can be prevented, even though the communication quality based on a narrow-band radio channel deteriorates.

According to another method, the radio terminal 10 and the narrow-band radio base station 12 include handover restriction control units to prevent handover of the narrow-band radio base station 12 while communication is performed by using the wide-band down-link radio channel.

More specifically, each handover restriction control unit performs the following restriction control. While data transmission is performed by using the wide-band down-link radio channel, control is performed not to perform handover even if the received signal strength indicator becomes lower than the threshold level V0. Handover is performed after the data transmission using the wide-band down-link radio channel is interrupted or ended. Alternatively, even measurement of a received signal strength indicator is not performed while data communication is performed by using the wide-band down-link radio channel.

When the data transmission is interrupted or ended, i.e., no data is transmitted through the wide-band down-link radio channel, a received signal strength indicator is measured, and handover is performed if the measured intensity is lower than threshold level V0.

With this restriction control, interruption of communication using the wide-band down-link radio channel can be prevented, even though the communication quality based on a narrow-band radio channel may deteriorate.

In addition, a combination of the above two methods is effective as a method of preventing interruption of communication using the wide-band down-link radio channel.

For example, the following control method is available. A third level V2 (V1<V2<V0) is set as a criterion for determining handover processing. When the threshold level decreases below the level V1, handover is immediately performed. If communication using the wide-band radio channel is interrupted or ended, handover is performed even if the threshold level is equal to the level V2.

Consider a case wherein the received signal strength indicator of a signal transmitted from the narrow-band radio base station 12 to the radio terminal 10 decreases, and the narrow-band radio channel cannot be used as a channel for controlling data transmission using the wide-band down-link radio channel. In this case, even if the received signal strength indicator of a signal transmitted from the wide-band radio base station 11 to the radio terminal 10 is high enough to allow reception of the signal, data transmission using the wide-band down-link radio channel cannot be performed.

The same applies to a case wherein the received signal strength indicator of a signal transmitted from the radio terminal 10 to the wide-band radio base station 11 decreases. As described above, when the radio terminal 10 cannot receive a signal from the wide-band radio base station 11, it is totally meaningless and wasteful to transmit data from the server 13 to the wide-band radio base station 11 for the following reason.

Since the wide-band radio base station 11 cannot transmit, to the radio terminal 10, data transmitted from the server 13, the transmitted data is discarded. Consequently, the server 13 wastefully keeps transmitting the same data. Even if the wide-band radio base station 11 has a buffer for storing data, since the storage capacity of the buffer is limited, it is totally wasteful to keep transmitting data addressed to nowhere from the server 13 to the wide-band radio base station 11.

An example of how to solve such a problem will be described next.

When the radio terminal cannot perform narrow-band radio channel transmission/reception, a trouble may be caused in reception control for the wide-band down-link radio channel. A technique of solving such a problem will be described.

For example, the radio terminal 10 includes a received signal strength indicator for measuring the received signal strength indicator of a signal transmitted from the narrow-band radio base station 12. In addition, the controller of the radio terminal 10 has a control function of performing transmission control for a transmission stop instruction signal by using the narrow-band up-link radio channel when the intensity measured by the received signal strength indicator measuring unit is lower than a predetermined threshold level. In this case, the transmission stop instruction signal is an instruction signal for stopping data transmission from the server 13 to the wide-band radio base station 11.

In this arrangement, the radio terminal 10 includes the received signal strength indicator measuring unit to measure the received signal strength indicator of a signal (narrow-band down-link radio channel) transmitted from the narrow-band radio base station 12. When the measured received signal strength indicator of the narrow-band down-link radio channel is lower than the predetermined threshold level, the controller of the radio terminal 10 performs transmission control for a transmission stop instruction signal by using the narrow-band up-link radio channel. The narrow-band radio base station 12 then receives this signal, and transmits the received transmission stop instruction signal to the server 13. In response to the transmission stop instruction signal, the server 13 stops the data transmission to the wide-band radio base station 11. As described above, when the received signal strength indicator of the narrow-band down-link radio channel becomes lower than the threshold level, the radio terminal 10 transmits a transmission stop instruction by using the narrow-band up-link radio channel to stop the data transmission from the server 13 to the wide-band radio base station 11. This operation can suppress wasteful transmission using the wide-band channel which is performed when transmission of data provided by the server 13 from the wide-band radio base station 11 to the radio terminal 10 is stopped to set the narrow-band radio channel in a disabled state.

An example of how to solve a problem posed when the radio terminal cannot perform narrow-band radio channel transmission/reception will be described below.

The radio terminal 10 includes a received signal strength indicator measuring unit for measuring the received signal strength indicator of a signal transmitted from the narrow-band radio base station 12. The radio terminal 10 also includes a controller for performing handover processing for the narrow-band radio base station 12 when the measured received signal strength indicator is lower than a handover threshold level. This controller has two types of threshold levels as criteria for determining whether to perform handover processing. These two threshold levels are: a threshold level (standard threshold level) for a case wherein communication is performed by using only a narrow-band radio channel; and a threshold level (special threshold level) for a case wherein communication is performed by using the wide-band radio channel as well.

The former (standard threshold level) is a general threshold level predetermined in the system. In the case to which the latter (special threshold level) is applied, since high-speed transmission of a large amount of data is performed by using the wide-band radio channel demanding large power consumption, even if data reception using the wide-band radio channel is made unstable upon deterioration in radio wave state, all the received data is wasted. In order to prevent this, a threshold level as a criterion for determining whether to perform handover processing is set to be higher than the standard handover threshold level. As is apparent, this threshold level may be equal to the standard handover threshold level.

In this arrangement, the radio terminal 10 causes the received signal strength indicator to measure the received signal strength indicator of a signal transmitted from the narrow-band radio base station 12, and the controller performs handover processing for the narrow-band radio base station 12 when the measured intensity is lower than the predetermined handover threshold level.

In this case, while high-speed transmission is performed by using the wide-band radio channel, the above threshold level is set to be equal to or higher than the handover threshold level. For this reason, when data reception through the wide-band radio channel is controlled by using a narrow-band radio channel upon deterioration in the sate of radio waves transmitted through the narrow-band radio channel, and control for data reception using the narrow-band radio channel may become unstable, handover processing is performed, thereby preventing wasteful data transmission using the wide-band radio channel in an early stage.

An example of how to solve a problem posed when the radio terminal 10 cannot receive any data through the wide-band down-link radio channel will be described. For this purpose, the radio terminal 10 includes a wide-band radio channel received signal strength indicator measuring unit for measuring the received signal strength indicator of a signal transmitted from the wide-band radio base station 11 so as to measure a received signal strength indicator. If the measured intensity is lower than a predetermined threshold level, the radio terminal 10 transmits a signal for stopping data transmission from the server 13 to the wide-band radio base station 11.

In this apparatus, the radio terminal 10 includes the wide-band radio channel received signal strength indicator measuring unit to measure the received signal strength indicator of a signal transmitted from the wide-band radio base station 11. If the measure dintensity is lower than the predetermined threshold level, the radio terminal 10 transmits a signal (to be referred to as a transmission stop signal) for stopping data transmission from the server 13 to the wide-band radio base station 11 through the narrow-band up-link radio channel. This signal is transmitted from the narrow-band radio base station 12 to the server 13 or the wide-band radio base station 11. Upon reception of the signal, the server 13 stops data transmission to the wide-band radio base station 11. In this manner, control can be performed to stop data transmission from the server 13 to the wide-band radio base station 11.

When the measured received signal strength indicator a signal transmitted from the wide-band radio base station 11 is lower than the predetermined threshold level, the system may switch control to a wide-band radio base station in another area to transmit data through this base station. That is, the system may be designed such that when the received signal strength indicator is lower than the predetermined threshold level, the radio terminal 10 transmits a signal for switching control to data transmission from the server 13 to a wide-band radio base station in another area.

Consider a case wherein a transmission stop signals transmitted when the received signal strength indicator of a signal from the narrow-band radio base station 12 or the wide-band radio base station 11 decreases to a specific level. That is, a threshold level as a criterion for determining whether to transmit a transmission stop signal will be described below. In this case, only a threshold level (to be referred to as a transmission stop threshold level) as a criterion for determining whether to transmit a transmission stop signal when the received signal strength indicator of a signal from the narrow-band radio base station 12 decreases will be described. This is because, the same basically applies to a case wherein a transmission stop signal is transmitted when the received signal strength indicator of a signal from the narrow-band radio base station 12 decreases. The radio terminal 10 measures the received signal strength indicator of a signal from the narrow-band radio base station 12. If the measured intensity is lower than the above over hand threshold level, the radio terminal 10 searches for another narrow-band radio base station exhibiting a satisfactory signal strength indicator, and performs handover to switch control to communication therewith. While such handover processing is performed, communication through the narrow-band up- and down-link radio channels is interrupted, and hence transmission through the wide-band down-link radio channel cannot be controlled. For these reasons, the transmission stop threshold level is preferably set to be equal to or higher than the handover threshold level.

The same applies to a case wherein the handover threshold level is changed. Assume that the wide-band radio base station 11 has a large-capacity buffer, and handover processing is performed in a relatively short period of time. Even in this case, handover may fail, the received signal strength indicator may further decrease, and communication through the narrow-band up- and down-link radio channels may be disabled. For this reason, transmission of data from the server 13 to the wide-band radio base station 11 must be stopped.

This is because, if communication through the narrow-band up- and down-link radio channels is disabled, since the wide-band radio base station 11 cannot transmit any data, the data stored in the buffer becomes completely useless. This useless data must be erased.

For these reasons, the transmission stop threshold level must be equal to or higher than the handover threshold level. When at least communication through the narrow-band up- and down-link radio channels or communication through the wide-band down-link radio channel is disabled while the radio terminal 10 receives data from the wide-band radio base station 11, the wide-band radio base station 11 erases the data stored in the buffer and addressed to the radio terminal 10. This operation prevents the buffer from storing useless data.

The above description is associated with each embodiment using the first assignment method as a method of assigning a communication time slot, in which different time slots are assigned as a time slot used to perform communication using the wide-band down-link radio channel and a time slot used to perform communication (e.g., speech communication) not using the wide-band down-link radio channel but using only the narrow-band up- and down-link radio channels.

The following description is associated with each embodiment using a method of assigning the same time slot as a time slot used to perform communication using the wide-band down-link radio channel and a time slot used to perform communication using only the narrow-band up- and down-link radio channels, i.e., the second assignment method of sharing one time slot, as a method of assigning a communication time slot.

The second assignment method will be described in detail below.

This method is a method of assigning the same time slot as a time slot used to perform communication using the wide-band down-link radio channel and a time slot used to perform communication using only the narrow-band up- and down-link radio channels. This method includes two methods, i.e., a method of assigning the same time slot to only the same user, and a method of assigning the same time slot to different users as well. The former method will be described below.

When the user who has used only the narrow-band up- and down-link radio channels wants to receive a service using the wide-band down-link radio channel during speech communication, the user transmits a data request signal by using the time slot used for speech communication. Alternatively, the user can transmit the data request signal by using the time slot 21*e*. In this case, however, a packet collision may occur.

When the server 13 receives the data request signal through the narrow-band radio base station 12, the server 13 transmits a control signal for efficiently controlling data transmission through the wide-band down-link radio channel by using a silent period of speech communication, i.e., a temporary period during which a time slot is not used. The above embodiment is based on the assumption that real-time characteristics of speech communication, as QoS (Quality of Service) required for a service, are higher than those of other types of communication.

If, therefore, the real-time characteristics of communication using the wide-band down-link radio channel are higher than those of communication using only the narrow-band up- and down-link radio channels, data transmission using the narrow-band up- and own-link radio channels is performed by using a temporary period during which control data for controlling the wide-band down-link radio channel is not present.

Similarly, when the user who has performed communication using the wide-band down-link radio channel wants to receive a service using only the narrow-band up- and down-link radio channels, e.g., a telephone service such as a telephone service, during communication, the user transmits an origination signal, a paging signal, a data signal, and the like by using a temporary period during which the wide-band time slot is not used. In this case as well, data having high real-time characteristics is preferentially transmitted in accordance with QoS required for a service.

As described above, in the radio communication system for performing SDL transmission according to the present invention, in order to allow the radio terminal 10 to receive data through the wide-band down-link radio channel, narrow-band up- and down-link radio channels (time slots) and the wide-band down-link radio channel are assigned (re-served) to the radio terminal 10. In addition, in order to assign the wide-band down-link radio channel to the radio terminal 10, the narrow-band up- and down-link radio channels (time slots) must be assigned in advance.

Figure 6:
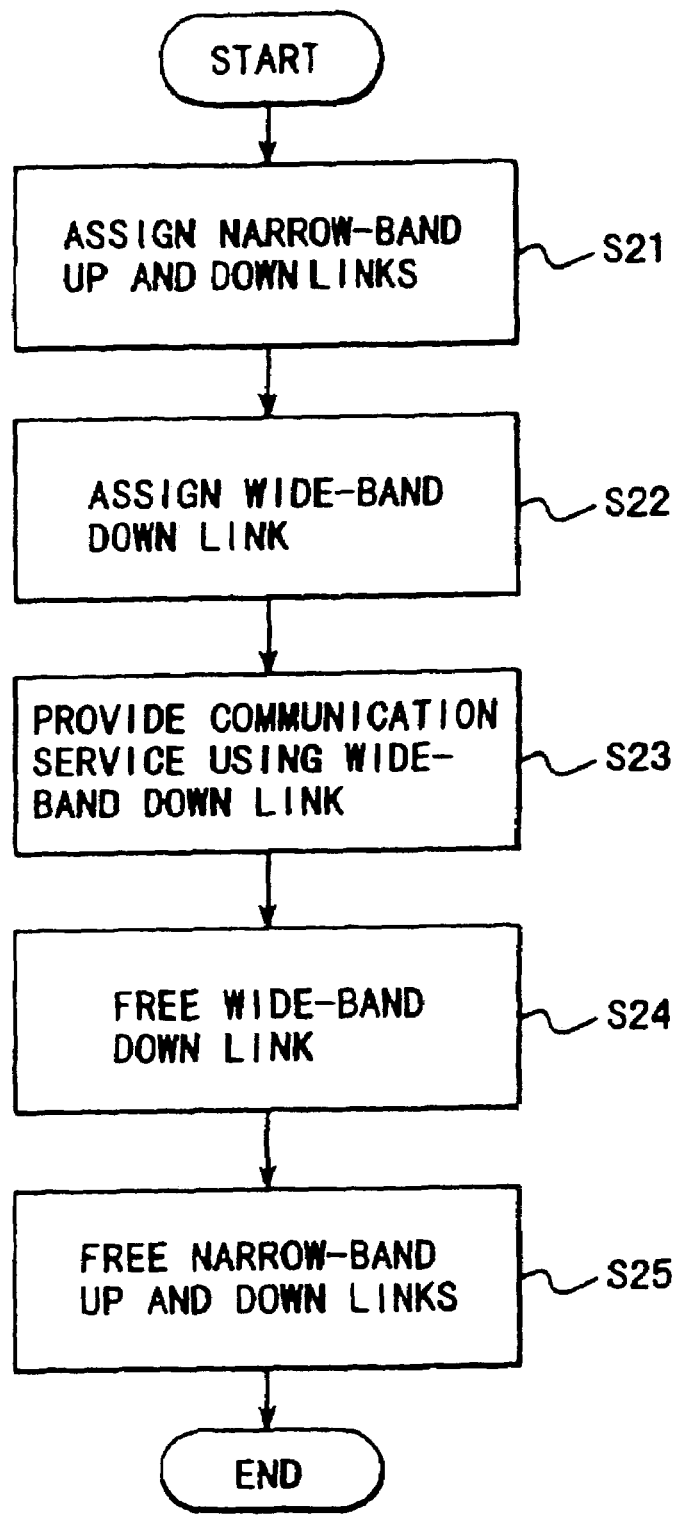
FIG. 6 is a flow chart for explaining the first embodiment of the present invention.

According to the present invention, however, the procedure based on the flow chart of FIG. 6 can be executed. More specifically, the narrow-band up- and down-link radio channels are assigned first, and the wide-band down-link radio channel is then assigned. Thereafter, a communication service using the wide-band down-link radio channel is provided. Upon completion of the service, the wide-band down-link radio channel can be released, and the narrow-band up- and down-link radio channels can be released.

With this procedure, the above problems are solved, and the radio terminal 10 can receive data through the wide-band down-link radio channel. In addition, the present invention establishes the procedure by which the narrow-band up- and down-link radio channels are used as radio channels for performing control for efficient data transmission using the wide-band down-link radio channel, thereby allowing the narrow-band up- and down-link radio channels to be used for control for efficient data transmission using the wide-band down-link radio channel.

According to the second embodiment, the present invention is applied to a radio communication system in which data transmission from a wide-band radio base station 11 to a radio terminal 10 is based on the time division multiple access scheme as in the radio communication system exemplifying the above SDL system. The formats of frames to be used in the wide-band down-link radio channel will be described with reference to cases wherein the time length of the second frame is equal to that of the first frame, and the time length of the second frame is twice that of the first frame. In the case wherein the time length of the second frame is equal to that of the first frame, if the division number for the second frame is "1", a frame 30 is constituted by one time slot 31 (see FIG. 7).

In this arrangement, for example, time slots 21b and 21f as the narrow-band up- and down-link radio channels and a time slot 31 as the wide-band down-link radio channel are assigned to the radio terminal 10 which is to perform communication using the wide-band down-link radio channel.

The time slot 31 is used to transmit large-volume data at a high speed. The time slots 21b and 21f are used as channels for transmitting control signals for efficiently controlling data transmission using the wide-band down-link radio channel. More specifically, for example, the time slot 21b is used to transmit a power control signal for a reduction in power consumed by the radio terminal 10, and the time slot 21f is used to transmit ARQ and Ack messages.

In order to realize such transmission, the wide-band down-link radio channel and the narrow-band up- and down-link radio channels must be efficiently associated with each other. More specifically, these channels must be efficiently associated with each other to indicate a specific time slot 21b used to transmit a power control signal corresponding to a signal transmitted by using a given time slot 31, and a specific time slot 21f used to transmit ARQ or Ack message. For this purpose, according to the present invention, the time length of the second frame is set to be one time, i.e., equal to, that of the first frame. As a result, the repetition cycle of the time slot 21b and the time slot 31 becomes equal to that of the time slot 21f and the time slot 31. Therefore, the relative position relationship between the time slots 21b, 21f, and 31 can be kept constant.

When the relative position relationship can be kept constant, the time slots 21b and 21f and the time slot 31 can be uniquely associated with each other. In addition, the data amount of a control signal for establishing such association can be reduced or eliminated. That is, data transmission using the time slot 31 can be efficiently controlled.

Note that the time slot 21b associated with a given specific time slot 31 is a time slot at the timing before at least the timing of the time slot 31, and the time slot 21f associated with the time slot 31 is a time slot at the timing after the timing of the time slot 31.

Similarly, when the division number for the second frame is "2", the frame 30 is constituted by time slots 32a and 32b (FIG. 8). Assume that these two time slots 32a and 32b are assigned to two users (two different radio terminals 10) who want to perform communication using the wide-band down-link radio channel. In this case, the time slots 21b and 21f are assigned as narrow-band up- and down-link radio channels to the user to which the time slot 32a has been assigned, whereas the time slots 21c and 21g are assigned as narrow-band up- and down-link radio channels to the user to which the time slot 32b has been assigned.

In this case as well, the repetition cycle of the time slots 21b and 32a becomes equal to that of the time slots 21f and 32a so that signals for controlling data transmission using the time slot 32a can be efficiently transmitted by using the time slots 21b and 21f.

Similarly, the repetition cycle of the time slots 21c and 32b becomes equal to that of the time slots 21f and 32b so that signals for controlling data transmission using the time slot 32b can be efficiently transmitted by using the time slots 21c and 21g.

In addition, the two time slots 32a and 32b can be assigned to one user (one radio terminal). In this case, however, the following two assignment methods can be used: a method of assigning two pairs of time slots, e.g., time slots 21b and 21f, and 21c and 21g, as narrow-band up- and down-link radio channels for performing transmission control for the time slots 32a and 32b; and a method of assigning one pair of time slots, e.g., the time slots 21b and 21f as narrow-band up- and down-link radio channels, and preparing a means for adding transmission control data for the two time slots 32a and 32b to the time slots 21b and 21f.

Although the former method is superior in feasibility to the latter method, the latter method is preferable in terms of effective use of a frequency. When the frame 30 is divided into three time slots, the same effects as described above can be obtained. When a frame used in the wide-band down-link radio channel is divided, one of the following methods must be selected: a method of causing a radio terminal to receive data in all time slots (e.g., the time slots 32a and 32b) and identify data, of the received data, which is addressed to the self-station; and a method of allowing a radio terminal to recognize a specific time slot in which data addressed to the self-station is to be transmitted, and causing the radio terminal to receive only data addressed thereto.

The latter method is much advantageous in reducing the power consumption of a radio terminal. For this reason, it is essential to construct a radio communication system which allows each radio terminal to recognize a specific time slot in which specific data addressed to the self-station is to be transmitted.

Therefore, by using the narrow-band down-link radio channel, each radio terminal is notified of a specific time slot assigned thereto. With this operation, each radio terminal can receive data transmitted through the wide-band down-link radio channel while suppressing power consumption.

The case wherein the time length of the second frame is set to be twice that of the first frame will be described next.

In this case, the division number for the second frame may be "2", "4", "6", or the like. Assume that the division number is set to "2" (see FIG. 9).

In this case, a frame 30 is divided into two time slots 41a and 41b. The time length of each of the time slots 41a and 41b is therefore equal to that of a frame 20. Assume that these two time slots 41a and 41b are assigned to two users (two different radio terminals 10) who want to perform communication using the wide-band down-link radio channel. In this case, time slots 21b and 21f are assigned as narrow-band up- and down-link radio channels to the user to which the time slot 41a has been assigned, whereas time slots 21b and 21f are assigned as narrow-band up- and down-link radio channels to the user to which the time slot 41b has been assigned.

That is, the repetition cycle of frames in the narrow-band up- and down-link radio channels is doubled. Note that the repetition cycle of frames is doubled with respect to only time slots (the time slots 21b and 21f in this case) for performing control for data transmission using the wide-band down-link radio channel, but the repetition cycle is not changed with respect to the remaining time slots assigned to communication using only the narrow-band up- and down-link radio channels. With this arrangement, the repetition cycle of the time slots 21b and 41a becomes equal to that of the time slots 21f and 41a so that signals for performing control for data transmission using the time slot 41a can be efficiently transmitted by using the time slots 21b and 21f.

Similarly, the repetition cycle of the time slots 21b and 41b becomes equal to that of the time slots 21f and 41b so that signals for performing control for data transmission using the time slot 41b can be efficiently transmitted by using the time slots 21b and 21f.

In the above case, the time slots 41a and 41b are respectively assigned to different users. However, these time slots can be assigned to the same user.

In this case, the repetition cycle of the time slots 21b and 21f is not changed. If the narrow-band radio base station 12 includes a section for transmitting a signal for setting the start time of a frame to the wide-band radio base station 11, the start time of the second frame can be set to perform more efficient control for data transmission using the wide-band down-link radio channel.

Assume that the start time of the second frame is set as shown in FIG. 10A. In this case, in order to control a frame 50 of the wide-band down-link radio channel, a time slot in a frame 51a and a time slot in a frame 51c are respectively used as a narrow-band down-link radio channel and a narrow-band up-link radio channel. Therefore, as a control time Tc required to control one frame in the wide-band down-link radio channel, a time about three times the time length of a frame in the narrow-band up- and down-link radio channels is required.

If, however, the start time of the second frame is set as shown in FIG. 10B, a time slot in the frame 52a and a time slot in a frame 52b are respectively used as a narrow-band down-link radio channel and a narrow-band up-link radio channel. Therefore, the control time Tc required to control one frame in the wide-band down-link radio channel is only about twice the time length of a frame in the narrow-band up- and down-link radio channels. That is, the control time can be shortened.

Assume that the relative position relationship between the start time of a frame in a given narrow-band radio base station 12 and the start times of frames in all the wide-band radio stations located within the service area of the narrow-band radio base station 12 is kept uniform. In this case, when base station switching (handover) of the wide-band radio base station occurs upon movement of the radio terminal 10 or the like, the handover processing can be easily performed for the following reason. The frame start time in the wide-band radio base station 11 undergoes no change even after base station switching is performed. For this reason, the relative position relationship between the frame start time in the wide-band radio base station 11 and the frame start time in the narrow-band radio base station 12 need not be observed every time base station switching is performed.

A signal for setting a frame start time can be transmitted through the narrow-band down-link radio channel. If, however, a fixed channel assigned between the narrow-band radio base station 12 and the wide-band radio base station 11 is used, the accurate propagation time between the narrow-band radio base station 12 and the wide-band radio base station 11 can be known in advance. Therefore, a frame start time can be easily set with a high precision.

An embodiment designed to solve the second problem will be described as the third embodiment of the present invention.

The second object is to realize an arrangement in which a narrow-band radio transceiver and a wide-band radio receiver are arranged in one housing such as a terminal while preventing harmonic components generated by the narrow-band radio transmitter from affecting reception of a wide-band signal, and to prevent an increase in weight and volume which is caused when a shield or the like is placed between the narrow-band radio transceiver and the wide-band radio receiver. For this purpose, it is essential in this embodiment to transmit no narrow-band signal from a terminal while a narrow-band radio base station transmits a wide-band signal to the terminal.

As shown in FIG. 11B, a narrow-band radio base station 12 includes a narrow-band radio transmitter 12a, a narrow-band radio receiver 12b, a transmission/reception shared unit 12c, an antenna 12d, a digital processor 12e, a network connecting section 12f, a inter-base-station communication unit 12g, and a controller 12h. As shown in FIG. 11A, a wide-band radio base station 11 includes a wide-band radio transmitter 11a, an antenna 11b, a digital processor 11c, a network connecting section 11d, an inter-base-station communication unit 11e, and a controller 11f.

The narrow-band radio transmitter 12a and the narrow-band radio receiver 12b have functions of transmitting/receiving narrow-band signals by using radio channels set between the narrow-band radio transceiver arranged in a terminal and the narrow-band radio base station. The wide-band radio transmitter 11a has a function of transmitting a wide-band signal by using a radio channel set between the wide-band radio receiver arranged in a terminal or the like and the wide-band radio base station.

Each of the digital processors 11c and 12e has a function of performing error-checking encoding and error correction encoding for data to be transmitted, and setting the resultant data in a frame having a predetermined format, a function of extracting the set frame from a received signal, extracting the set data, and decoding the data, a function of detecting an error in data to be transmitted by radio and performing retransmission control, and the like.

The network connecting sections 11d and 12f are interfaces between the radio base stations and a network. Each section performs conversion of transmission formats and physical signals in radio and wired channels. The controllers 11f and 12h perform operation settings for the respective components and processing for errors in accordance with predetermined programs.

In the present invention, the controllers 11f and 12h manage assignment and use states of radio channels (radio frequencies and time slots) used between the respective radio stations and the terminal. Management data are exchanged between the narrow-band radio base station 12 and the wide-band radio base station 11 through the inter-base-station communication units 11e and 12g. Similarly, data such as frame start timing data in the digital processors 11c and 12e in the respective radio stations are also transmitted/received through the inter-base-station communication units 11e and 12g.

A method of performing control to inhibit the terminal from transmitting a narrow-band signal while the wide-band radio base station 11 transmits a wide-band signal (through the wide-band down-link radio channel) to the terminal will be described in detail below.

Figure 12:
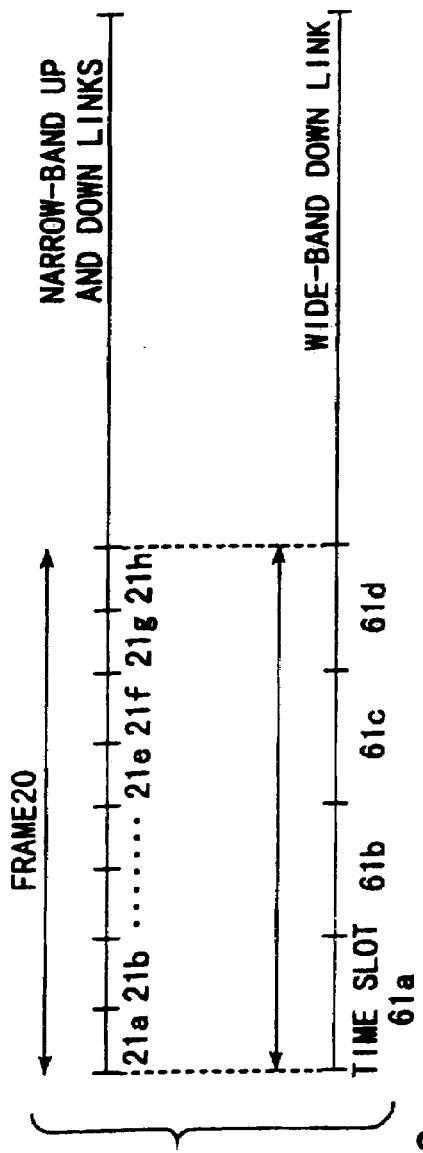
FIG. 12 is a view for explaining the third embodiment of the present invention.

Assume that a frame 60 for the wide-band down-link radio channel is constituted by four time slots 61a to 61d as shown in FIG. 12, and the start portion of the frame is synchronized with a frame for a narrow-band radio channel.

Each radio base station assigns time slots to the terminal so as to inhibit transmission through the narrow-band up-link radio channel while the terminal receives data through the wide-band down-link radio channel. More specifically, if time slots 21e to 21h can be used as narrow-band up-link radio channels, the time slot 21g or 21h is assigned as a narrow-band up-link radio channel to the terminal to which the time slot 61c is assigned as a wide-band down-link radio channel.

Similarly, the time slot 21e or 21f and 61c to the terminal to which the time slot 61d is assigned, thereby allowing the above control. As another control method, a method of limiting time slots as narrow-band up-link radio channels which can be used by the terminal using the wide-band down-link radio channel to perform wide-band transmission control will be described with reference to FIG. 12.

Assume that the time slots 21e and 21f in the frame 20, of the narrow-band up-link radio channels, are exclusively used for wide-band transmission control. In this case, as wide-band down-link channels, the time slots 61a, 61b, and 61d of the time slots in the frame 60, excluding the time slot 61c which overlaps the time slots 21e and 21f along the time axis, are used.

Such a use range is determined in advance, and a dedicated narrow-band up-link radio channel and a wide-band down-link radio channel in the use range are assigned to the terminal which is to perform wide-band transmission, thereby allowing the above control.

Figure 13:
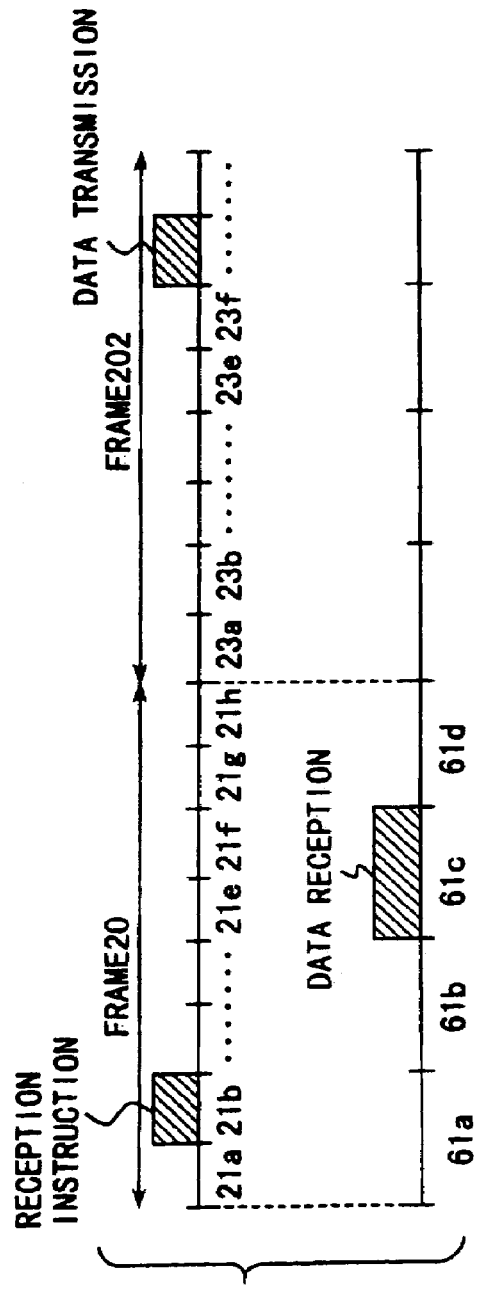
FIG. 13 is a view for explaining the third embodiment of the present invention.

As still another control method, a method of suppressing transmission using a narrow-band up-link radio channel on the terminal side will be described with reference to FIG. 13. The wide-band and narrow-band radio base stations perform frame synchronization. Assume that the start portion of a frame for a wide-band radio channel is synchronized with a frame for a narrow-band radio channel, as shown in FIG. 13.

Assume that time slots 21b, 23b, . . . as narrow-band down-link radio channels, the time slots 21f, 23f, . . . as up-link radio channels, and a time slot 61c as a wide-band down-link radio channel are assigned to the terminal. In this case, when there is data to be transmitted from the wide-band radio base station to the terminal, a reception instruction is transmitted from the narrow-band radio base station by using the time slot 21b.

The terminal transmits no data by using a time slot as a narrow-band up-link radio channel which overlaps the time slot 61c assigned as a wide-band down-link radio channel along the time axis until reception of data through the wide-band down-link radio channel is completed.

In the above case, since the time slot 21f overlaps the time slot 61c along the time axis, and data is received through the wide-band down-link radio channel, transmission using the narrow-band down-link radio channel is not performed. The terminal can transmit data by using the time slot 23f upon detecting the end of data reception by receiving an end flag added to the end portion of the data.

As described above, in this embodiment, the narrow-band radio transceiver and the wide-band radio receiver Fre arranged in the same housing such as a terminal. This arrangement is designed to prevent harmonic components generated by the narrow-band radio transmitter from affecting reception of a wide-band signal and also prevent an increase in weight and volume which is caused when a shield or the like is placed between the narrow-band radio transceiver and the wide-band radio receiver. For this purpose, it is essential to inhibit the terminal from transmitting a narrow-band signal while the wide-band radio base station transmits a wide-band signal to the terminal. Assignment of the first and second frames, the start times of the first and second frames, or the transmission time set in the terminal is controlled to inhibit the terminal from transmitting any control signal through the narrow-band radio transceiver by using the first time slot in an interval in which the terminal receives data through the wide-band radio receiver by using the second time slot.

With this arrangement, since no narrow-band signal is transmitted during the reception period of a wide-band signal, the reception of the wide-band signal is not affected at all by harmonic components generated by the narrow-band radio transmitter. Consequently, the terminal becomes free from an increase in weight and volume due to a shield or the like.

As described above, according to the first and second embodiments, control procedures for efficient data transmissions are provided for a radio communication system including narrow-band up- and down-link radio channels and a wide-band down-link radio channel. In a radio communication system including narrow-band up- and down-link radio channels and a wide-band down-link radio channel, when a radio terminal is to receive data through the wide-band down-link radio channel, it is essential that narrow-band up- and down-link radio channels has been assigned to the radio terminal. With this assignment, communication using the wide-band down-link radio channel can be performed, and the narrow-band up- and down-link radio channels can be used as radio channels for performing control for efficient data transmission using the wide-band down-link radio channel.

Radio communication systems using a plurality of types of radio signals, especially radio communication systems allowing improvements in service performance, will be described next as the fourth to eighth embodiments of the present invention.

The following embodiments are designed to provide easy-to-use radio systems which allow users in various age groups to easily receive various services using radio terminals.

The premises of the following embodiment will be briefly described below.

With the widespread use of compact, portable data processing and electronic instruments, communication functions (to be referred to as radio terminals) have been added to these portable instruments, and services using various networks have been provided. For this reason, various types of data are transmitted through radio channels. In this case, the various types of data include speech, data, a still picture, a video picture, and the like. In order to transmit these types of data by using one radio terminal, an optimal transmission scheme must be provided in accordance with the type of data to be transmitted. Such data are transmitted by radio by using at least two different schemes: a scheme of multiplexing various data with one modulation signal or carrier, and a scheme of using different carriers in accordance with the attributes of data.

One of the factors that interfere with a reduction in size of a radio terminal which should be compact is an RF amplifier. In order to reduce the size, cost, and power consumption of this amplifier, different frequencies or transmission schemes suitable for the respective types of data are preferably used.

If, however, different frequencies or transmission schemes are used, some data can be transmitted but other data cannot be transmitted in the same environment. In other words, the types and qualities of services which can be provided vary.

This is because, service areas greatly vary depending on the frequencies to be used. In addition, since power consumption varies, services which can be provided vary in accordance with the battery residual capacities. Furthermore, the types, qualities, times, and the like of services which can be provided when two radio terminals receive communication services are greatly influenced by the types, number, and qualities of radio signals which can be received by the distant terminal and its battery residual capacity, in addition to the types, number, and qualities of radio signals which can be received by the self-terminal and its battery residual capacity.

As described above, the types and qualities of services which can be provided to each radio terminal vary instantaneously. The types and qualities of services diversify. For this reason, even if the types, qualities, and times of services which can be provided can be determined in consideration of the conditions of the distant terminal, there is a problem in notifying the determination result.

For example, in a radio terminal designed to receive three types of radio signals from a pager, a PHS, and a radio LAN, notification of "ready or not ready for reception" alone raises eight different conditions. From the viewpoint of the users of radio terminals, therefore, radio terminals which allow quick recognition of the types and qualities of services which can be provided are easy-to-use terminals.

No conventional radio terminal, however, has a function of notifying the user of the types, qualities, and service times of services which can be provided.

In consideration of these points, the following embodiments exemplify communication systems which can notify the users of radio terminals of the types, qualities, and service times of services which can be provided, thereby attaining great improvements in operability.

According to embodiment [B1], it is essential that a radio terminal or terminal module having one or a plurality of receivers for receiving one or a plurality of types of radio signals in accordance with a communication scheme using one or a plurality of types of radio signals includes a notification section for notifying at least one of the following factors: the types, qualities, and times of services which can be provided.

According to embodiment [B2], a radio terminal or terminal module having one or a plurality of receivers for receiving one or a plurality of types of radio signals in accordance with a communication scheme using one or a plurality of types of radio signals includes a determining section for determining at least one of the following factors: the types, qualities, and times of different services which can be provided, on the basis of a combination of at least one of the following factors: the types, number, and qualities of radio signals which can be received and the battery residual capacity of the radio terminal or the terminal module, and a notification section for notifying the determination result.

According to embodiment [B2-a], there is provided a radio communication system constituted by one or a plurality of transmission apparatuses for transmitting one or a plurality of down-link radio signals, one or a plurality of reception apparatuses for receiving one or a plurality of up-link radio signals, a radio terminal including one or a plurality of receivers for receiving the one or the plurality of down-link radio signals and one or a plurality of transmitters for transmitting the one or the plurality of up-link radio signals, and a terminal manager unit which is connected to one or the plurality of transmission apparatuses and one or the plurality of reception apparatuses to store a combination of at least one of the following factors: the types, number, and qualities of radio signals which can be received by the radio terminal and its battery residual capacity. In this system, when two radio terminals are to receive services, each radio terminal includes a determining section for determining at least one of the following factors: the types, qualities, and times of different services which can be provided, on the basis of a combination of at least one of the following factors: the types, number, and qualities of radio signals which are read out from the terminal manager and can be received by the distant radio terminal and its battery residual capacity, and a notification section for notifying the determination result.

According to embodiment [B3], there is provided a radio communication system constituted by one or a plurality of transmission apparatuses for transmitting one or a plurality of down-link radio signals, a reception apparatus for receiving at least one up-link radio signal, a radio terminal including one or a plurality of receivers for receiving one or the plurality of down-link radio signals and a transmitter for transmitting at least one up-link radio signal, and a service manager which is connected to one or the plurality of transmission apparatuses and the reception apparatus to manage services to be provided for the radio terminal. In this system, the service manager includes a determining section for determining at least one of the following factors: the types, qualities, and times of services which are provided for the radio terminal, on the basis of a combination of at least one of the following factors: the types, number, and qualities of one or the plurality of down-link radio signals which can be received, which are transmitted from the radio terminal through at least one up-link radio signal, and the battery residual capacity of the radio terminal.

According to embodiment [B3-a], there is provided a radio communication system constituted by one or a plurality of transmission apparatuses for transmitting one or a plurality of down-link radio signals, one or a plurality of reception apparatuses for receiving one or the plurality of up-link radio signals, a radio terminal including one or a plurality of receivers for receiving one or the plurality of down-link radio signals and one or a plurality of transmitters for transmitting one or the plurality of up-link radio signals, and a service manager which is connected to one or the plurality of transmission apparatuses and one or the plurality of reception apparatuses to manage services to be provided for the radio terminal. In this system, the service manager includes a determining section for determining at least one of the following factors: the types, qualities, and times of different services which can be provided, on the basis of a combination of at least one of the following factors: the types, number, and qualities of radio signals which can be received by an origination radio terminal and its battery residual capacity, and a combination of at least one of the following factors: the types, number, and qualities of radio signals which can be received by a paging radio terminal and its battery residual capacity.

According to embodiment [B4], there is provided a radio communication system constituted by one or a plurality of transmission apparatuses for transmitting one or a plurality of down-link radio signals, a reception apparatus for receiving at least one up-link radio signal, a radio terminal including one or a plurality of receivers for receiving one or the plurality of down-link radio signals and a transmitter for transmitting at least one up-link radio signal, and a service manager which is connected to one or the plurality of transmission apparatuses and the reception apparatus to manage services to be provided for the radio terminal. In this system, the radio terminal transmits, to the service manager through at least one up-link radio signal, at least one of the following factors: the types, number, and qualities of one or the plurality of down-link radio signals which can be received by the radio terminal and its battery residual capacity, and the service manager determines at least one of the following factors: the types, qualities, and times of services provided for the radio terminal, on the basis of a combination of at least one of data transmitted from the radio terminal, and notifies the radio terminal of the determination result through one of the plurality of down-link radio signals.

Figure 14:
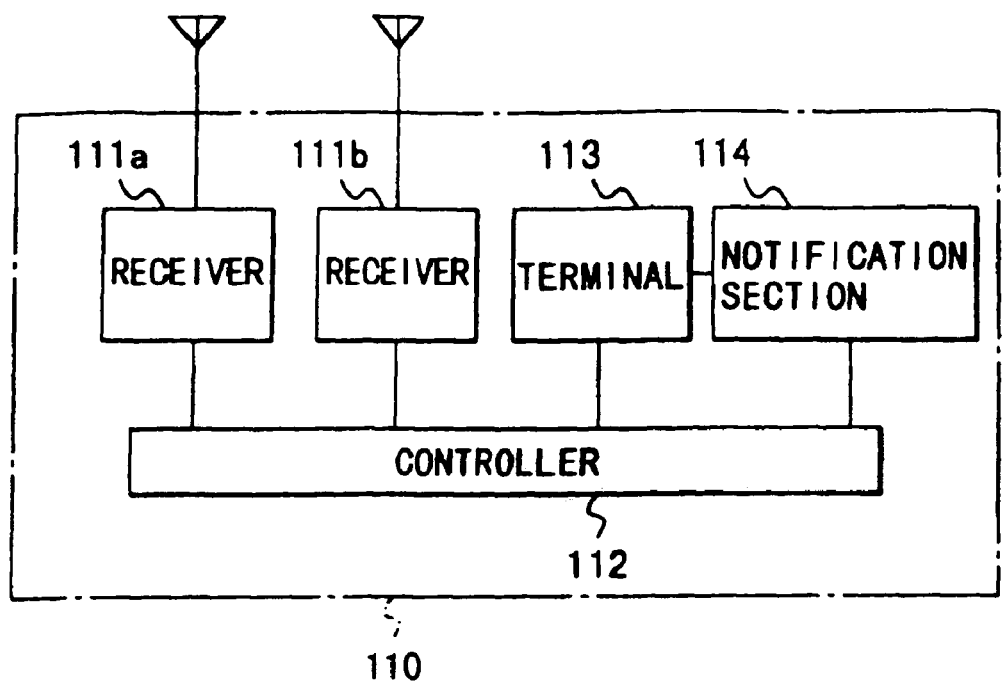
FIG. 14 is a block diagram showing the arrangement of a radio terminal according to the fourth embodiment of the present invention.
Figure 15:
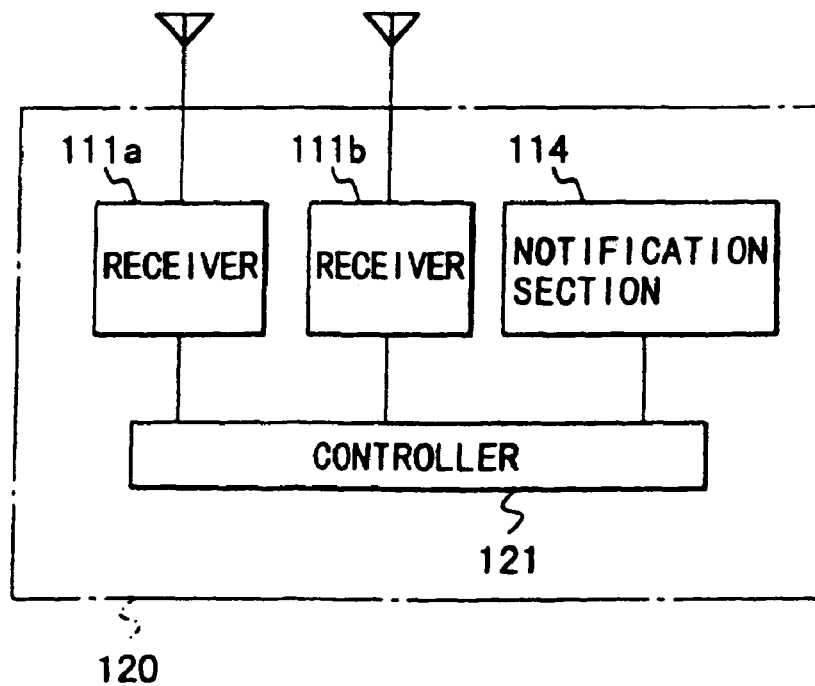
FIG. 15 is a block diagram showing the arrangement of a terminal module according to the fourth embodiment of the present invention.

FIGS. 14 and 15 are schematic block diagrams showing the arrangements of a radio terminal and a terminal module according to embodiment [B1]. FIGS. 14 and 15 respectively show a radio terminal 110 and a terminal module 120. The radio terminal 110 is an apparatus like the one shown in FIG. 16A, which can singly perform radio transmission/reception, a display operation, and the like. The radio terminal 110 includes a radio interface for radio transmission/reception and a user interface for input/output operations.

The terminal module 120 is a module for function extension. The terminal module 120 only has a radio transmission/reception function but does not have a user interface. In order to receive a service, therefore, the terminal module 120 must be connected to another terminal 121 having a user interface, as shown in FIG. 16B. Assume that the terminal 121 has a user interface but does not have a radio transmission/reception function. In this case, a radio transmission/reception function can be added to the terminal 121 by connecting the terminal module 120 to the terminal 121. Note that a connecting portion (CN) 121 is mounted on the terminal 121 to allow the terminal module 120 to be connected thereto.

Receivers 111a and 111b serve to receive radio signals. FIGS. 14 and 15 respectively show a radio terminal and a terminal module, each having two receivers.

A terminal 113 serves to perform data processing, and has a user interface. A notification section 114 is used to notify at least one of the following factors: "types", "qualities", and "times" of services which can be provided. In the radio terminal 110, this notification section 114 may be incorporated in the terminal 113 and use the user interface of the terminal 113 to notify the user of "types", "qualities", and "times" of services which can be provided. For example, such an arrangement is applied to a case wherein the terminal 113 and the notification section 114 share a monitor screen. In this embodiment, however, the terminal 113 and the notification section 114 are arranged as separate components. The terminal module 120 preferably has a compact, lightweight structure. The terminal module 120 is preferably a card-like terminal module complying with the PCMCIA standards to prevent an increase in capacity of the terminal 121 when it is directly connected to the terminal 121 having the user interface. If infrared rays are used for the connection interface between the terminal module 120 and the terminal 121, a reduction in cost can be attained. In addition, since no physical connection is required between the terminal module 120 and the terminal 121, flexible system construction can be performed.

The principal object of the present invention in this case is to notify data such as the types, number, and qualities of radio signals, a battery residual capacity, and the types and communication times of services which can be provided. Practical notification methods for this purpose can be equally applied to the radio terminal 110 and the terminal module 120, and hence will be described below by taking the radio terminal 110 as an example. Assume that a controller 112 has a function of recognizing "types", "qualities", and "times" of services (which can be provided) by using some means.

Methods of notifying a user of these recognized data include methods of appealing to the senses of sight, hearing, and touch of the user. The method of appealing to the sense of sight of the user will be described first.

In this case, the notification section 114 has a display function of appealing to the sense of sight of the user. For example, this function may use lamp (a light-emitting element such as an LED) or a monitor screen. If the notification section 114 uses a lamp to perform a display operation, the lamp is designed to change the color of emitted light or constituted by a plurality of lamps for emitting light beams of different colors. In this arrangement, the types, qualities, times, and the like of services which can be provided are displayed by changing the color, luminance, flickering cycle, and the like of emitted light.

Figures 17A, 17B:
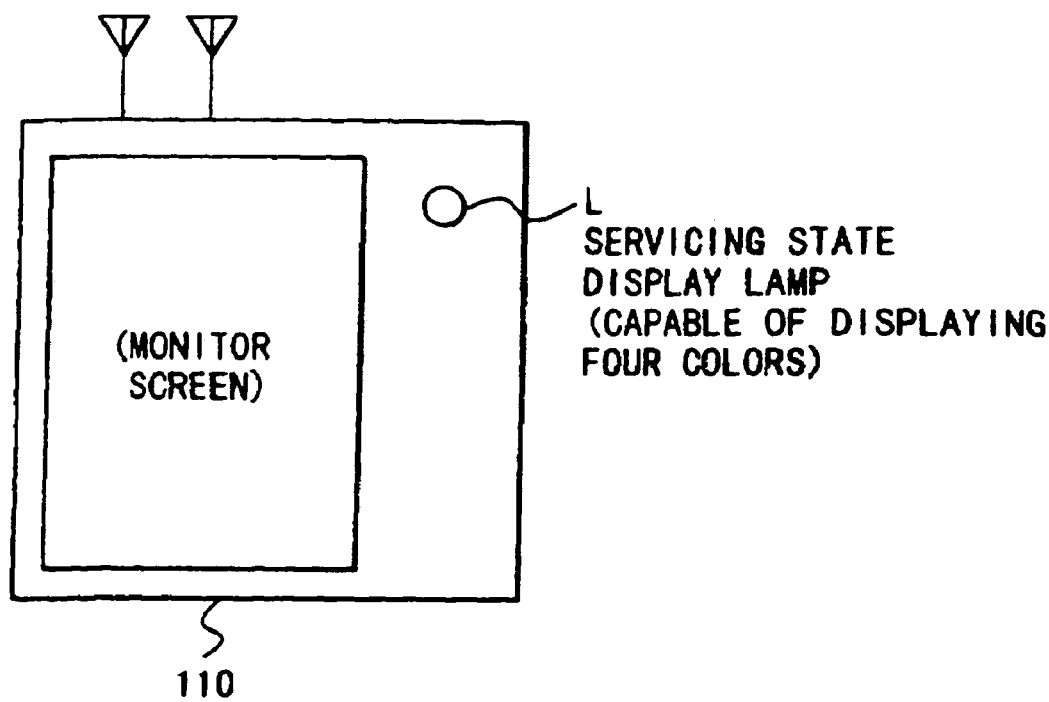
FIGS. 17A and 17B are views for explaining an example of how services to be provided are displayed according to the fourth embodiment of the present invention.

Assume that the radio terminal 110 has two receivers as a pager and a PHS (Personal Handyphone System). In this embodiment, services which can be provided are limited to two services, i.e., a service (paging service) of calling the user through the pager, and a telephone service using the PHS. As shown in FIG. 17A, the radio terminal 110 includes a lamp L for notifying the state of the terminal. In this case, four types of display must be performed to only display whether the pager and the PHS are ready or not ready for reception.

In order to discriminate and display the four cases with one lamp most intelligibly, the lamp L may display the current service state by using four colors.

The four cases will be described with reference to FIG. 17B. In accordance with notification data from the controller 112, the notification section 114 performs ON display control to emit "blue light" when both the paging service and the telephone service can be provided, and to emit "red light" when both the services cannot be provided. Furthermore, in emitting "blue light", the notification section 114 "flickers blue light" when the channel quality is poor. As the channel quality deteriorates, control is performed to prolong the flickering cycle.

If it is determined in accordance with notification data from the controller 112 that the battery residual capacity is small, the notification section 114 performs control to decrease the luminance of the lamp to notify the user that the service cannot be provided for a long period of time.

With the above operation, the notification section 114 can visually notify the user of the current service state, and the user can know the state of the radio terminal 110.

Figure 18A:
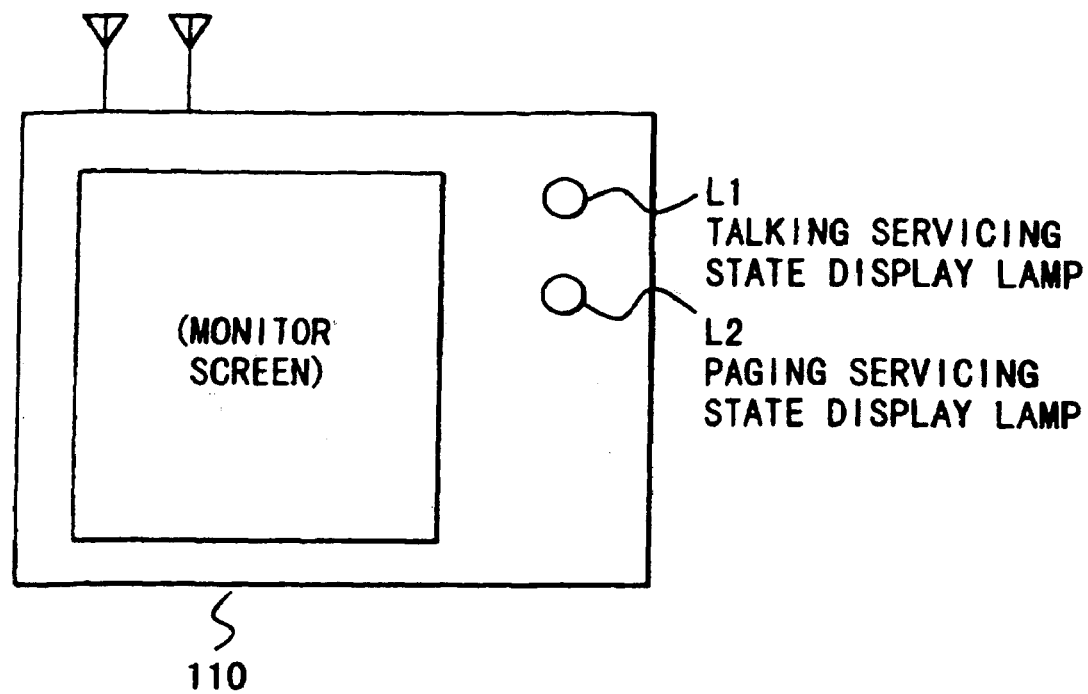
FIGS. 18A and 18B are views for explaining an example of how services to be provided are displayed according to the fourth embodiment of the present invention.

However, users differently sense the flickering cycle and the luminance of the lamp. With regards to luminance, in particular, the luminance is easily influenced by the surroundings. For this reason, as shown in FIG. 18A, there is provided another arrangement in which two lamps, i.e., a paging service lamp L1 and a telephone service lamp L2, are prepared.

Figure 18B:
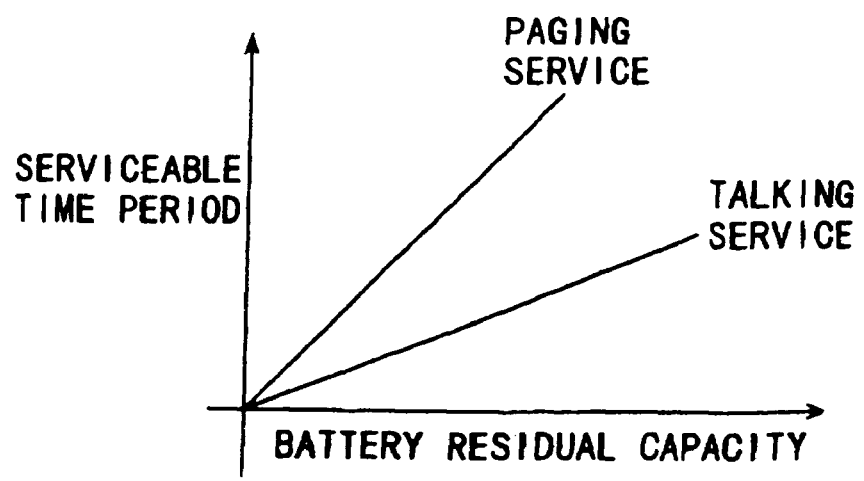

In accordance with notification information from the controller 112, the notification section 114 performs ON display control to emit "blue light" when the residual capacity of the battery incorporated in the radio terminal 110 is large, and to emit "red light" when the residual capacity is small. Since the power consumption per unit time for the paging service is different from that for the telephone service, the maximum service times of these services differ from each other even with the same battery residual capacity (FIG. 18B). In consideration of this, "red light" may be emitted with respect to the telephone service while "blue light" is emitted with respect to the paging service.

As described above, by displaying the types, qualities, and times of services with the lamps, the user can know the current state of the terminal, thereby improving the operability of the radio terminal 110.

As described above, the method of displaying the types, qualities, and times of services with the lamps mounted on the radio terminal 110 allows a simple arrangement and easy control, and hence is convenient. However, as the types of receivers of the radio terminals 110 and services increase, the number of lamps, the types of colors, and the types of flickering cycles greatly increase. For this reason, display using lamps may become complicated to make it difficult to comprehend the state of the terminal.

Figure 19A:
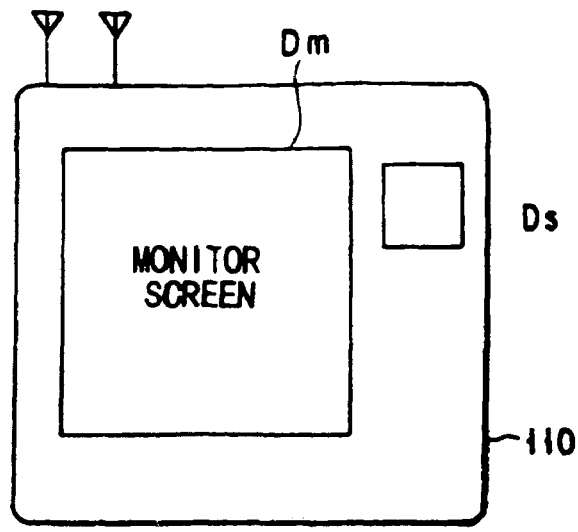
FIGS. 19A to 19E are views for explaining an example of how services to be provided are displayed according to the fourth embodiment of the present invention.

A display method using a monitor screen such as a liquid crystal display for picture display will therefore be described below. In this method, as shown in FIG. 19A, the radio terminal 110 includes a sub-monitor screen Ds for state display independently of a main monitor screen Dm, and the notification section 114 has a function of displaying graphical or character data corresponding to the state of the terminal. This display operation is performed by the notification section 114 on the basis of notification data from the controller 112. With the use of the monitor screen, "types", "qualities", "times", and the like of services can be displayed in characters or graphic patterns. Expression in graphic patterns, in particular, allows easy-to-understand display using information such as "area (size)", "color", "number", "position", and "roughness of graphic pattern".

Figure 19B:
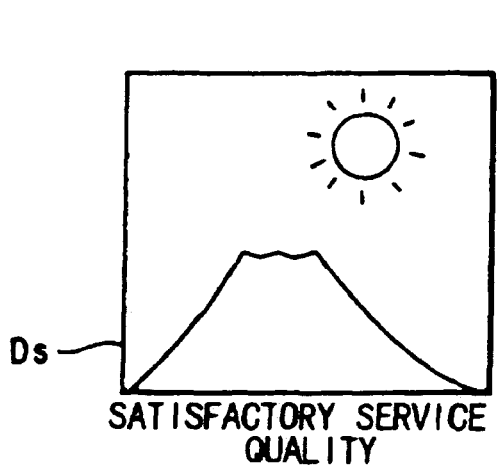
Figure 19C:
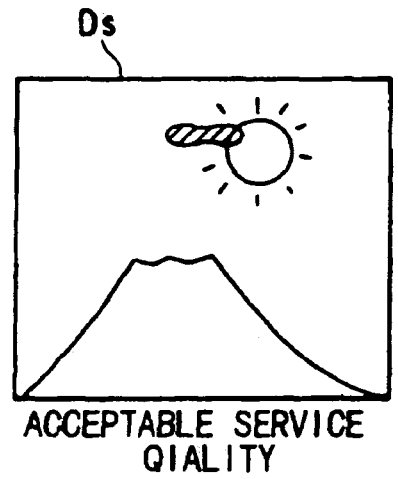
Figure 19D:
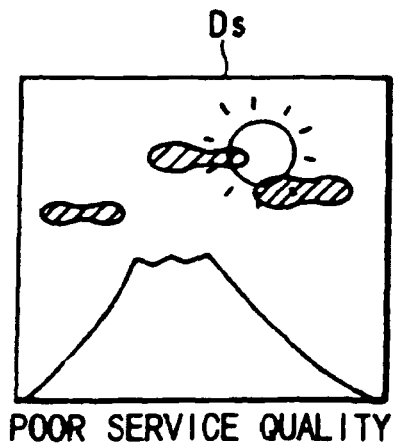
Figure 19E:
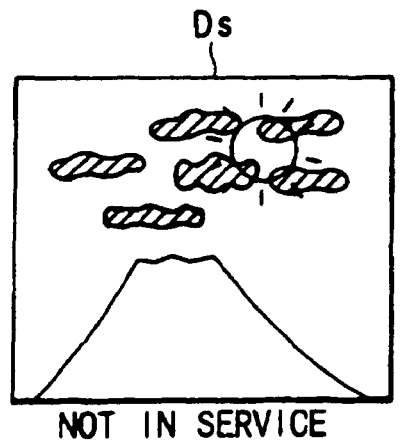

For example, as shown in FIG. 19B, good service quality is indicated by displaying a graphic pattern showing a cloudless sky. As the quality deteriorates, more clouds are displayed (FIGS. 19C, 19D, and 19E). Display of a sunset in a graphic pattern indicates an insufficient service time.

Figure 20A:
FIGS. 20A and 20B are views for explaining an example of how services to be provided are displayed according to the fourth embodiment of the present invention.
Figure 20B:
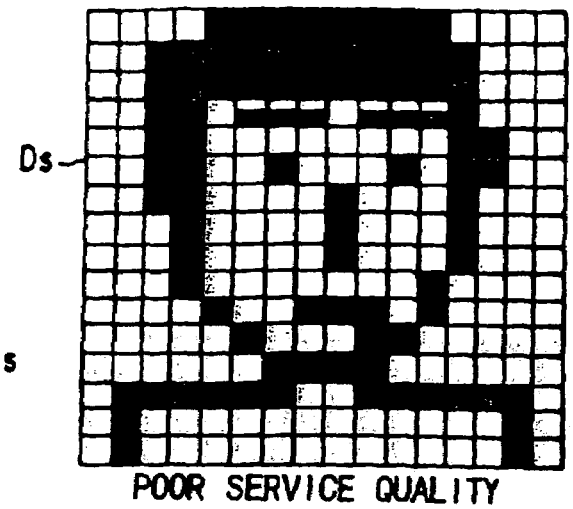
Figure 21A:
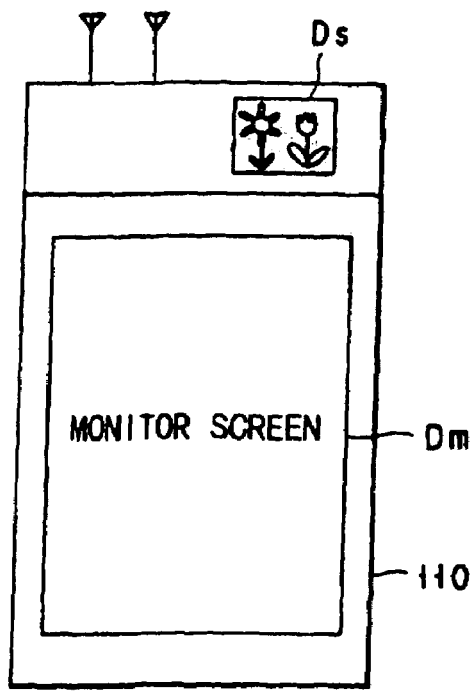
FIGS. 21A and 21B are views for explaining an example of how services to be provided are displayed according to the fourth embodiment of the present invention.
Figure 21B:
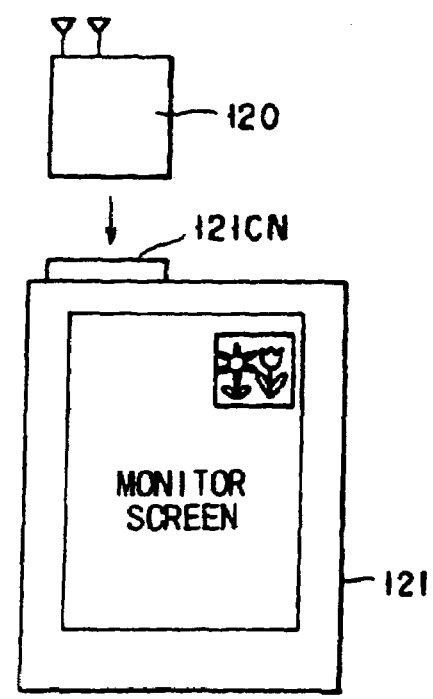

A human face may be drawn on a bit map. When the face is drawn with a high resolution, it indicates a good quality (see FIG. 20A). When the face is drawn with a low resolution, it indicates a poor quality (see FIG. 20B). In this case, a laughing face indicates that all the services can be received, but a crying face indicates that no services can be received. In addition, a service time may be indicated by displaying waxing and waning of the moon or an hourglass. As shown in FIGS. 21A and 21B, the numbers, types, and qualities of services which can be provided may be expressed by the manner in which floors bloom or the types of floors. The types, number, and qualities of services which can be provided may be expressed by the types, number, and movements of fishes swimming in a glass tank. Alternatively, the types, number, and qualities of services which can be provided may be expressed by the types (dog, cat, and the like), number, and movements of animals. In this manner, various expression methods may be used.

Figure 22A:
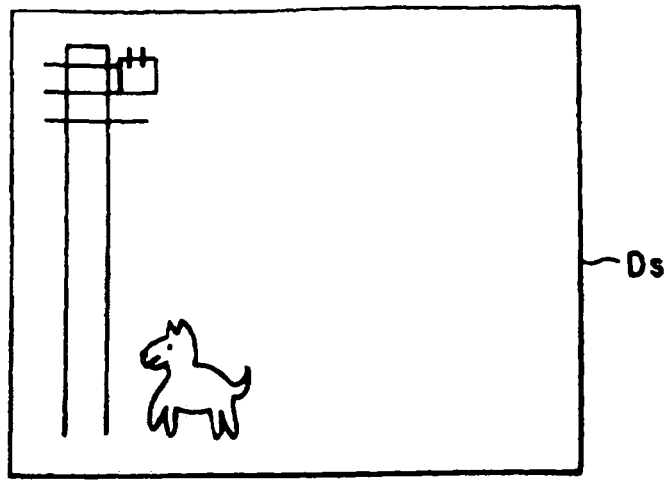
FIGS. 22A to 22C are views for explaining an example of how services to be provided are displayed according to the fourth embodiment of the present invention.
Figure 22B:
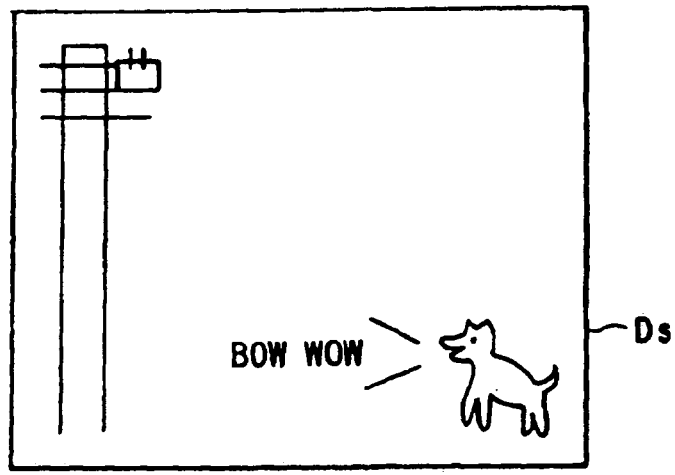
Figure 22C:
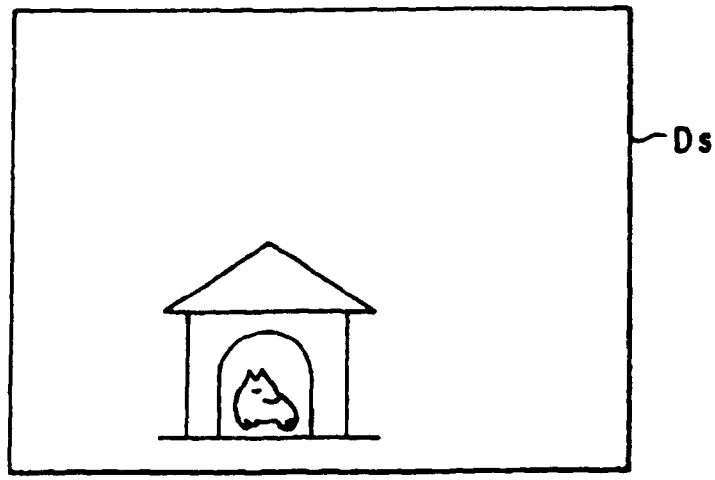

Such methods of using animals allow user-friendly expression of a service provision state, making the most of the behaviors and characteristics of animals. For example, a small battery residual capacity is indicated by displaying that an animal is feeding. This display is used as a symbol for urging the user to replace the battery. In addition, display that shows an animal is sleeping, disappears, or enters a house may be used as a symbol expressing the inability to provide a service (FIG. 22C). Display of a dog roaming around a telephone pole may express that the radio terminal is near a radio base station, and hence the communication quality is good (FIG. 22A). Furthermore, a decrease in distance between the dot and the telephone pole may express better communication quality, thereby allowing the user to intuitively understand the meaning of the display (FIG. 22A).

In this case, when the user feels a deterioration in communication quality during communication, he/she may maintain high communication quality by moving his/her position to bring the dog displayed as a symbol on the display screen close to the telephone pole.

In addition, the contents displayed on the sub-monitor screen can be made more intelligible by expressing them in both graphic patterns and characters. For example, display of flowers in full blossom indicates that there are many types of services which can be provided. In this case, when a menu button is depressed, many types of services are displayed in characters and graphic patterns. When the menu button is depressed while flowers in half blossom are displayed, about half the above types of services are displayed.

The radio terminal 110, which allows expressions in graphic patterns and characters using the monitor screen, is not only easy to use but also fun to operate. Users in various age groups therefore enjoy operating such radio terminals. That is, user-friendly radio terminals can be realized.

The method of appealing to the sense of hearing will be described next.

In this case, the notification section 114 has a loudspeaker function or the like. With the use of this method, the user can know at least one of the following factors: the types, qualities, and times of services which can be provided, without looking at the radio terminal 110. Assume that the user wants to receive a specific service, but is outside the corresponding service area. In this case, the user moves to search for the service area for the desired service by trial and error.

In this state, if the radio terminal 110 is designed to use the method of appealing to the sense of sight, the user must always watch the monitor screen of the radio terminal 110 to know its current state. It is dangerous to move on a street or in a building while watching the screen, posing a problem in terms of safety.

If, however, the method of appealing to the sense of hearing is used, the user can move without watching the radio terminal 110. The user can therefore safely move into the service area in which the desired service is provided.

In this case, when the types, qualities, times, and the like of services which can be provided change, the radio terminal 110 preferably notifies this change. A combination of the methods of appealing to the sense of hearing and sight is more effective. For example, the user causes the radio terminal 110 to display all services on the monitor screen, and selects a desired service from them in advance. If the user is within the service area, he/she can immediately receive the service. Assume that the user is outside the service area. In this case, when the user moves into the service, the radio terminal 110 generates a sound to notify the user that the service can be provided.

With this operation, the user can safely and quickly move into the service area in which the desired service can be provided. In addition, a bark of a dog may be used as the sound indication for a deterioration in the user environment. For example, the dog may start to bark during a service using the PHS function ("PHS" is expressed by a graphic pattern of the dog) to notify the user of a deterioration in the user environment for the PHS function (FIG. 22B).

In addition, the dog on the screen may be caused to start barking and feeding to notify the user of a small battery residual capacity and urge him/her to replace the battery.

A display operation using the sound indication is performed in this manner to conveniently and reliably notify the user of the current state of the terminal without requiring him/her to look at the screen.

The notification method using sounds may cause noise. For example, the use of such a method may cause a trouble in a place where many and unspecified persons gather, e.g., a public vehicle, a theater, or a waiting room. The method of appealing to the sense of touch is the third notification method free from such a problem.

The method of appealing to the sense of touch will be described. In this case, the notification section 114 has a vibration function using a motor or the like. By changing the manner of vibration, the user can be notified of the types, qualities, times, and the like of services which can be provided. Similar to the method of appealing to the sense of hearing, the method of appealing to the sense of touch becomes more effective in combination with the method of appealing to the sense of sight.

In this case, the radio terminal 110 vibrates instead of generating a sound in the method as the combination of the method of appealing to the sense of hearing and the method of appealing to the sense of sight. With this method, the user can safely and quickly move into the service area in which a desired service, without producing any noise.

In the above embodiments, the user is notified of services which can be used by radio communication, the states of the services, and the like for the user's convenience.

The fifth embodiment will be described next, in which a determining section for determining the types, qualities, and times of services which can be provided is arranged on the terminal side to notify the user of the determination result so as to considerably reduce the load on the terminal without degrading the operability of the terminal, thereby attaining reductions in size, weight, and cost of the terminal.

FIGS. 23 and 24 show the arrangements of a radio terminal 130 and a terminal module 140 according to embodiment [B2]. The radio terminal 130 and the terminal module 140 are driven by batteries BT. The radio terminal 130 and the terminal module 140 have the same arrangements as those of the radio terminal 110 and the terminal module 120 except that each unit additionally has a determining section for determining a combination of at least one of the following factors: "types", "number", and "qualities" of radio signals which can be received and "battery residual capacity" of the radio terminal 110 or the terminal module 120.

The determining section 131 detects "types", "number", and "qualities" of radio signals which can be received on the basis of data such as received signal strength indicators obtained from receivers 111a and 111b through a controller, and "battery residual capacity" on the basis of a directly measured voltage or current in the radio terminal 110 or the terminal module 120, and determines at least one of the following factors: "types", "qualities", and "times" of services which can be provided on the basis of a combination of at least one of the detected data, thereby obtaining the determination result.

Figure 25:
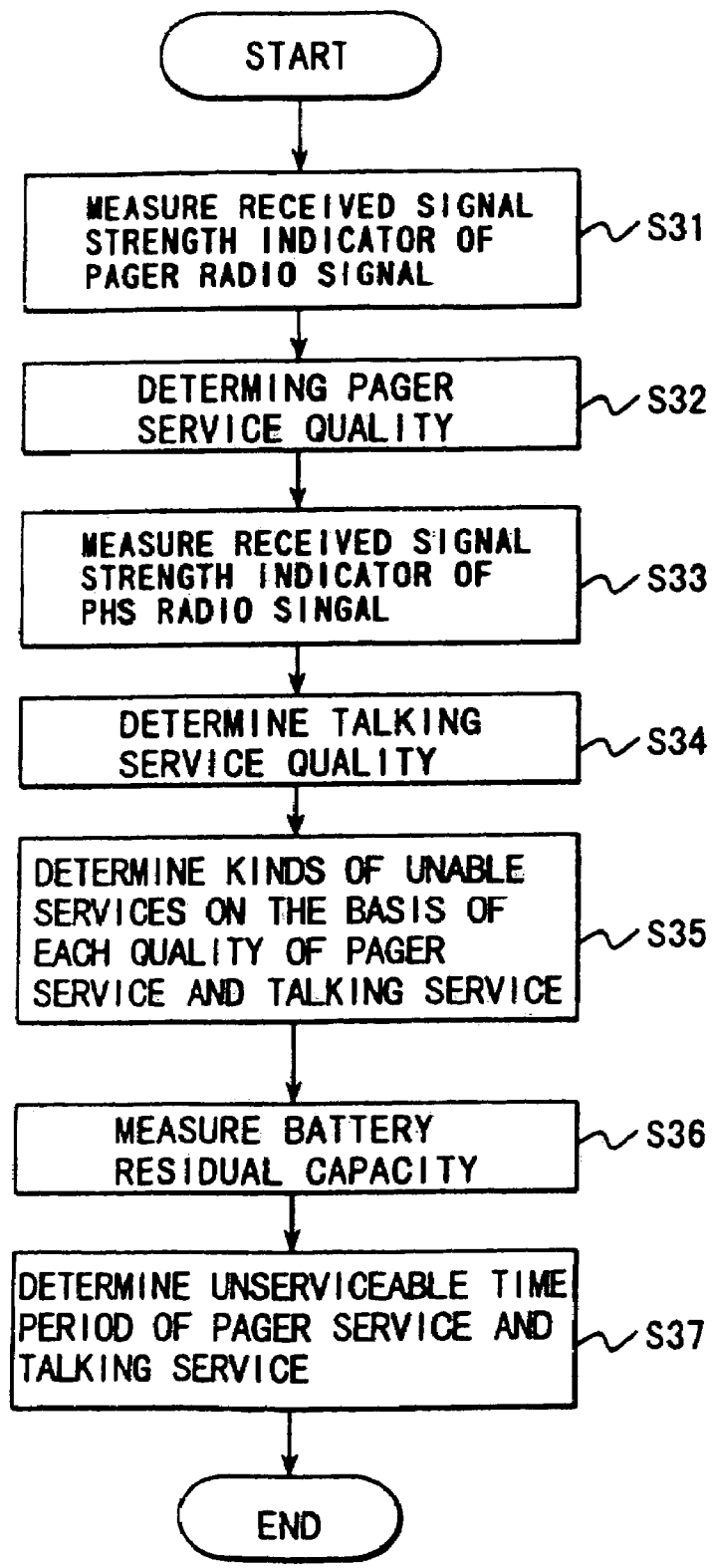
FIG. 25 is a flow chart showing a determination algorithm used by a determining section according to the fifth and sixth embodiments of the present invention.

Assume that the radio terminal 110 have two receivers as a pager and a PHS, and services which can be provided are limited to a service (paging service) of calling the user by using the pager and a telephone service using the PHS. FIG. 25 shows an algorithm by which the determining section 131 performs determination.

The determining section 131 obtains measurement data of the received signal strength indicator of a pager radio signal to determine the quality of the paging service. The determining section 131 also obtains measurement data of the received signal strength indicator of a PHS radio signal to determine the quality of the telephone service. The determining section 131 then determines the types of services which can be provided on the basis of the qualities of the paging service and the telephone service. In addition, the determining section 131 measures a battery residual capacity to determine service times as periods of time during which the paging service and the telephone service can be provided. The above operations are the contents of the algorithm shown in FIG. 26. A notification section 114 notifies the user of the determination results obtained by the determining section 131 in this manner.

In each embodiment described above, the terminal has the determining section for determining the types, qualities, and times of services which can be provided, and notifies the user of the determination result. With this operation, the load on the terminal can be considerably reduced without any deterioration in the operability of the terminal, thereby realizing a compact, lightweight, and low-cost terminal.

Such a function may be arranged on the network side instead of the terminal to notify the user of the terminal of the determination result. In this case, the load on the terminal can be reduced without any deterioration in the operability of the terminal, thereby attaining further reductions in size, weight, and cost of the terminal. An embodiment having such an arrangement will be described next as the sixth embodiment of the present invention.

Figure 26:
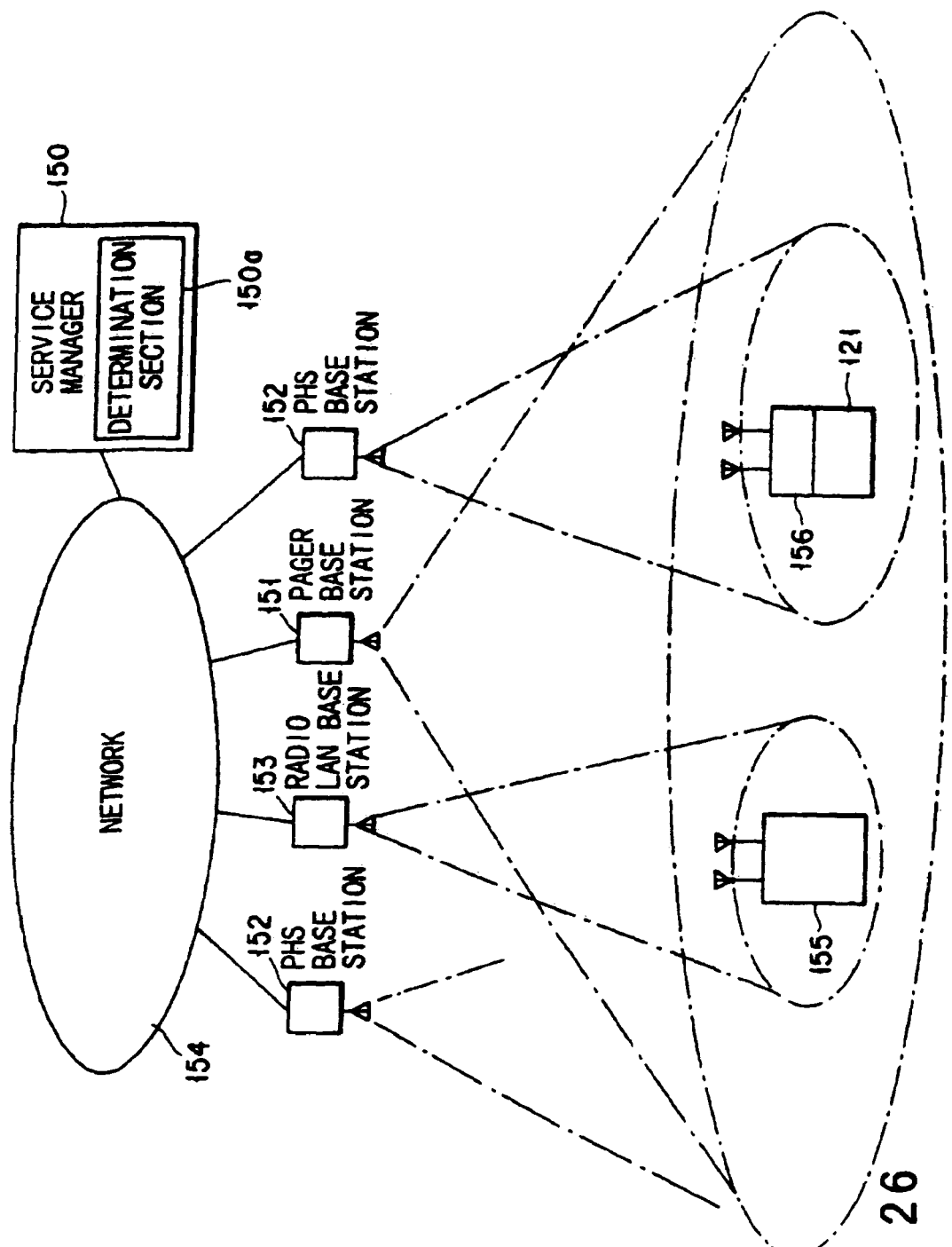
FIG. 26 is a view showing the arrangement of a radio communication system according to the sixth embodiment of the present invention.

FIG. 26 shows the arrangement of a radio communication system according to embodiments [B3] and [B4]. FIG. 26 shows a service manager 150, a pager base station 151, a PHS base station 152, and a radio LAN base station 153, which are connected to each other through a network 154. A radio terminal 155 is a mobile, portable terminal. The radio terminal 155 includes one or a plurality of transmitters for transmitting one or a plurality of up-link radio signals (up-link radio channels) to a radio terminal 110.

In this case, the radio terminal 155 includes a unit obtained by connecting the terminal module 156, which includes one or a plurality of transmitters for transmitting one or a plurality of up-link radio signals to the terminal module 120 described with reference to FIG. 15, and the terminal 121, which includes the user interface.

The service manager 150 connected to the network 154 includes a determining section 151 for obtaining "types", "number", and "qualities" of radio signals which can be received by the radio terminal 155 or the terminal module 156, and "battery residual capacity" data of the radio terminal 155 or the terminal 121, and determining at least one of the following factors: types", "qualities", and "times" of services which can be provided through the radio terminal 155 or the terminal 121 on the basis of a combination of at least one of the obtained data.

The algorithm by which the determining section 151 performs determination is the same as that for the determining section 131 described with reference to FIG. 25, and hence a repetitive description will be avoided.

Figure 27:
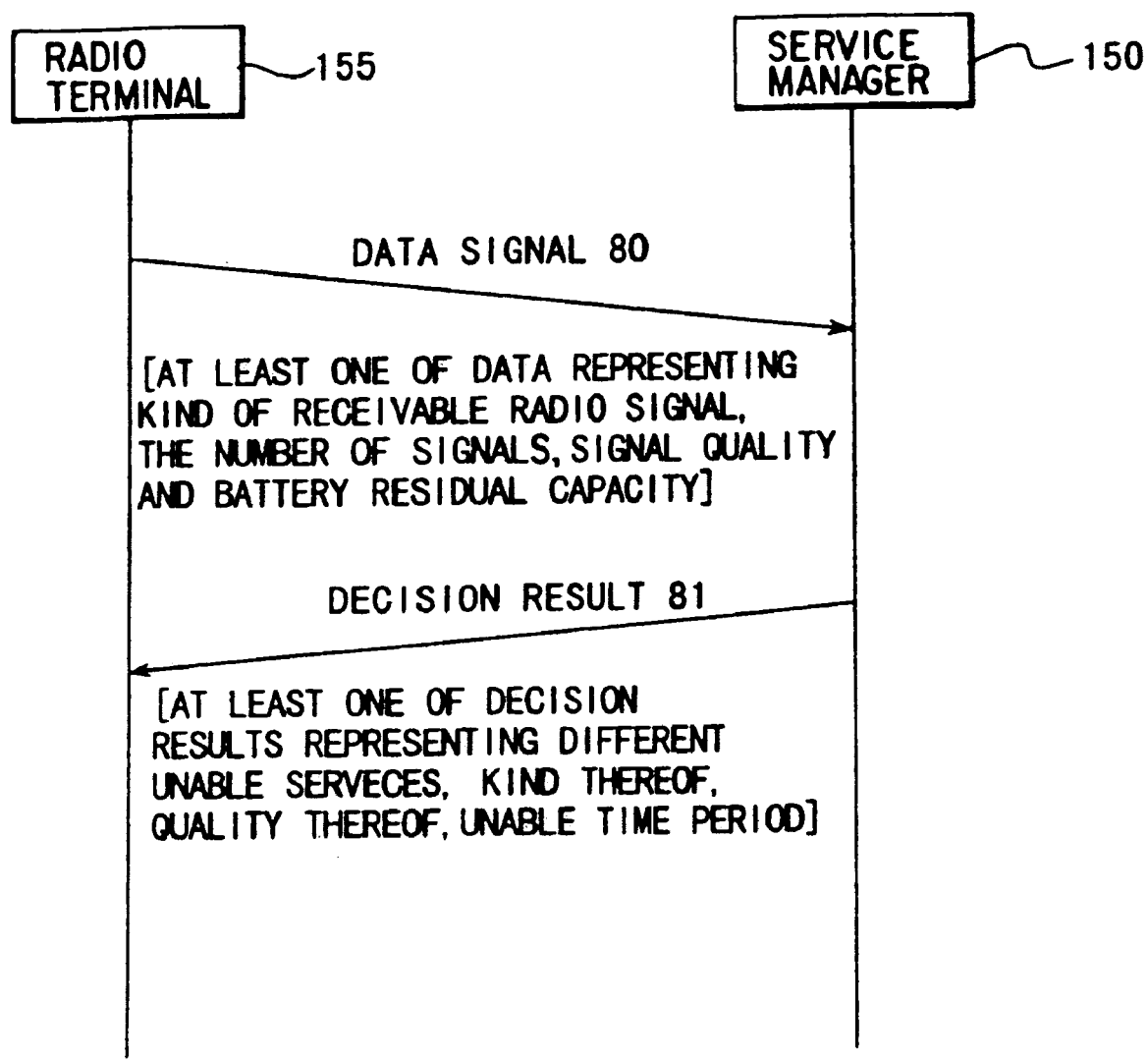
FIG. 27 is a view showing a communication sequence according to the sixth embodiment of the present invention.

A combination of at least one of the following factors: "types", "number", and "qualities" of radio signals which can be received by the radio terminal 155 or the terminal module 156 is transferred from the radio terminal 155 or the terminal module 156 to the determining section 151 through at least one up-link radio signal (FIG. 27). With this operation, the service manager 150 can determine the types, qualities, and times of services which can be provided for the radio terminal 155 or the terminal 121. The service manager 150 transfers the determination result to the radio terminal 155 or the terminal 121. The radio terminal 155 or the terminal 121 uses the notification section 114 to notify the user of the determination result, as described with reference to the fourth embodiment.

Since the service manager arranged on the network side instead of the terminal has the determining section for determining the types, qualities, and times of services which can be provided, the load on the terminal can be considerably reduced without any deterioration in operability of the terminal. Therefore, further reductions in size, weight, and cost of the terminal can be attained.

Appropriate control for a case wherein a communication service is received between radio terminals will be described next. Assume that the types and qualities of radio signals which can be received on the calling side and its battery residual capacity are different from those on the paging side. In this case, even if the side in a good condition tries to communicate in the best state, it is useless to perform communication if the other side is in a bad condition.

If, in receiving a communication service between radio terminals, the types and qualities of radio signals which can be received on the calling side and its battery residual capacity are different from those on the paging side, it is useless to perform communication unless the communication is performed on the basis of the side in a bad condition. In addition, a service which can be used on the side in a good condition may not be used or limited on the side in a bad side. As a result, the usage of services may be confused. An embodiment in which a user is notified of the types, qualities, times, and the like of proper services which can be provided in consideration of the conditions of the two sides which are to communicate with each other will be described.

Figure 28:
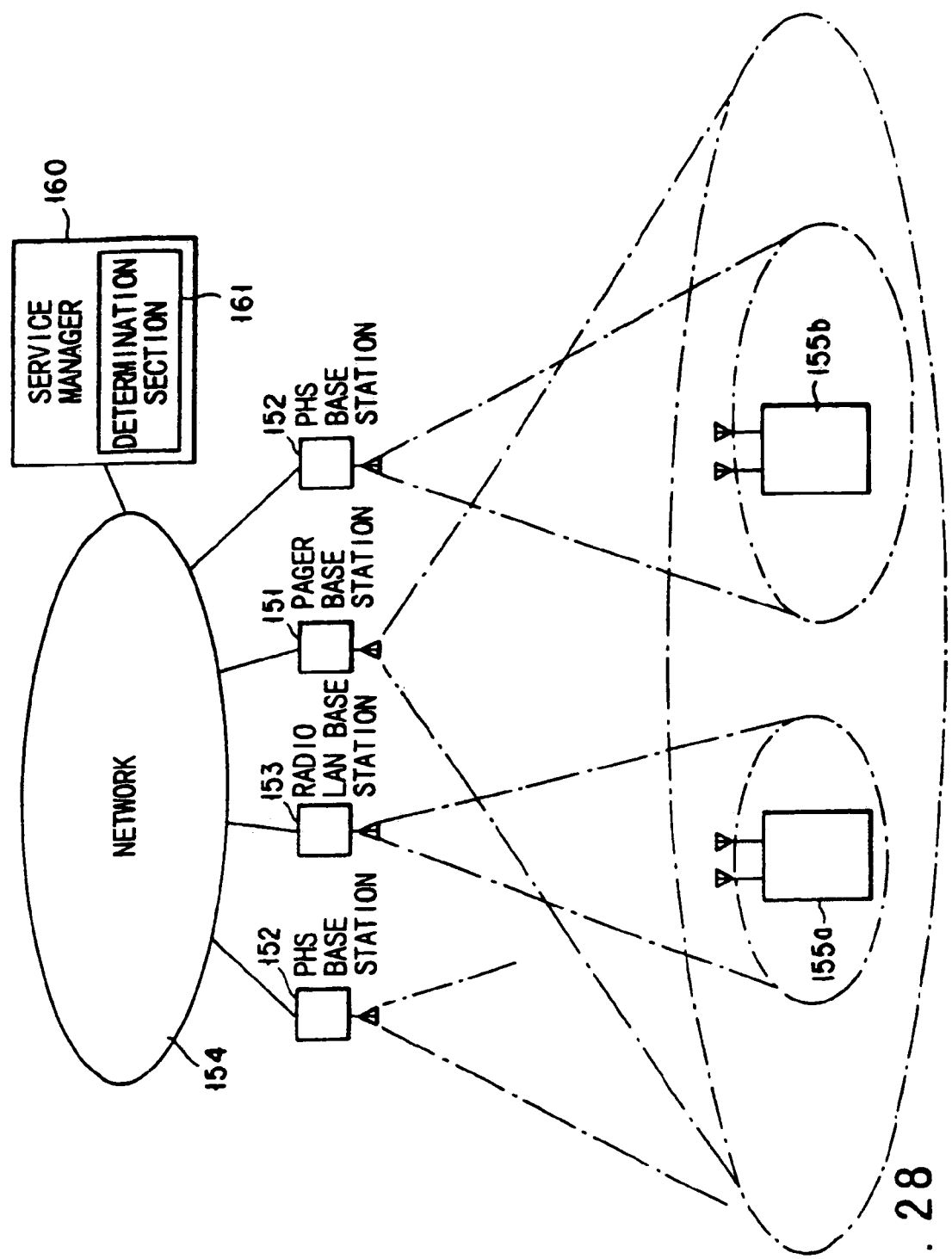
FIG. 28 is a view showing the arrangement of a radio communication system according to the seventh embodiment of the present invention.

FIG. 28 shows the arrangement of a radio communication system according to embodiment [B3-a]. FIG. 28 shows a service manager 160, a pager base station 151, a PHS base station 152, and a radio LAN base station 153, which are connected to each other through a network 154. Each of radio terminals 155a and 155b includes one or a plurality of transmitters for transmitting one or a plurality of up-link radio signals (up-link radio channels) to a radio terminal 110.

In this case, each of the radio terminals 155a and 155b includes a terminal obtained by connecting the terminal module 156, which has one or a plurality of transmitters for transmitting one or a plurality of up-link radio signals to the terminal module 120 described with reference to FIG. 15, and the terminal 121, which has a user interface.

Each of the radio terminals 155a and 155b includes a battery measuring function, and a function of measuring the battery capacity of the self-terminal upon reception of a battery measuring instruction from the base station side, and returning the measurement result to the base station side.

The following description is based on the radio terminals 155a and 155b. In receiving a communication service between the radio terminals 155a and 155b, the service manager 160 includes a determining section 161 for determining at least one of the following factors: "types", "qualities", and "times" of services which are provided between the radio terminals 155a and 155b on the basis of a combination of at least one of the following data: "types", "number", and "qualities" of radio signals which can be received by the two radio terminals 155a and 155b and "battery residual capacities" of the radio terminals 155a and 155b.

Figure 30:
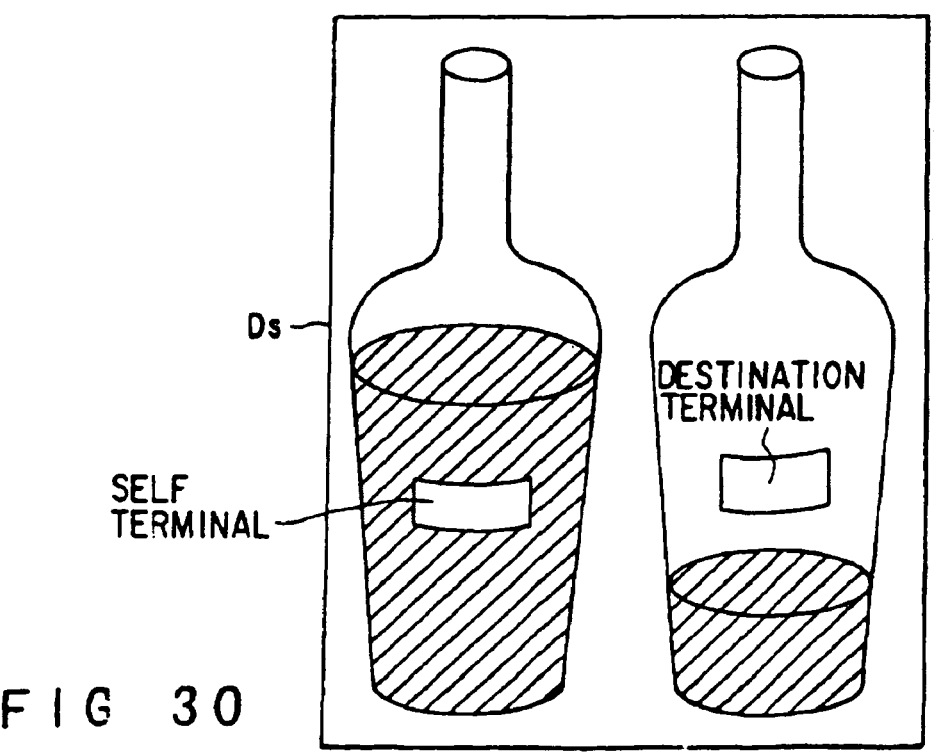
FIG. 30 is a view showing an example of how services to be provided are displayed according to the seventh and eighth embodiments of the present invention.

In this case, the radio terminals 155a and 155b include PHS transceivers, and services which can be provided are limited to two services, i.e., a telephone service using the PHS and a picture transmission service. FIG. 30 shows an algorithm by which the determining section 161 determines "types", "qualities", "times", and the like of services which can be provided.

Figure 29:
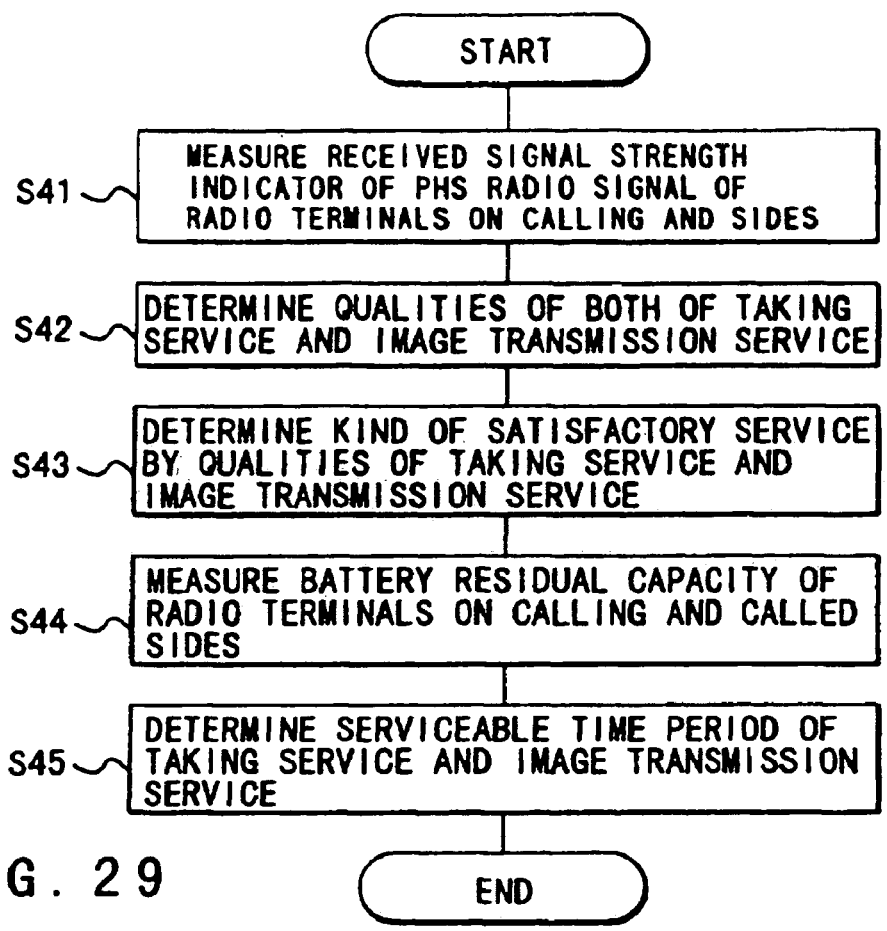
FIG. 29 is a flow chart showing a determination algorithm used by a determining section according to the seventh and eighth embodiments of the present invention.

The procedure shown in FIG. 29 will be described. The signal strength indicators of PHS radio signals at the radio terminals on the calling and paging sides are measured. The qualities of the telephone service and the picture transmission service are determined on the basis of the measurement result. The types of services which can be provided are determined on the basis of the qualities of the telephone service and the picture transmission service. An instruction to return a measurement result is given to each of the two radio terminals on the calling and paging sides so as to cause each terminal to measure its battery residual capacity. The periods of time during which the telephone service and the picture transmission service can be provided are determined on the basis of the measured battery residual capacities.

As described above, in receiving a communication service between radio terminals, the above algorithm is used to determine the types, qualities, times, and the like of appropriate services which can be provided even in a case wherein the types and qualities of radio signals which can be received on the calling side and its battery residual capacity are different from those on the paging side.

In this determination processing, when service times are to be determined, the battery residual capacities of the radio terminals 155a and 155b are measured, and the service times are generally determined in accordance with the smaller battery residual capacity. In this case, the service times may be short even though the battery residual capacity of the self-terminal is large, or the service quality may be poor even though the received signal strength indicator of the self-terminal is high.

FIG. 30 shows an example of how the types, qualities, times, and the like of services which can be provided are notified.

FIG. 30 shows a notification example of the service times and communication qualities of the self-terminal and the distant terminal. As shown in FIG. 30, two wine bottles are displayed. The amounts of wine left in the bottles express service times obtained from the battery residual capacities of the self-terminal and the distant terminal.

If, for example, the user notices that the service time becomes short as the battery residual capacity of the self-terminal becomes small, the user easily understand that the battery should be recharged. In addition, wine may be colored. For example, red wine expresses a high received signal strength indicator and hence a good quality, and white wine expresses a low received signal strength indicator and hence a poor quality. With this display, when the received signal strength indicator of the self-terminal is low, the user easily understand that he/she should move to a place where the received signal strength indicator is high.

Consider the overall evaluation of states in the scheme of separately displaying the states of the self-terminal and the distant terminal. When, for example, a service time is to be evaluated, the overall service time becomes equal to the service time of the terminal which has a shorter service time. This is because, when the battery of one terminal runs down, communication cannot be performed between the two terminals even if the battery residual capacity of the other terminal is sufficiently large.

A combination of at least one of the following factors: "types", "number", and "qualities" of radio signals which can be received by each of the radio terminals 155a and 155b, is sent from each of the radio terminals 155a and 155b to the base station through at least one up-link radio signal. Upon reception of these data, the base station sends them to the service manager 160 through the network 154. The service manager 160 transfers the received data to the determining section 151 (FIG. 27). The determining section 151 performs determination on the basis of these data. With this operation, the service manager 160 can determine "types", "qualities", and "maximum service times" of services which can be provided for the radio terminals 155a and 155b. The service manager 160 transfers the determination result to the radio terminals 155a and 155b. The radio terminals 155a and 155b use notification sections 114 like those described with reference to the fourth embodiment and FIGS. 14 and 15 to notify the users of the determination result.

As described above, the service manager includes the determining section for determining "types", "qualities", and "maximum service times" of services which can be provided on the basis of "types", "number", and "qualities" of radio-signals and "battery residual capacity" on the paging terminal as well as those on the calling terminal. With this arrangement, since determination is performed on the basis of the state of the distant terminal as well as the state of the self-terminal, "types", "qualities", and "maximum service times" of services which can be provided can be properly determined even when a communication service is to be received between the two radio terminals.

Since the determining section for determining the types, qualities, and maximum service times of services which can be provided is arranged in the service manger instead of the terminal, the load on the terminal can be considerably reduced without any deterioration in operability of the terminal. A compact, lightweight, and low-cost terminal can therefore be realized.

The eighth embodiment will be described below, in which the types, number, and qualities of radio signals which can be received by each radio terminal and its battery residual capacity are received from each radio terminal and stored, each radio terminal can determine the types, qualities, and maximum service times of services which can be provided, by using these data, in performing communication, and the determination result can be presented to the user.

Figure 31:
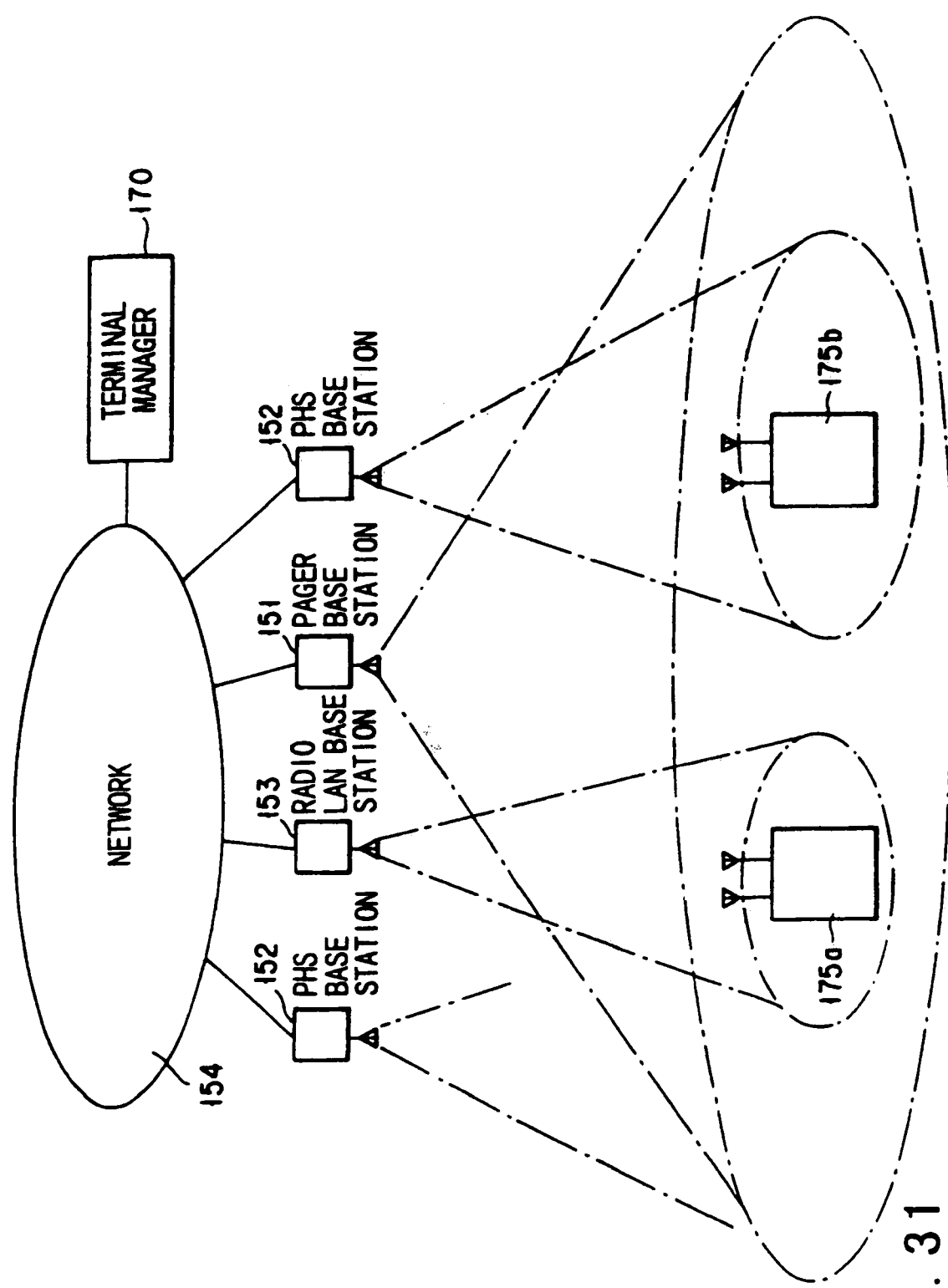
FIG. 31 is a view showing the arrangement of a radio communication system according to the eighth embodiment of the present invention.

FIG. 31 shows the arrangement of a radio communication system according to embodiment [B2-a]. FIG. 31 shows a terminal manager 170, a pager base station 151, a PHS base station 152, and a radio LAN base station 153, which are connected to each other through a network 154. Each of radio terminals 175a and 175b includes one or a plurality of transmitters for transmitting one or a plurality of up-link radio channels to a radio terminal 130.

In this case, each of the radio terminals 175a and 175b includes a terminal obtained by connecting the terminal module 156, which has one or a plurality of transmitters for transmitting one or a plurality of up-link radio signals to the terminal module 140 described with reference to FIG. 15, and the terminal 121, which has a user interface. The following description is based on the radio terminals 175a and 175b.

The terminal manager 170 is a unit for receiving data such as the types, number, and qualities of radio signals which can be received by each radio terminal and its battery residual capacity from each radio terminal, and storing the data.

Each of the radio terminals 175a and 175b notifies the terminal manager 170 connected to the network 154 of a combination of at least one of the following factors: the types, number, and qualities of radio signals which can be received by the self-terminal and its residual battery capacity by using an up-link radio signal. The terminal manager 170 stores the data sent from each radio terminal 175.

When the radio terminal 175a is to receive a communication service with respect to the radio terminal 175b, the radio terminal 175a reads out a combination of at least one of the following factors from the terminal manager 170: the types, number, and qualities of radio signals which can be received by the radio terminal 175b as a communication partner and the battery residual capacities of the radio terminals 175a and 175b.

The radio terminal 175a then determines the types, qualities, times, and the like of services which can be provided on the basis of the readout data and a combination of at least one of the following factors: the types, number, and qualities of radio signals which can be received by the self-terminal and the battery residual capacities of the radio terminals 175a and 175b. Since the determination algorithm used in this embodiment is the same as that used in the fourth embodiment, a repetitive description will be avoided. In addition, since the notification method in this embodiment is the same as that in the seventh embodiment, a description thereof will be omitted.

As described above, each of the radio terminals 175a and 175b includes the determining section for determining the types, qualities, and times of services which can be provided on the basis of the types, number, and qualities of radio signals which can be received by the paging terminal and its residual battery capacity, read out from the terminal manager, as well as those on the calling terminal side. With this arrangement, the types, qualities, and times of services which can be provided can be properly determined even when a communication service is to be received between the two radio terminals. Each user can therefore be notified of the types, qualities, and service times of services which can be provided. By using graphic patterns, light, sounds, characters, and the like for notification, anybody can easily enjoy recognizing the types, qualities, and times of services which can be provided.

As described in detail above, according to the present invention, a control procedure for efficient data transmission can be provided for a radio communication system having narrow-band up- and down-link radio channels and a wide-band down-link radio channel. In this system, when a radio terminal is to receive data through a wide-band down-link radio channel, it is essential that narrow-band up- and down-link radio channels are assigned to the radio terminal in advance. With this operation, communication can be performed by using the wide-band down-link radio channel. In addition, the narrow-band up- and down-link radio channels can be used as radio channels for performing control for efficient data transmission using the wide-band down-link radio channel.

Furthermore, according to the present invention, anybody can easily enjoy recognizing the types, qualities, and times of services which can be provided. As a result, users in various age groups can receive various services using radio terminals.

The ninth embodiment of the present invention will be described with reference to FIG. 32.

Figure 32:
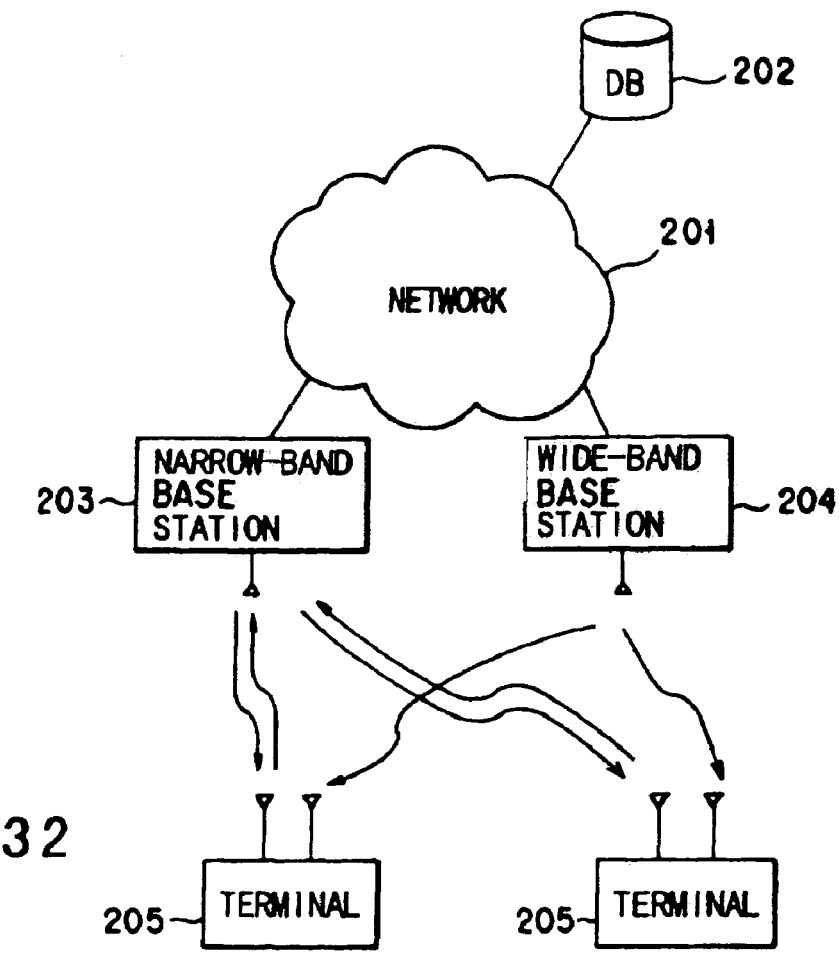
FIG. 32 is a view schematically showing the overall arrangement of a radio communication system according to the ninth embodiment of the present invention.

In the radio communication system in FIG. 32, a database 202, a narrow-band radio base station 203, and a wide-band radio base station 204 are connected to a network 201 so that they can communicate with each other. In the following description, the narrow-band and wide-band radio base stations are sometimes simply referred to as base stations.

The narrow-band radio base station 203 performs control to connect a radio communication terminal (to be simply referred to as a terminal hereinafter) 205 to the network 201 by providing up- and down-link narrow-band radio channels with a low radio transmission speed (e.g., several tens Kbps to several Mbps) for the terminal 205.

The wide-band radio base station 204 performs control to connect the terminal 205 to the network 201 by providing a wide-band down-link radio channel (from the radio base station to the terminal) with a high radio transmission speed (e.g., 10 Mbps) for the terminal 205.

The radio communication terminal 205 includes a narrow-band radio transceiver 223 and a wide-band radio receiver 224. The terminal 205 is connected to the network 201 through radio channels provided from the narrow-band radio base station 203 and the wide-band radio base station 204.

Figure 33:
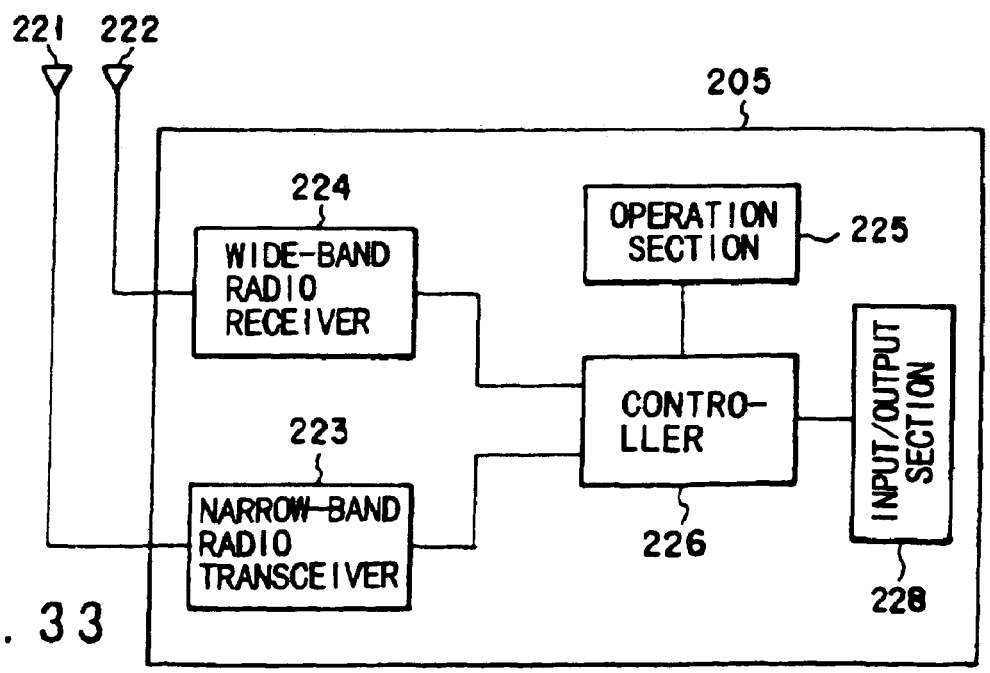
FIG. 33 is a block diagram showing the schematic arrangement of a radio communication terminal.

Referring to FIG. 33, the terminal 205 is constituted by an antenna 221 and the narrow-band radio transceiver 223, which are used to transmit/receive data to/from the narrow-band radio base station 203 through bidirectional radio channels, an antenna 222 and the wide-band radio receiver 224, which are used to receive data from the wide-band radio base station 204 through a down-link radio channel, an operating section 225 serving as a user interface which is operated by the user to input various instructions and perform other operations, an input/output section 228 for outputting speech data, picture data, and data received by the narrow-band radio transceiver 223 or the wide-band radio receiver 224 and inputting speech, a picture, and data desired by the user, and a controller 226 which is connected to the narrow-band radio transceiver 223, the wide-band radio receiver 224, the operating section 225, and the input/output section 228 to perform overall control therefor. In general, the wide-band radio receiver 224, which receives data through a wide-band radio channel, consumes larger power than the narrow-band radio transceiver 223, which receives data through a narrow-band radio channel.

The database 202 is a server for supplying data to the terminal 205 connected, as a client, to the network through radio channels provided from the narrow-band radio base station 203 and the wide-band radio base station 204 in response to a request from the terminal 205. When the terminal 205 transmits a data transmission request to the database 202 through a narrow-band up-link (from the terminal to the radio base station) radio channel and the network 201, the database 202 transmits the requested data to the terminal 205 through the network 201 and a wide-band down-link radio channel.

In order to support a predetermined communication protocol between the terminal 205 and each radio base station, a hierarchical structure constituted by layers 1 to 3 complying with an OSI model is applied to the terminal 205 and the radio base station each. In this case, for example, a structure complying with a PHS hierarchical structure is applied. More specifically, layer 1 (L1) has a function of guaranteeing transmission of a bit stream by using a communication channel based on a physical medium, and defining a frequency to be used, a transmission output, a modulation/demodulation scheme, an access scheme, and the like. Layer 2 (L2) is higher in level than layer 1, and has a function of realizing transparent, reliable data transmission between nodes by using the bit stream transmission function provided by layer 1. Layer 3 has a function of performing end-to-end data transfer by using the data transfer function provided by layer 2. Layer 3 defines a call control function (CC) in an originating/terminating operation, a radio management function (RT), connection switching (MM) upon movement of the terminal between base stations, management (LM) of the respective functions, i.e., layer 1, layer 2, layer 3, CC, RT, and MM.

As described above, call setting control and call disconnection control are performed by the function of layer 3. In general, at a radio portion (between a radio communication terminal and a radio base station), when call setting is to be performed, a link must be established in advance between layers 1 and 2. When call disconnection is to be performed, layer 2 must be released from layer 1 after call disconnection. In the communication system having the arrangement shown in FIG. 32, the narrow-band radio base station 203, the database 202, and the wide-band radio base station 204 can communicate with each other through the network 201. Call setting control and call disconnection control between the wide-band radio base station 204 and the terminal 205 can therefore be performed by using the resources of the network 201 (from layer 1 to layer 2).

Figure 34:
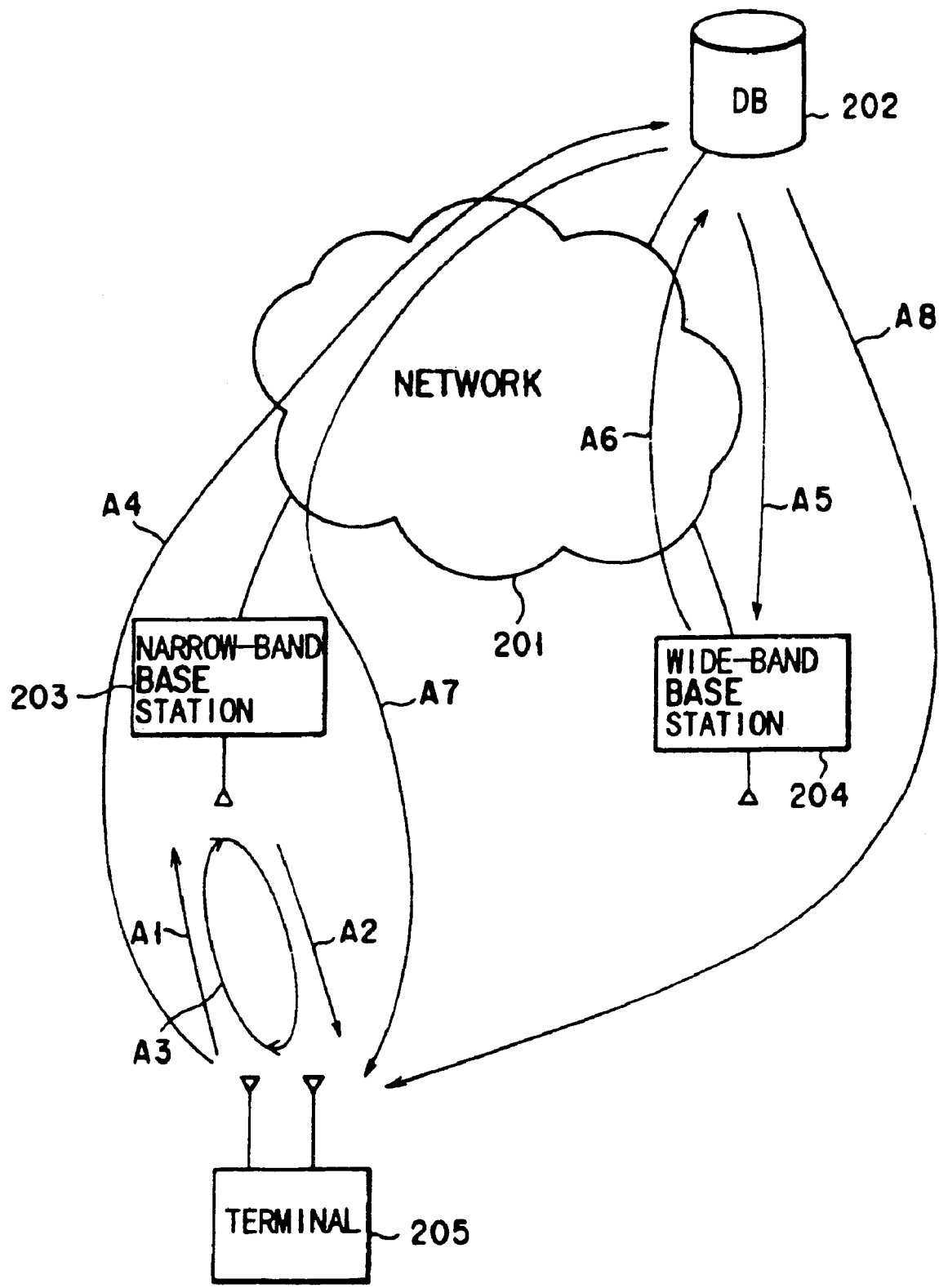
FIG. 34 is a view for briefly explaining a method of controlling call setting between a radio communication terminal and a database (server)

A method of performing call setting control between the terminal 205 and the database 202 will be briefly described next with reference to FIG. 34. Steps A1 to A8 in the following description correspond to reference symbols A1 to A8 in FIG. 34.

(A1) Upon reception of a predetermined instruction input from the user through the user interface (U I/F), the terminal 205 transmits a call setting request to the narrow-band radio base station 203 by random access.

(A2) In response to this request, the narrow-band radio base station 203 assigns an available physical slot (radio channel) to the terminal 205.

(A3) A link for the radio channel is established through this assigned physical slot (a link for layer 1) is established. In addition, a link for the data link layer (layer 2) of a control channel is established, and call setting is performed by layer 3. With this operation, narrow-band bidirectional radio channels are established between the narrow-band radio base station 203 and the terminal 205.

(A4) Call setting is performed between the database 202 and the terminal 205 by using the established narrow-band bidirectional radio channels.

First of all, the terminal 205 transmits a call setting request to the database 202 through the established narrow-band up-link radio channel. This call setting request message is sent to the database 202 through the network 201.

(A5) The database 202 transmits, to the wide-band radio base station 204 through the network 201, a message for reserving (assigning) the band of a wide-band down-link radio channel between the terminal 205 and the database 202.

(A6) Upon reception of this message, the wide-band radio base station 204 reserves the band of the wide-band radio channel and transmits a reservation response message to the database 202 through the network 201.

(A7) Upon reception of the reservation response message, the database 202 transmits the call setting response message to the terminal 205 through the network 201, the narrow-band radio base station 203, and the narrow-band down-link radio channel.

(A8) With the above steps, data can be transmitted from the database 202 to the terminal 205 through the wide-band down-link radio channel from the wide-band radio base station 204 to the terminal 205.

A method of performing call connection control between the terminal 205 and the database 202 will be described in detail next with reference to FIGS. 35 to 37.

In a communication system to which this method is to be applied, the narrow-band radio base station in FIG. 32 constitutes a PHS. By adding a wide-band own-link radio channel (e.g., 10 Mbps) to this PHS, for example, desired text or picture data can be downloaded from the database 202 on the network 201 at a high speed. Steps S1 to SB in the following description correspond to reference symbols S1 to S8 in FIGS. 35 to 37.

Figure 35:
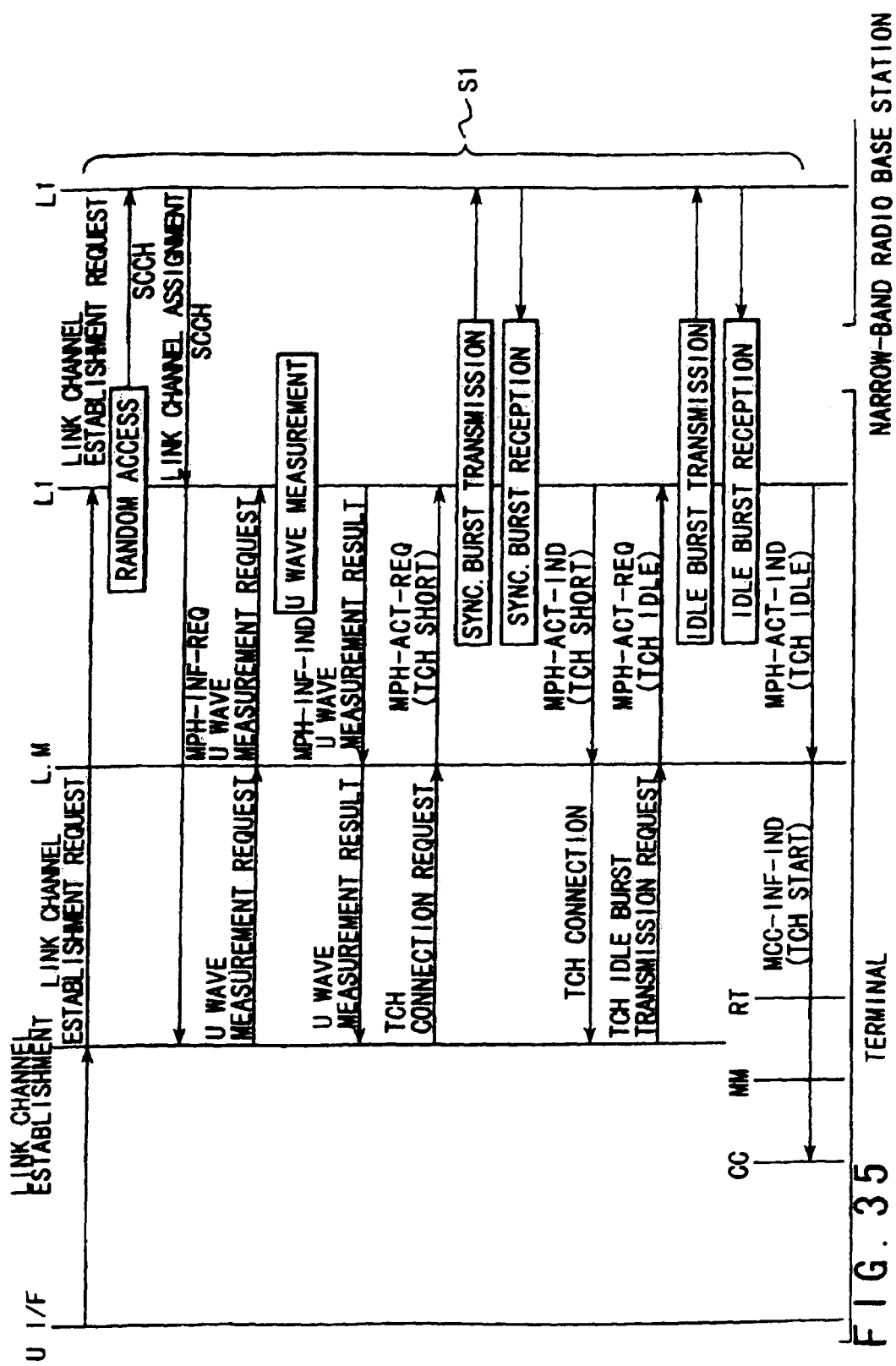
FIG. 35 is a view for explaining the details of the method of controlling call setting between the radio communication terminal and the database (server)

(S1) As shown in FIG. 35, upon reception of a download request for data from the user through the user interface (U I/F) of the key input operating section or the like, the terminal 205 establishes a link for narrow-band bidirectional radio channels.

More specifically, the terminal 205 transmits a link channel establishment request message to the narrow-band radio base station 203 by random access. In this case, an up-link control channel (SCCH) on a control physical slot is used. In response to this request, the narrow-band radio base station 203 assigns an available radio channel (communication physical slot) to the terminal 205, and transmits, to the terminal 205, a link channel assignment message for notifying the assignment result. In this case, a down-link control channel (SCCH) on the control physical slot is used.

Subsequently, the terminal 205 establishes a link for the physical layer (layer 1) by using the assigned physical slot. More specifically, the terminal 205 confirms link establishment by transmitting/receiving short bursts (sync. burst and idle burst) between the terminal 205 and the narrow-band radio base station 203 by using the assigned physical slot.

With the above operation, a link for the physical layer for the narrow-band bidirectional radio channels is established between the narrow-band radio base station 203 and the terminal 205.

Figure 36:
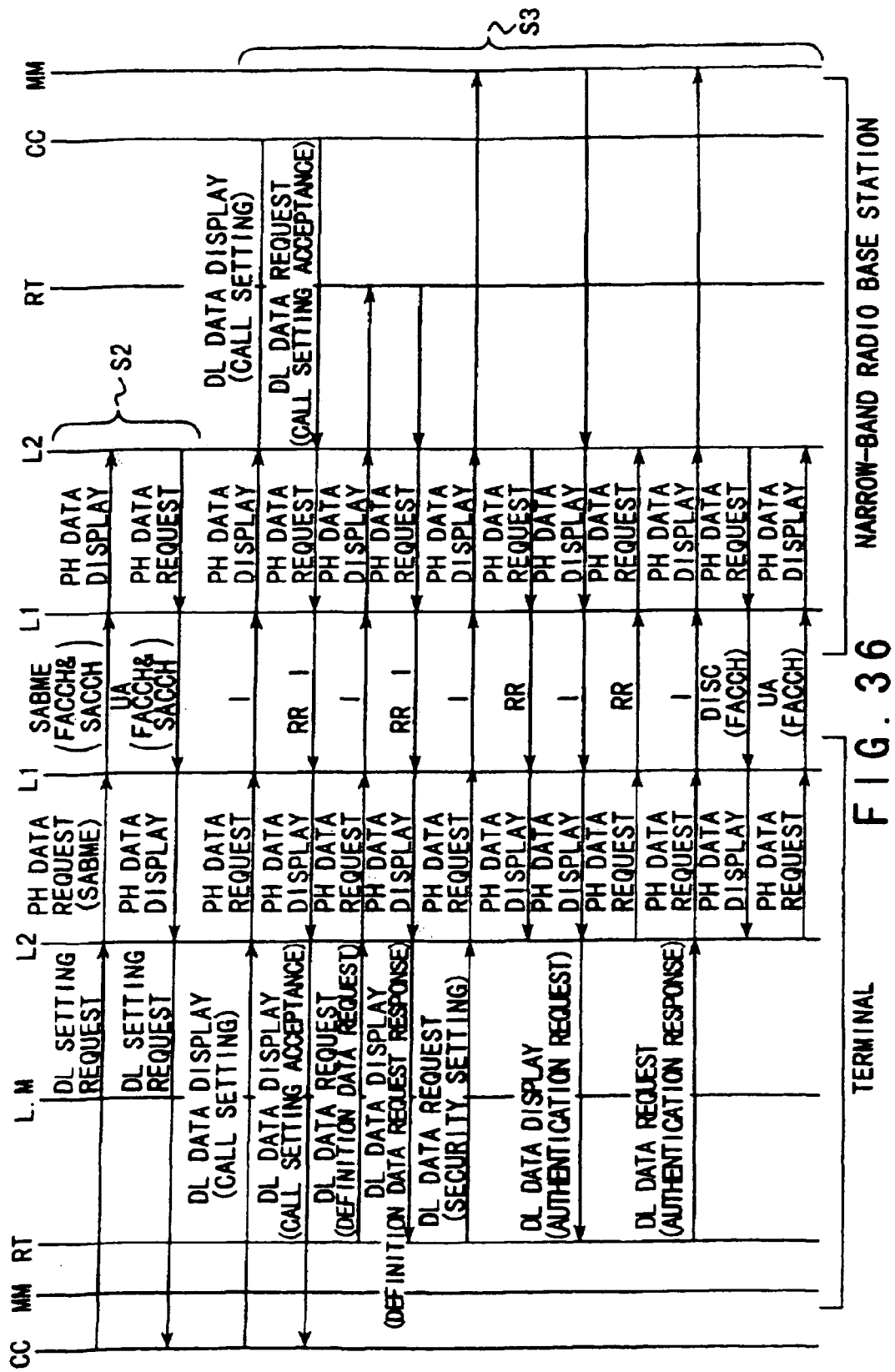
FIG. 36 is a view for explaining the details of the method of controlling call setting between the radio communication terminal and the database (server)

(S2) As shown in FIG. 36, a link for a data link for a control channel is established. More specifically, the terminal 205 transmits a data link setting request message (SABME) to the narrow-band radio base station 203 by using the previously assigned physical slot. In response to this massage, the narrow-band radio base station 203 transmits a data link setting confirmation response message (UA) to the terminal 205. As a result, the link for the data link for the control channel is established.

(S3) On layer 3, call setting is performed between the narrow-band radio base station 203 and the terminal 205. More specifically, the terminal 205 transmits a call setting message to the narrow-band radio base station 203. In response to this message, the narrow-band radio base station 203 transmits a call setting acceptance response massage to the terminal 205. The narrow-band radio base station 203 transmits an authentication request to the terminal 205. When the data link layer of the control channel is disconnected (DISC) to start communication by using the same physical slot afterward, a communication phase is set. With the above steps, narrow-band bidirectional radio channels are established between the narrow-band radio base station 203 and the terminal 205.

Figure 37:
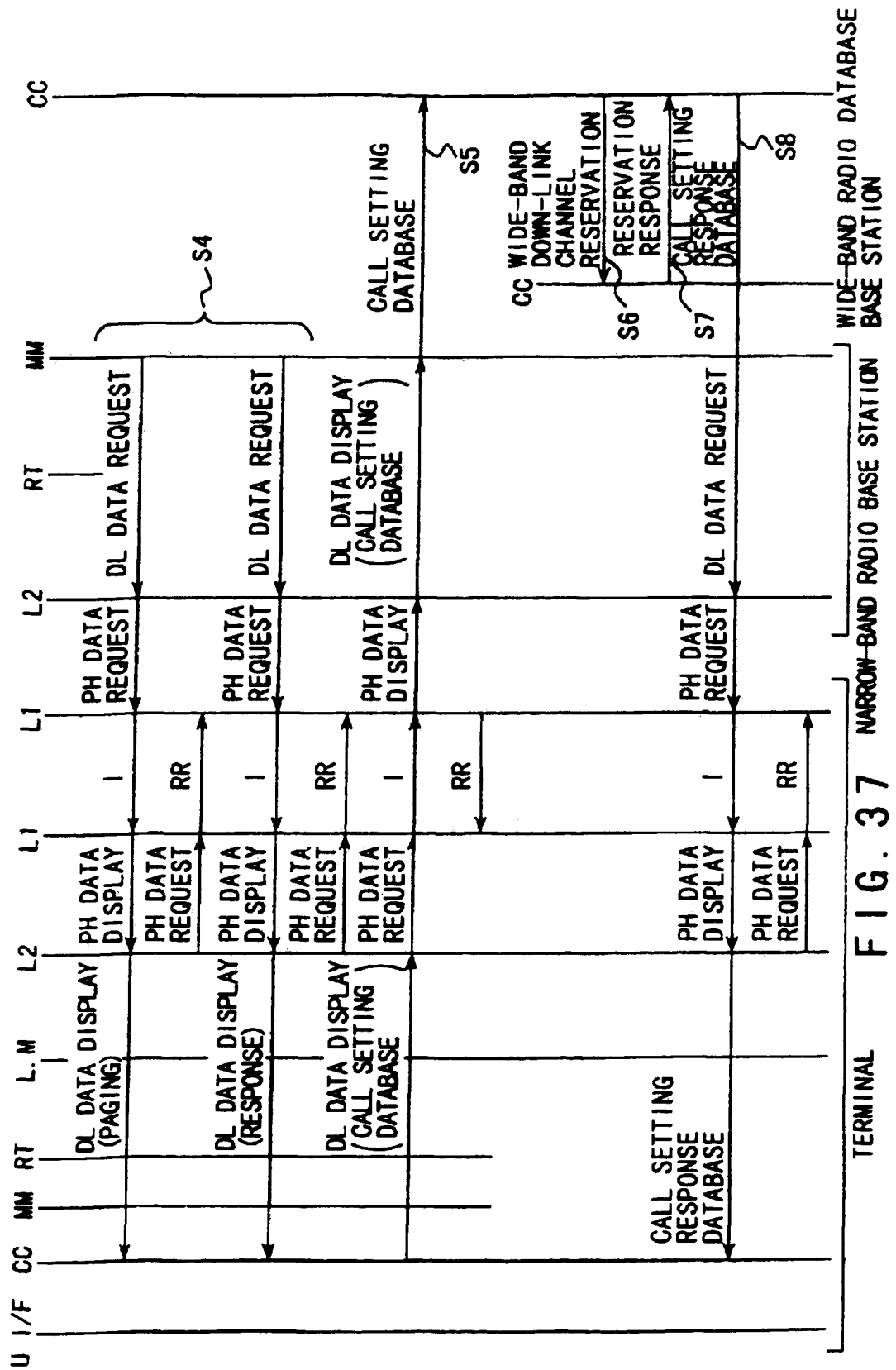
FIG. 37 is a view for explaining the details of the method of controlling call setting between the radio communication terminal and the database (server)

(S4) As shown in FIG. 37, the narrow-band radio base station 203 transmits a call message to the terminal 205. In response to this message, the terminal 205 transmits a response message to the narrow-band radio base station 203.

(S5) The terminal 205 performs call setting for the database 202 by using the previously set narrow-band radio channel. That is, the terminal 205 transmits a call setting message to the database.

(S6) Upon reception of the call setting message through the narrow-band radio channel, the narrow-band radio base station 203, and the network 201, the database 202 transmits a wide-band down-link reservation message to the wide-band radio base station 204 through the network 201.

(S7) Upon reception of this message, the wide-band radio base station 204 confirms the reservation of the band designated by the message, and transmits a reservation response message to the database 202 through the network 201.

(S8) Upon reception of this reservation response message, the database 202 transmits a call setting response message to the terminal 205 through the network 201, the narrow-band radio base station 203, and the narrow-band down-link radio channel.

With the above procedure based on transmission/reception of messages, call setting is performed between the terminal 205 and the database 202, and the wide-band down-link radio channel is assigned to the terminal 205.

When data is to be transmitted through the reserved wide-band down-link radio channel, first of all, the wide-band radio base station 204 transmits notification data to the terminal 205 through the network 201, the narrow-band radio base station 203, and the narrow-band down-link radio channel. At the timing of the reception of this notification data, the terminal 205 turns on the wide-band radio receiver 224, incorporated therein, to receive data transmitted through the wide-band radio channel.

As described above, in the communication system, the narrow-band radio base station 203, the database 202, and the wide-band radio base station 204 are connected to the network 201 to communicate with each other, and the terminal 205 connected to the network 201 through the narrow-band bidirectional radio channels provided by the narrow-band radio base station 203 and the wide-band down-link radio channel provided by the wide-band radio base station 204 communicates with the database 202 through the narrow-band bidirectional radio channels so as to receive desired data from the database 202 through the wide-band down-link radio channel. According to the method of performing call setting between the terminal 205 and the database 202 in this communication system, the terminal 205 performs call setting between the narrow-band radio base station 203 and the terminal 205, and transmits, to the database 202 through the established bidirectional narrow-band radio channels, a request for call setting between the terminal 205 and the database 202. In response to this request, the database 202 transmits, to the wide-band radio base station 204, a request for call setting between the wide-band radio base station 204 and the terminal 205, thereby assigning a wide-band down-link radio channel to the terminal 205. In addition, the database 202 performs call setting between the terminal 205 and the database 202. With this operation, the database 202 can perform call setting between the terminal 205 and the database 202 without using the wide-band down-link radio channel.

Figure 38:
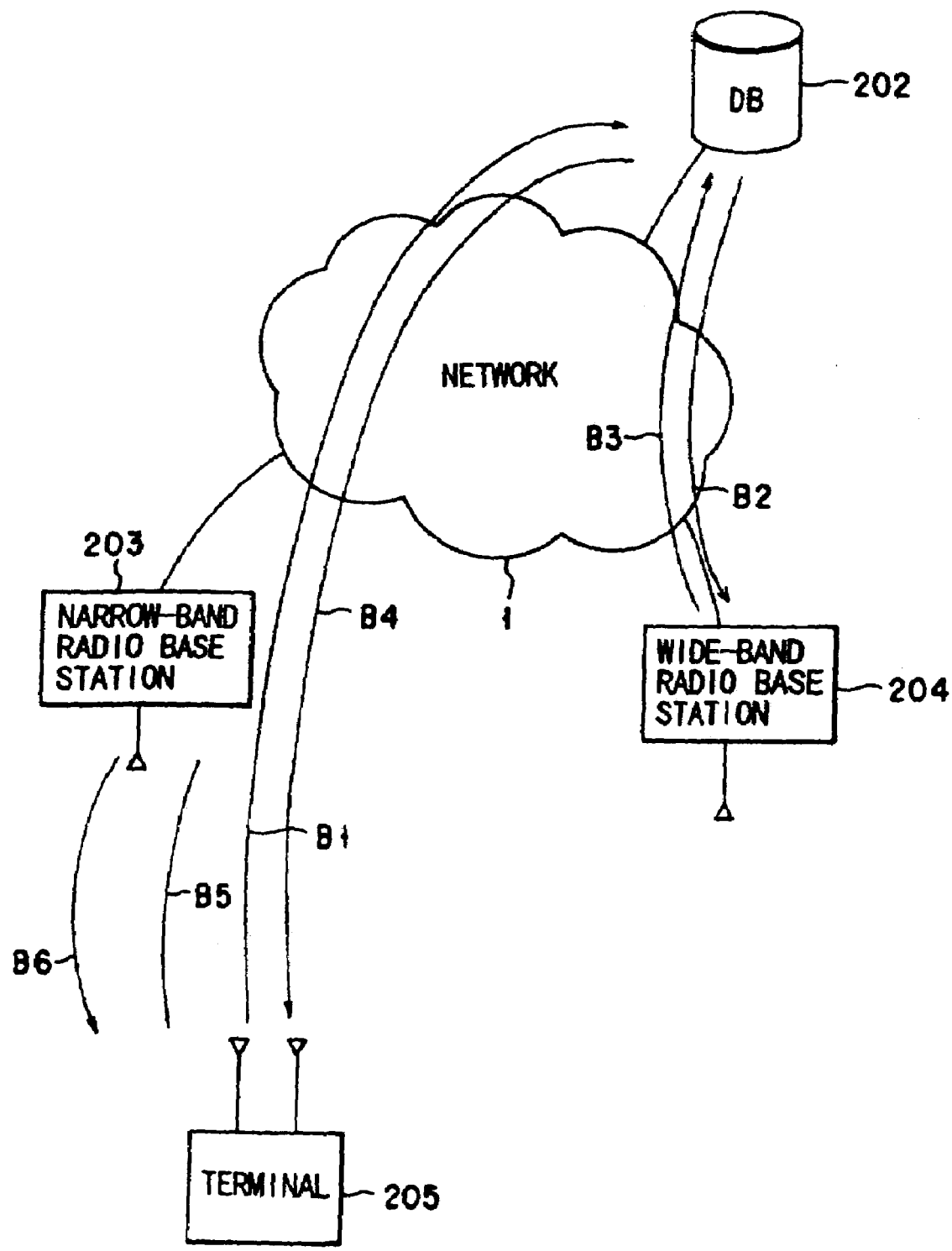
FIG. 38 is a view for briefly explaining the method of controlling call disconnection between the radio communication terminal and the database (server)

A method of performing disconnection control for the call set between the terminal 205 and the database 202 will be briefly described next with reference to FIG. 38. A procedure for disconnecting a call from the terminal 205 side will be described below. Note that steps B1 to B8 in the following description correspond to reference symbols B1 to B8 in FIG. 38.

(B1) Upon reception of a predetermined instruction input from the user through the user interface (U I/F), the terminal 205 transmits a call disconnection request message to the database 202 through the narrow-band bidirectional radio channels and the network 201.

(B2, B3) Upon reception of this disconnection request message, the database 202 cancels the wide-band down-link radio channel reserved in the wide-band radio base station 204.

(B4) The database 202 then releases the call between the terminal 205 and the database 202. With the above steps, the call between the terminal 205 and the database 202 and the call between the terminal 205 and the wide-band radio base station 204 are released by the function of layer 3.

(B5) The terminal 205 transmits a request message for disconnecting the call between the narrow-band radio base station 203 and the terminal 205.

(B6) After the call between the narrow-band radio base station 203 and the terminal 205 is released in response to this request, the terminal 205 disconnects the data link (L1) and the physical channel (releases radio resources). That is, layers 1 to 3 between the terminal 205 and the narrow-band radio base station 203 are released.

Figure 39:
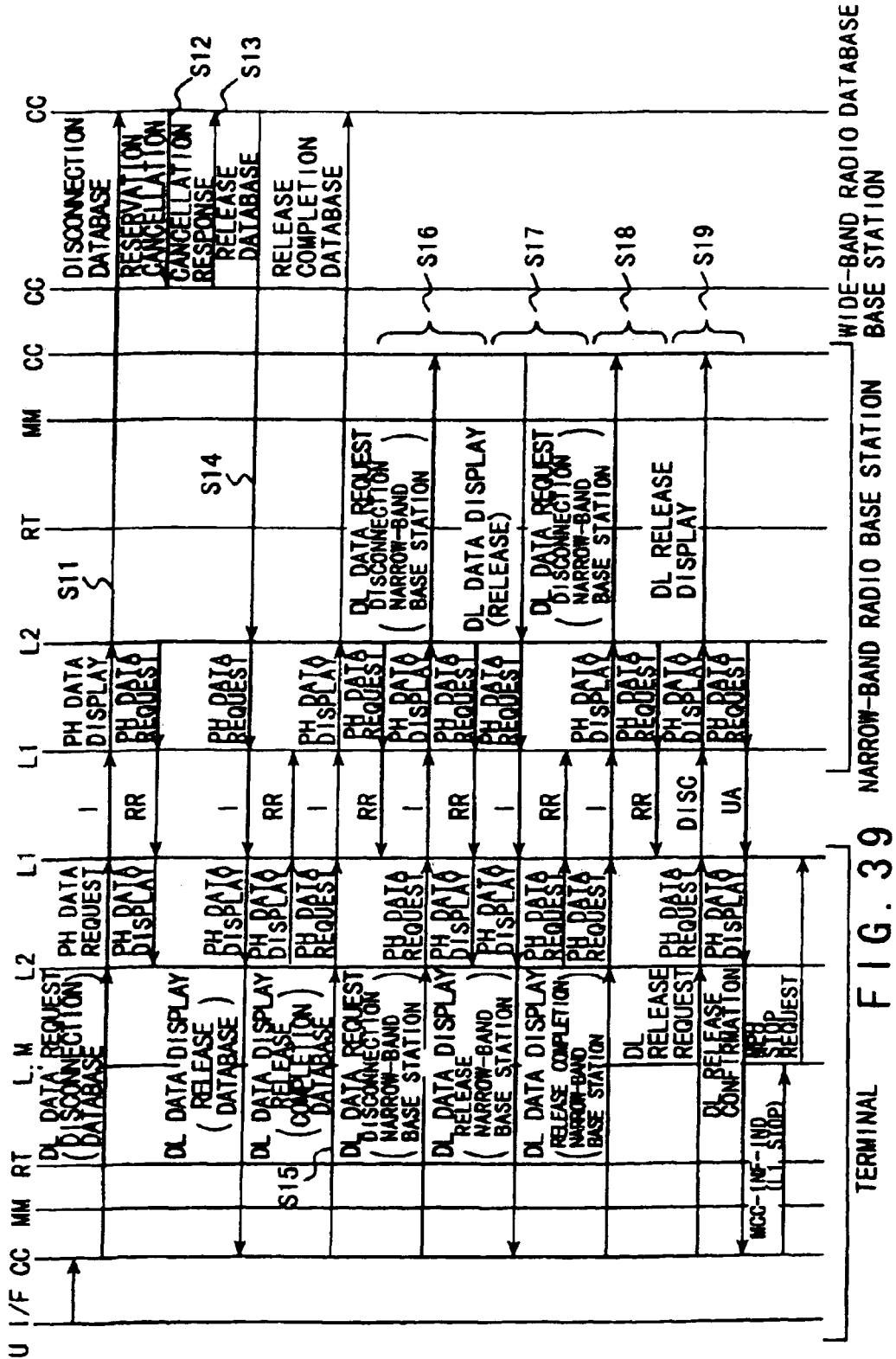
FIG. 39 is a view for explaining the details of the method of controlling call disconnection between the radio communication terminal and the database (server)

The method of performing disconnection control for the call set between the terminal 205 and the database 202 will be described in detail next with reference to FIG. 39. Note that steps S11 to S19 in the following description correspond to reference symbols S11 to S19 in FIG. 39.

(S11) The terminal 205 transmits a disconnection massage through the narrow-band up-link radio channel, the narrow-band radio base station 203, and the network 201 to disconnect the call between the database 202 and the terminal 205.

(S12) Upon reception of this message, the database 202 transmits, to the wide-band radio base station 204, a cancellation massage for the wide-band down-link radio channel reserved when call setting has been performed.

(S13) Upon reception of the reservation cancellation message, the wide-band radio base station 204 cancels the reserved wide-band down-link radio channel, and transmits a cancellation response to the database 202.

(S14) The database 202 notifies the terminal 205 of the cancellation of the reserved wide-band down-link radio channel by transmitting the cancellation message to the terminal 205 through the network 201, the narrow-band radio base station 203, and the narrow-band down-link radio channel.

(S15) Upon reception of this message, the terminal 205 transmits a release completion message to the database 202 through the narrow-band radio base station 203 and the network 201. As a result, the call between the terminal 205 and the database 202 and the call between the terminal 205 and the wide-band radio base station 204 are released.

(S16) Subsequently, disconnection of the narrow-band bidirectional radio channels is performed. First of all, the terminal 205 transmits a disconnection message to the narrow-band radio base station 203.

(S17) Upon reception of the disconnection message, the narrow-band radio base station 203 transmits a release message to the terminal 205.

(S18) The terminal 205 transmits a release completion message to the narrow-band radio base station 203, thus releasing the call between the narrow-band radio base station 203 and the terminal 205.

(S19) When the call is released, the terminal 205 disconnects the link (data link) for layer 2. That is, the terminal 205 transmits "Disconnect (DISC)" as a control message based on a protocol paging LAPDC. In response to this message, the narrow-band radio base station 203 transmits "Unnumbered Acknowledgment (UA)" as a control message based on the protocol paging LAPDC to disconnect the link for the data link. Finally, the radio resources, i.e., layer 1, are released.

Another method of performing disconnection control for the call set between the terminal 205 and the database 202 will be described next with reference to FIG. 40. A procedure for disconnecting a call from the terminal 205 side will be described below. Note that steps C1 to C4 in the following description correspond to reference symbols C1 to C4 in FIG. 38.

(C1) The terminal 205 transmits a call disconnection request to the narrow-band radio base station 203 through the narrow-band bidirectional radio channels.

(C2) Upon reception of the disconnection request from the terminal 205, the narrow-band radio base station 203 releases the call between the terminal 205 and the narrow-band radio base station 203 and the call between the terminal 205 and the database 202. In this case, the narrow-band radio base station 203 transmits the call disconnection request to the database 202 first.

(C3) Upon reception of this request, the database 202 releases the link for the wide-band radio channel reserved in the wide-band radio base station 204.

(C4) Subsequently, the database 202 releases the call between the terminal 205 and the narrow-band radio base station 203 and the call between the terminal 205 and the database 202.

(C5) The data link between the terminal 205 and the narrow-band radio base station 203 is disconnected. Finally, the physical channel is disconnected (layer 1 is released).

The method of performing disconnection control for the call set between the terminal 205 and the database 202 in FIG. 4 will be described in more detail next with reference to FIG. 41. Note that steps S21 to S29 in the following description correspond to reference symbols S21 to S29 in FIG. 40.

(S21) The terminal 205 transmits a disconnection message to the narrow-band radio base station 203.

(S22) Upon reception of the disconnection message, the narrow-band radio base station 203 transmits the disconnection message to the database 202.

(S23) Upon reception of the disconnection message from the wide-band radio base station 204, the database 202 transmits, to the wide-band radio base station 204, a reservation cancellation message for canceling the wide-band down-link radio channel reserved in the wide-band radio base station 204.

(S24) Upon reception of the reservation cancellation message, the wide-band radio base station 204 cancels the reserved band, and transmits a cancellation response message to the database 202.

(S25) When the database 202 confirms the cancellation of the wide-band down-link radio channel on the basis of the cancellation response message, the database 202 transmits a release message to the narrow-band radio base station 203.

(S26) Upon reception of the release message from the database 202, the narrow-band radio base station 203 transmits the release message to the terminal 205.

(S27) Upon reception of the release message, the terminal 205 transmits a release completion message to the narrow-band radio base station 203.

(S28) The narrow-band radio base station 203 transmits the release completion message to the database 202.

With the above steps, the call between the terminal 205 and the narrow-band radio base station 203 and the call between the terminal 205 and the database 202 are disconnected.

(S29) Subsequently, the terminal 205 disconnects the data link between the narrow-band radio base station 203 and the terminal 205. More specifically, the terminal 205 transmits "Disconnect (DISC)" as a command message based on the protocol paging LAPDC. In response to this message, the narrow-band radio base station 203 transmits "Unnumbered Acknowledgment (UA)" as a command message based on the protocol paging LAPDC to disconnect the connection of the data link. Finally, the radio resource, i.e., layer 1, is released.

Figure 40:
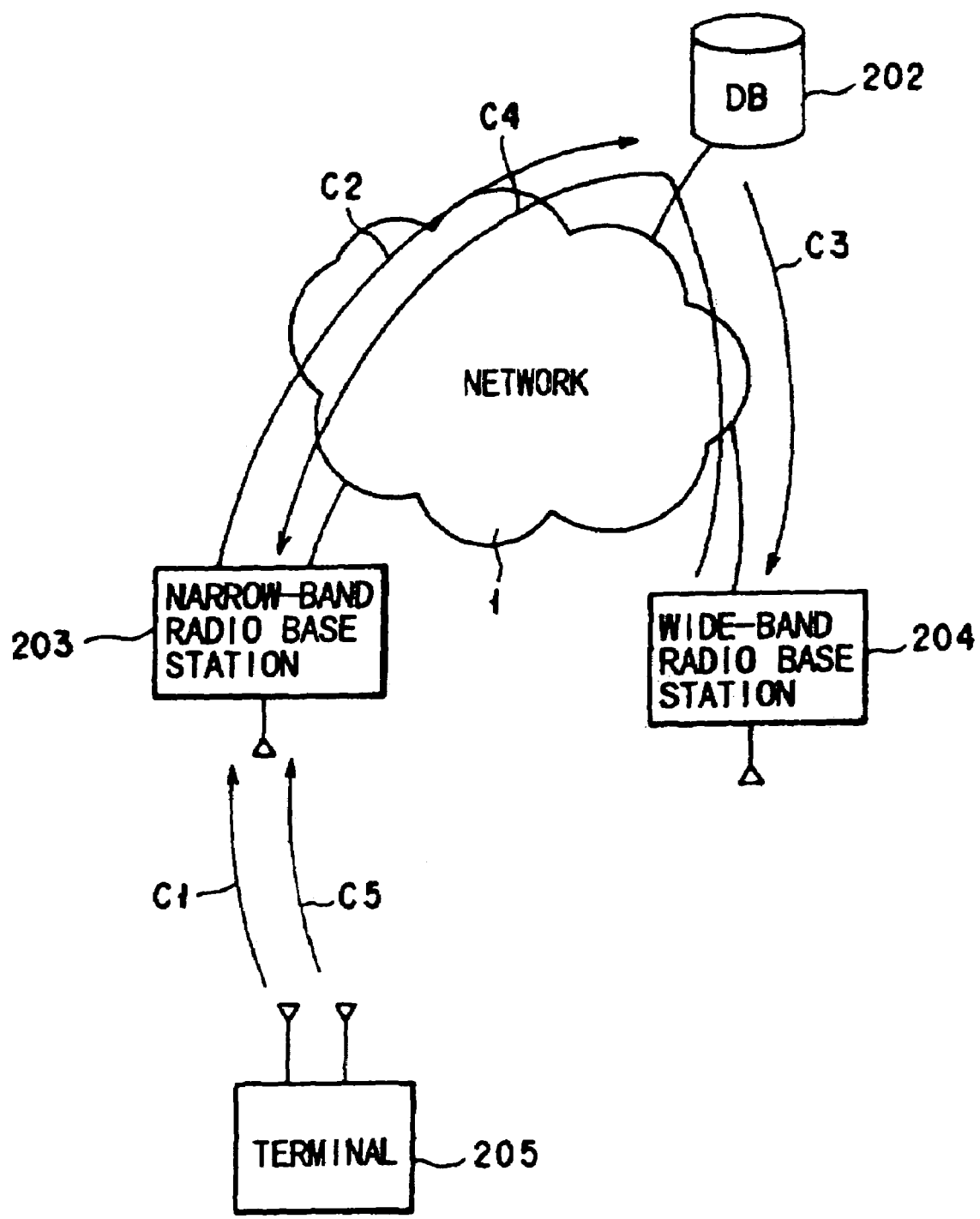
FIG. 40 is a view for briefly explaining another method of controlling call disconnection between the radio communication terminal and the database (server)
Figure 41:
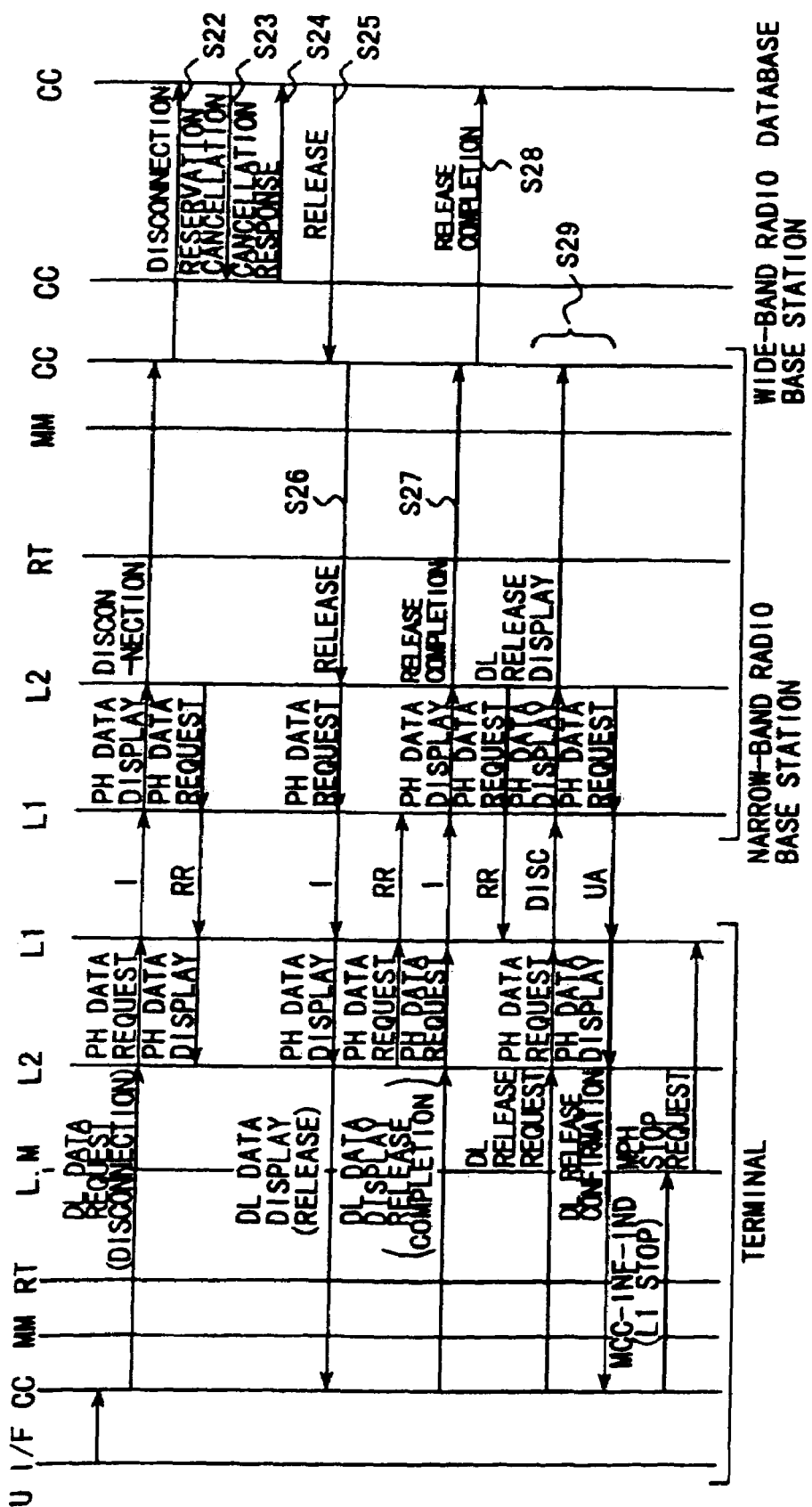
FIG. 41 is a view for explaining the details of the method of controlling call disconnection between the radio communication terminal and the database (server)

According to the call disconnection control method in FIGS. 40 and 41, when the terminal 205 transmits a call disconnection request message to the narrow-band radio base station 203, the narrow-band radio base station 203 releases the call between the terminal 205 and the narrow-band radio base station 203 and the call between the terminal 205 and the database 202 in response to the message. For this reason, call disconnection control processing can be performed by this method at a higher speed than by the call disconnection control method in FIGS. 38 and 29.

As described above, in the above communication system, the narrow-band radio base station 203, the database 202, and the wide-band radio base station 204 are connected to the network 201 to communicate with each other, and the terminal 205 connected to the network 201 through the narrow-band bidirectional radio channels provided by the narrow-band radio base station 203 and the wide-band down-link radio channel provided by the wide-band radio base station 204 communicates with the database 202 through the narrow-band bidirectional radio channels to receive desired data from the database 202 through the wide-band down-link radio channel. According to the method of performing disconnection control for the call between the terminal 205 and the database 202 in this system, the terminal 205 transmits a call disconnection request to the database 202 through the narrow-band bidirectional radio channels, and the database 202 requests the wide-band radio base station 204 to disconnect the call between the terminal 205 and the database 202 in response to this disconnection request, thereby releasing the wide-band down-link radio channel assigned to the terminal 205. In addition, the database 202 releases the call between the terminal 205 and the database 202. Thereafter, the terminal 205 releases the call between the narrow-band radio base station 203 and the terminal 205, layer 2, and layer 1, thereby efficiently disconnecting the call between the terminal 205 and the database 202 without using the wide-band down-link radio channel.

According to another call disconnection method described above, the terminal 205 transmits a call disconnection request to the narrow-band radio base station 203 through the narrow-band bidirectional radio channels. In response to this request, the narrow-band radio base station 203 releases the call between the terminal 205 and the narrow-band radio base station 203, and transmits a disconnection request to the database 202. In response to this request, the database 202 requests the wide-band radio base station 204 to disconnect the call between the terminal 205 and the wide-band radio base station 204, thereby releasing the wide-band down-link radio channel assigned to the terminal 205. In addition, the database 202 releases the call between the terminal 205 and the database 202. Thereafter, the terminal 205 releases layers 1 and 2 between the narrow-band radio base station 203 and the terminal 205, thereby efficiently disconnecting the call between the terminal 205 and the database 202 without using the wide-band down-link radio channel.

As described above, the radio communication system of the above embodiment can perform call setting and call disconnection without using the wide-band down-link radio channel. For this reason, it suffices if the terminal 205 turns on the wide-band radio receiver 224 only when desired data must be transmitted from the database 202 through the wide-band radio base station 204 and the wide-band radio channel in response to a request from the terminal 205, i.e., when, for example, the database 202 notifies the terminal 205 of transmission of data through the narrow-band radio base station 203 and the narrow-band down-link radio channel. Therefore, a reduction in power consumption can be attained to allow reductions in size of the battery and the terminal 205.

As described above, according to the radio communication system of the above embodiment, call setting and call disconnection can be efficiently performed with respect to a radio communication terminal connected to a network through narrow-band bidirectional radio channels and the wide-band down-link radio channel. In addition, a reduction in power consumption of the wide-band radio channel receiver incorporated in the radio communication terminal can be attained, and hence the size of the radio communication terminal can be reduced.

Figure 42:
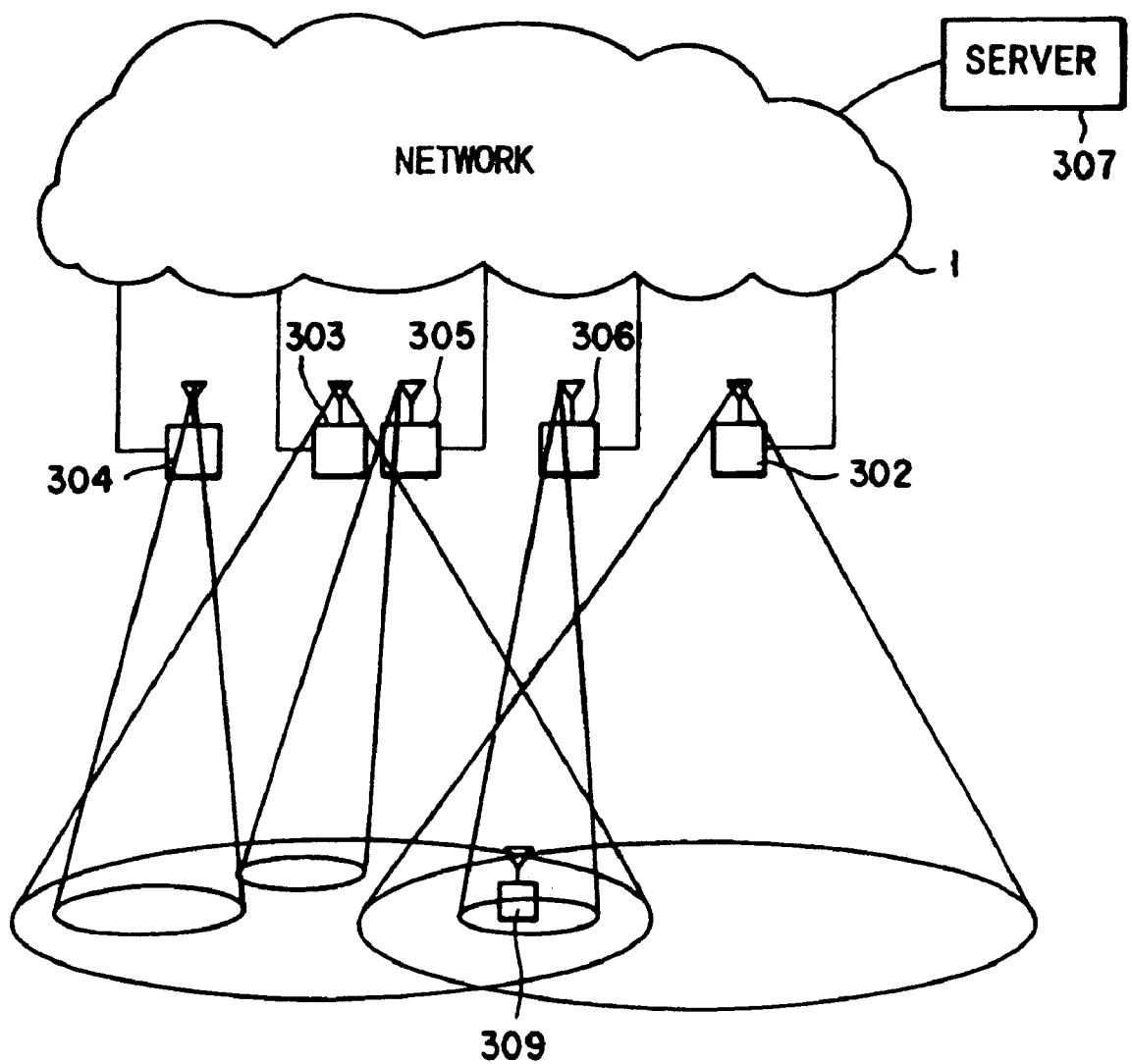
FIG. 42 is a view schematically showing the overall arrangement of a communication system according to the 10th embodiment of the present invention.

FIG. 42 shows the overall arrangement of a communication system according to the 10th embodiment of the present invention. Referring to FIG. 42, narrow-band radio base stations 302 and 303, each having a bidirectional radio interface with a low radio transmission speed (e.g., several tens kbps to several Mbps), and wide-band radio base stations 304, 305, and 306, each having a down-link (from the base station to the terminal) radio interface with a high radio transmission speed (e.g., 10 Mbps), are connected to a network 301.

The narrow-band radio service areas formed by the narrow-band radio base stations 302 and 303 are larger than the wide-band service areas formed by the wide-band radio base stations. A plurality of wide-band radio service areas may be present within a narrow-band radio service area. In addition, the adjacent narrow-band radio service areas overlap. A wide-band radio service area may exist in the overlapping area between a plurality of narrow-band radio service areas (for example, the service area formed by the wide-band radio base station 306).

A radio communication terminal (to be simply referred to as a terminal hereinafter) 309 is connected to the network 301 through low-speed bidirectional radio channels provided by the narrow-band radio base stations and a high-speed down-link radio channel provided by the wide-band radio base station. The terminal 309 receives a service (e.g., a service of providing desired data) from a server 307 connected to the network 301.

FIG. 43 shows the arrangement of the terminal 309. Referring to FIG. 43, the terminal 309 is constituted by an antenna 321 and a narrow-band radio transceiver 323 which are used to transmit/receive data to/from the narrow-band radio base stations through the bidirectional radio channels, an antenna 322 and a wide-band radio receiver 324 which are used to receive data from the wide-band radio base station through the down-link radio channel, an operating section 325 serving as a user interface which is operated by the user to input various instructions and perform other operations, an input/output section 328 for outputting speech, a picture, and data received by the narrow-band radio transceiver 323 or the wide-band radio receiver 324, and inputting desired speech, a picture, and data, and a controller 326 connected to the narrow-band radio transceiver 323, the wide-band radio receiver 324, the operating section 325, and the input/output section 328 to perform overall control for these components.

The narrow-band radio transceiver 323 and the wide-band radio receiver 324 respectively receive control channels (multiple address channels) on control carriers from the narrow-band and wide-band radio base stations. The controller 326 selects one of a plurality of narrow-band radio base stations which can perform communication, while updating a table 327, incorporated in the controller 326, like the one shown in FIG. 44 on the basis of a received signal strength indicator level RSSI and multiple address data transmitted through a control channel.

Assume that the terminal 309 is present in the service area of the wide-band radio base station 306, and the area is covered with the service areas of the narrow-band radio base stations 302 and 303 (see FIG. 42).

A method of assigning radio channels to the terminal 309 in the communication system in FIG. 42 will be described next with reference to FIG. 45. When the power to the terminal 309 is turned on, the terminal 309 selects a narrow-band radio base station (one of the narrow-band radio base stations 302 and 303 in this case) and a wide-band radio base station (the wide-band radio base station 306 in this case). The selected radio base stations then assign radio channels to the terminal 309. Such a series of operations will be described below.

Assume that data to be transmitted by a multiple address scheme (to be referred to as multiple address data hereinafter) from the respective narrow-band radio base stations to the respective terminals through multiple address channels includes at least the identification data of the respective narrow-band base stations and data indicating the numbers of available channels which can be provided by the base stations and can be used for communication.

When the user operates the operating section 325 to turn on the power to the terminal 309, the function of the narrow-band radio transceiver 323 is activated (step S1). The narrow-band radio transceiver 323 receives multiple address channels from the narrow-band radio base stations 302 and 303 and measures their received signal strength indicators RSSI (step S2). The controller 326 generates the table 327 in FIG. 44 on the basis of the measurement data (step S3).

In this stage, in the table 327 stored in the controller 326, as shown in FIG. 44, the measured values of RSSI are stored in correspondence with the identification data of the respective narrow-band radio base stations.

Subsequently, for example, the terminal 309 refers to the table 327 in FIG. 44 to receive the multiple address data in the decreasing order of the values of RSSI of the narrow-band radio base stations, and stores the data indicating the numbers of available channels, which are contained in the multiple address data, in the table 327, like the one shown in FIG. 44, stored in the controller 326 (step S4).

In this stage, in the table 327 stored in the controller 326, the measured values of RSSI and the data indicating the numbers of available channels are stored in correspondence with the identification data of the respective narrow-band radio base stations, as shown in FIG. 44.

The controller 326 then refers to the values of RSSI and the data indicating the numbers of available channels stored in the table 327 to select an optimal (capable of communication) narrow-band radio base station to be connected (step S5).

When a narrow-band radio base station is selected (the narrow-band radio base station 302 in this case), the function of the wide-band radio receiver 324 is activated (step S6) to receive the multiple address data transmitted through a multiple address channel. The controller 326 stores the identification data of the wide-band radio base station 306 which is contained in the received multiple address data (step S7).

Subsequently, a communication request message is transmitted to the narrow-band radio base station 302 selected in step S5. Assume that this message contains the identification data of the wide-band radio base station which is stored in step S7 (step S8).

Upon reception of the communication request message from the terminal 309, the narrow-band radio base station 302 performs call setting with respect to the wide-band radio base station 306 on the basis of the identification data of the wide-band radio base station 306 which is contained in the message (step S9). That is, the narrow-band radio base station 302 controls the wide-band radio base station 306 to assign a wide-band down-link radio channel to the terminal 309. In addition, available channels (available slots) are assigned to the terminal 309, which has generated the communication request (step S10). Thereafter, the terminal 309 starts to communicate with the narrow-band radio base station 302 and the wide-band radio base station 306 through the assigned radio channels.

In the case shown in FIG. 45, the functions of the narrow-band radio transceiver 323 and the wide-band radio receiver 324 may be activated by the user who operates the operating section 325, or under the control of the controller 326.

A series of operations to be performed by the controller 326 to select a narrow-band radio base station will be described next with reference to the flow chart of FIG. 46.

Let N be the number of narrow-band radio base stations subjected to RSSI measurement, and T be the threshold of RSSI.

When the narrow-band radio transceiver 323 of the terminal 309 scans a predetermined frequency of received radio waves to measure RSSI (step S20), the controller 326 generates the table 327 like the one shown in FIG. 44 in the decreasing order of the values of RSSI (reception levels) (step S21).

The data indicating the number of available channels which is contained in multiple address data transmitted from a narrow-band radio base station exhibiting RSSI data larger than the threshold T is received (step S23). This data is written in the generated table 327 (step S24).

First of all, the controller 326 refers to the table 327 to select a narrow-band radio base station having the maximum number of available channels (steps S25 and S26).

If there are a plurality of narrow-band radio base stations each having the maximum number of available channels, one of the stations which exhibits the maximum RSSI data is selected (steps S25 and S26).

In a system using a wide-band down-link radio channel as well as conventional PHS narrow-band bidirectional radio channels, the traffic of the system may be especially large in the overlapping area (see FIG. 42) between service areas of the narrow-band and wide-band radio base stations. That is, in a method in which the terminal 309 selects a nearest narrow-band radio base station on the basis of only RSSI data as in a conventional method, the traffic becomes intensively large only in a specific narrow-band radio base station. In order to make the traffics in the respective radio stations uniform, an available channel of a base station having many available channels is preferentially assigned to a terminal. With this operation, the wait time for call connection for each terminal can be shortened, and a deterioration in communication service quality can be prevented.

As described above, according to the above embodiment, the terminal 309 present in the overlapping area between the service areas of the narrow-band radio base stations 302 and 303 selects a narrow-band radio base station capable of communication on the basis of the RSSI data of multiple address channels from the respective narrow-band radio base stations and the data indicating the numbers of available channels (slots) which are contained in multiple address data transmitted through the multiple address channels. The selected narrow-band radio base station assigns radio channels to the terminal 309 in response to a radio channel assignment request therefrom. With this operation, a terminal present in the overlapping area between the service areas of a plurality of narrow-band radio base stations can easily and reliably search for a base station capable of communication. This method can therefore prevent the traffic in a given narrow-band radio base station from intensively increasing, and hence a deterioration in telephone service quality due to an intensive increase in traffic, as compared with the conventional method of selecting a narrow-band radio base station on the basis of only the RSSI data of multiple address channels.

In addition, the terminal 309 selects a narrow-band radio base station capable of communication on the basis of the RSSI data of multiple address channels from the narrow-band radio base stations 302 and 303 and data indicating the numbers of available channels which are contained in multiple address data transmitted through the multiple address channels. The selected radio base station and the wide-band radio base station 306 assign narrow-band bidirectional radio channels and a wide-band down-link radio channel to the terminal 309 in response to a radio channel assignment request therefrom. With this operation, even if the terminal 309 is present in the overlapping area between the service areas of a plurality of narrow-band radio base stations, the terminal 309 can easily and reliably search for a base station capable of communication. Therefore, an intensive increase in traffic in a given narrow-band radio base station and a deterioration in telephone service quality due to an intensive increase in traffic can be prevented.

In the above embodiment, the terminal 309 is present in the service area of the wide-band radio base station 306. However, the present invention is not limited to this. The present invention can be effectively applied to a case wherein the terminal 309 is present in at least the overlapping area between the service areas of a plurality of narrow-band radio base stations.

The 11th embodiment of the present invention will be described next. In the communication system having the arrangement shown in FIG. 42, the terminal 309 performs communication through a wide-band down-link radio channel provided by the wide-band radio base station 306 and narrow-band bidirectional radio channels provided by one of the narrow-band radio base stations 302 and 303. In this system, for example, when the terminal 309 is to generate a call, one of the narrow-band radio base stations 302 and 303 assigns bidirectional radio channels to the terminal 309, and the wide-band radio base station 306 assigns a wide-band down-link radio channel to the terminal 309. Another series of operations for such channel assignment will be described below with reference to the flow chart of FIG. 47.

Assume that in the following description, the terminal 309 is present in the service area of the wide-band radio base station 306, and this area is covered with the service areas of the narrow-band radio base stations 302 and 303 (see FIG. 42).

Also assume that data to be transmitted by a multiple address scheme (to be referred to as multiple address data hereinafter) from the wide-band radio base station 306 to each terminal through a predetermined multiple address channel contains at least the identification data of the self-terminal (wide-band radio base station 306), the identification data of the narrow-band radio base stations 302 and 303 having service areas overlapping the service area of the wide-band radio base station 306, and data indicating the numbers of available channels, in the narrow-band radio base stations 302 and 303, which can be used for communication.

The narrow-band radio base stations 302 and 303 and the wide-band radio base station 306 are connected to the network 301, as shown in FIG. 42. The narrow-band radio base stations 302 and 303 and the wide-band radio base station 306 communicate with each other through the network 301. With this communication, the wide-band radio base station 306 can obtain the identification data of the narrow-band radio base stations 302 and 303 having service areas overlapping the service area of the wide-band radio base station 306, and data indicating the numbers of available channels, in the narrow-band radio base stations 302 and 303, which can be used for communication.

When the user operates the operating section 325 to turn on the power to the terminal 309, the function of the wide-band radio receiver 324 is activated (step S30) to receive multiple address data transmitted by a multiple address scheme from the wide-band radio base station 306 (step S31).

The terminal 309 selects a narrow-band radio base station having the maximum number of available channels on the basis of the received multiple address data (step S32). Assume that the narrow-band radio base station 302 has the maximum number of available channels.

When a narrow-band radio base station is selected (the narrow-band radio base station 302 in this case), the function of the narrow-band radio transceiver 323 is activated (step S33) to transmit a communication request message to the narrow-band radio base station 302. Assume that this message contains the identification data of the wide-band radio base station which is stored in step S7 (step S34).

Upon reception of the communication request message from the terminal 309, the narrow-band radio base station 302 performs call setting with respect to the wide-band radio base station 306 on the basis of the identification data of the wide-band radio base station 306 (step S35). That is, the narrow-band radio base station 302 controls the wide-band radio base station 306 to assign a wide-band down-link radio channel to the terminal 309. In addition, the narrow-band radio base station 302 assigns available channels (available slots) to the terminal 309, which has generated the communication request (step S36). Thereafter, the terminal 309 starts to communicate with the narrow-band radio base station 302 and the wide-band radio base station 306.

In the case shown in FIG. 47, the functions of the narrow-band radio transceiver 323 and the wide-band radio receiver 324 may be activated by the user who operates the operating section 325, or under the control of the controller 326.

In addition, the function of the narrow-band radio transceiver 323 may be activated when the user operates the operating section 325 to turn on the power.

As has been described above, according to the 11th embodiment, the terminal 309 selects a narrow-band radio base station having the maximum number of available channels on the basis of data indicating the numbers of available channels (which can be used for communication), contained in multiple address data from the wide-band radio base station 306, in the narrow-band radio base stations 302 and 303 having service areas overlapping the service area of the wide-band radio base station 306. The selected radio base station and the wide-band radio base station assign narrow-band bidirectional radio channels and a wide-band down-link radio channel to the terminal 309 in response to a radio channel assignment request therefrom. With this operation, even if the terminal 309 is present in the overlapping area between the service areas of a plurality of narrow-band radio base stations, the terminal 309 can easily and reliably search for a radio base station capable of communication. Therefore, an intensive increase in traffic in a given narrow-band radio base station and a deterioration in telephone service quality due to an intensive increase in traffic can be prevented.

In addition, the processing time for selection of a narrow-band radio base station in the 11th embodiment, in which the controller 326 can select a narrow-band radio base station upon reception of only multiple address data from the wide-band radio base station 306, is shorter than that in the 10th embodiment (see FIGS. 45 and 47).

A terminal present in the overlapping area between the service areas of a plurality of radio base stations can easily and reliably search for a radio base station capable of communication. In addition, an intensive increase in traffic in a given radio base station and a deterioration in telephone service quality due to an intensive increase in traffic can be prevented.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

The invention claimed is:

1. A radio terminal comprising:
   a narrow-band transceiver to transmit/receive data to/from a narrow-band radio base station via a narrow-band communication channel and a wide-band receiver to receive data from a wide-band radio base station via a wide-band communication channel, wherein said narrow-band radio base station has a narrow-band transceiver unit configured to transmit data via a narrow-band communication channel and said wide-band radio base station has a wide band transmitter to transmit data via a wide-band communication channel;
   a measuring unit configured to measure a received signal strength indicator of a signal transmitted from the narrow-band radio base station;
   a handover performing unit configured to perform handover processing from the narrow-band radio base station when the measurement result is lower than a predetermined handover threshold level; and
   a changing unit configured to change the handover threshold level when data is received from the wide-band radio station.

* * * * *

UNITED STATES PATENT AND TRADEMARK OFFICE
CERTIFICATE OF CORRECTION

PATENT NO. : 7,130,287 B2  Page 1 of 1
APPLICATION NO. : 11/295605
DATED : October 31, 2006
INVENTOR(S) : Nounin et al.

It is certified that error appears in the above-identified patent and that said Letters Patent is hereby corrected as shown below:

On the title page, Item (30), the Foreign Application Priority Data is incorrect. Item (30) should read:

-- (30) Item Foreign Application Priority Data

Jan. 18, 1996 (JP) .............................. 8-006665
Jan. 23, 1996 (JP) .............................. 8-009531
Jan. 23, 1996 (JP) .............................. 8-009532

Signed and Sealed this

Ninth Day of January, 2007

JON W. DUDAS
*Director of the United States Patent and Trademark Office*